US009823851B2

(12) United States Patent
Beale et al.

(10) Patent No.: US 9,823,851 B2
(45) Date of Patent: Nov. 21, 2017

(54) SECURE MIGRATABLE ARCHITECTURE HAVING SECURITY FEATURES

(71) Applicants: Andrew Ward Beale, Irvine, CA (US); David Strong, Irvine, CA (US)

(72) Inventors: Andrew Ward Beale, Irvine, CA (US); David Strong, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 142 days.

(21) Appl. No.: 15/048,203

(22) Filed: Feb. 19, 2016

(65) Prior Publication Data

US 2017/0024130 A1 Jan. 26, 2017

(51) Int. Cl.
*G06F 12/00* (2006.01)
*G06F 3/06* (2006.01)
(Continued)

(52) U.S. Cl.
CPC ............ *G06F 3/061* (2013.01); *G06F 3/062* (2013.01); *G06F 3/067* (2013.01); *G06F 3/0617* (2013.01); *G06F 3/0631* (2013.01); *G06F 3/0637* (2013.01); *G06F 3/0644* (2013.01); *G06F 3/0647* (2013.01); *G06F 3/0656* (2013.01); *G06F 3/0659* (2013.01); *G06F 3/0664* (2013.01); *G06F 3/0673* (2013.01); *G06F 8/65* (2013.01); *G06F 9/455* (2013.01); *G06F 9/45558* (2013.01); *G06F 9/5016* (2013.01); *G06F 12/0223* (2013.01); *G06F 12/08* (2013.01); *G06F 12/1458* (2013.01); *H04L 41/0843* (2013.01); *H04L 41/28* (2013.01); *H04L 63/20* (2013.01); *G06F 9/4401* (2013.01); *G06F 12/1483* (2013.01); *G06F 2009/4557* (2013.01); *G06F 2009/45583* (2013.01); *G06F 2212/1004* (2013.01);
(Continued)

(58) Field of Classification Search
None
See application file for complete search history.

(56) References Cited

U.S. PATENT DOCUMENTS 7,868,897 B2 * 1/2011 Vembu ................. G06F 9/4403
345/531
9,569,246 B2 * 2/2017 Roehrig ............. G06F 9/45508
(Continued)

*Primary Examiner* — Baboucarr Faal
(74) *Attorney, Agent, or Firm* — Robert P. Marley

(57) ABSTRACT

Methods and systems for implementing a secure migratable architecture are disclosed. One method includes, upon initiating execution of a process, allocating a portion of a memory for use by the process during execution, the process including a firmware environment representing a virtual computing system having a second computing architecture different from a first computing architecture of a computing system on which the process is executed. The method also includes executing the process hosted by the operating system, wherein the firmware environment manages the portion of the memory using one or more area descriptors to describe the portion of the memory, each of the one or more area descriptors defining to the firmware environment a base address at which a memory area is located, the base address translated to an address in the memory managed by the operating system, the memory area being within the portion of memory allocated for use by the process.

21 Claims, 36 Drawing Sheets

(51) Int. Cl.
*H04L 29/06* (2006.01)
*H04L 12/24* (2006.01)
*G06F 9/445* (2006.01)
*G06F 9/455* (2006.01)
*G06F 9/50* (2006.01)
*G06F 12/02* (2006.01)
*G06F 12/14* (2006.01)
*G06F 12/08* (2016.01)
*G06F 9/44* (2006.01)

(52) U.S. Cl.
CPC ............... *G06F 2212/1016* (2013.01); *G06F 2212/1032* (2013.01); *G06F 2212/1052* (2013.01); *G06F 2212/151* (2013.01)

(56) References Cited

U.S. PATENT DOCUMENTS

| | | | |
|---|---|---|---|
| 2006/0005186 A1* | 1/2006 | Neil | G06F 9/4555 718/1 |
| 2015/0193248 A1* | 7/2015 | Noel | G06F 9/45558 718/1 |
| 2016/0019165 A1* | 1/2016 | Bennett | G06F 12/1009 711/103 |

* cited by examiner

SECURE MIGRATABLE ARCHITECTURE HAVING SECURITY FEATURES

BACKGROUND

Enterprises have highly demanding computing environments in terms of security, reliability, and performance. To satisfy their needs requires computing systems that are secure, adaptable, fast, and reliable. This includes both enterprise-hosted computing systems as well as cloud computing systems, and often requires integration across organizations and computing platforms within an enterprise. Such hosted systems may require use of various software that supports workloads that are critical to a business, including workloads executing on commodity Windows-based systems, Linux-based systems, and legacy systems that support robust mainframe-type reliability required for enterprise workloads (e.g., transactional databases, etc.) such as Unisys's MCP or OS2200 systems. Such legacy enterprise systems often have different computing requirements as compared to workloads on commodity systems. For example, in an MCP-based system, clients tend to not halt load for months or years except when a fatal dump, hardware failure, of other major system event occurs. Furthermore, should a major system event occur, it is extremely rare for data to be lost in such legacy systems, because transactions can be recovered and restarted without data loss.

Due to the variety of types of workloads required by an organization, and flexibility afforded by such solutions, virtualization software is often a popular solution. In such arrangements, virtualization software, such as that provided by VMWare and Microsoft, can be installed on a partition of a computing system, and represent a monolithic virtualization software system that hosts each virtualized system. Such systems typically require dedicated system resources, and present limited ability to migrate virtual systems across platforms without first shutting down the hosted applications, moving the virtualization software and hosted system, and restarting that entire virtualized software stack on a second platform.

Even if such virtualization systems can be used, there are additional disadvantages. For example, virtualization software is typically written to be hosted by a particular type of platform and within a particular operating system (e.g., within Windows, in the case of Microsoft's Azure). Even then, if the two platforms have different arrangements (e.g., memory architectures, I/O device types, or other differences) there can also be difficulties in restarting the hosted system on the new platform. Still further, due to the extent that virtualization software is required to translate each operation of the hosted system to an operation that can be performed on a host system, virtualization software can introduce large computational inefficiencies, both in cases of a hardware or architecture mismatch between the host computing system and the hosted system and when the host computing system and hosted system operate using similar architectures. Still further, there may be limitations on the types of computing architectures that can be hosted by such virtualization software, with mainframe computing architectures often neglected.

To address some of these problems, Unisys Corporation of Blue Bell, Pa. has developed a number of solutions to allow mainframe software to be executed on commodity systems in a flexible, fault-tolerant, and secure manner. For example, current systems execute using E-mode code, which provides a translation between MCP instruction sets and underlying commodity architectures. This can be a complex process, because such mainframe software is often based on a stack architecture and has data types and lengths that are different from those of current commodity architectures (e.g., 48 bits rather than 32 bits). Furthermore, MCP systems store data according to different physical disk structure assumptions as compared to commodity systems. These and other reasons lead to substantial "impedance mismatch" due to loss of resources or performance based on the architectural differences between mainframe architectures and commodity processor architectures.

Unisys Corporation has also developed the s-Par virtualization solution that allows for secure partitioning and communication among partitions in a large-scale computing fabric, and which supports hosting of mainframe computing architectures such as Unisys's MCP or OS2200 systems. This solution provides increased flexibility and reliability due to redundancy and monitoring features of specific, special-purpose service partitions usable to perform specific system tasks associated with I/O and other features. However, such systems are generally written in a way that they are tied to specific underlying hardware (e.g., x86 variants) and would require specially-written service partitions to be instantiated across different platforms as well to support hosted workloads.

For interests of improved portability to different computing systems, as well as improved performance due to lower overhead due to translation and/or virtualization, improvements to existing solutions are desired.

SUMMARY

In summary, the present disclosure relates to methods and systems for implementing a secure migratable architecture having improved flexibility, performance, security, and availability.

In a first aspect, a computing system includes a programmable circuit configured to execute instructions according to a first computing architecture, as well as a memory communicatively connected to the programmable circuit. The memory stores software executable by the programmable circuit and including an operating system; and a process including a firmware environment representing a virtual computing system having a second computing architecture different from the first computing architecture and one or more workloads to be executed within the process. The software is executable to perform a method including: upon initiating execution of the process, allocating a portion of the memory for use by the process during execution; and executing the process hosted by the operating system, wherein the firmware environment manages the portion of the memory using one or more area descriptors to describe the portion of the memory, each of the one or more area descriptors defining to the firmware environment a base address at which a memory area is located, the base address translated to an address in the memory managed by the operating system, the memory area being within the portion of memory allocated for use by the process.

In a second aspect, a method includes, upon initiating execution of a process, allocating a portion of a memory for use by the process during execution, the process including a firmware environment representing a virtual computing system having a second computing architecture different from a first computing architecture of a computing system on which the process is executed. The method also includes executing the process hosted by the operating system, wherein the firmware environment manages the portion of the memory using one or more area descriptors to describe the portion of the memory, each of the one or more area descriptors defining to the firmware environment a base address at which a memory area is located, the base address translated to an address in the memory managed by the operating system, the memory area being within the portion of memory allocated for use by the process.

In a third aspect, a computing system includes a programmable circuit configured to execute instructions according to a first computing architecture, and a memory communicatively connected to the programmable circuit, the memory storing software executable by the programmable circuit. The software includes an operating system and a process including a firmware environment representing a virtual computing system having a second computing architecture different from the first computing architecture and one or more workloads to be executed within the process according to the second computing architecture. The software is executable to perform a method including: upon initiating execution of the process, allocating a portion of the memory for use by the process during execution; creating an area descriptor associated with a memory area included within the portion of the memory, the area descriptor including a base address and a length of the memory area; storing the area descriptor in an area descriptor collection; receiving a memory request associated with the memory area, the memory request including a memory location defined by the area descriptor and an offset within the memory area associated with the area descriptor; translating the memory location to an address in the memory managed by the operating system; and performing the memory request at the address.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
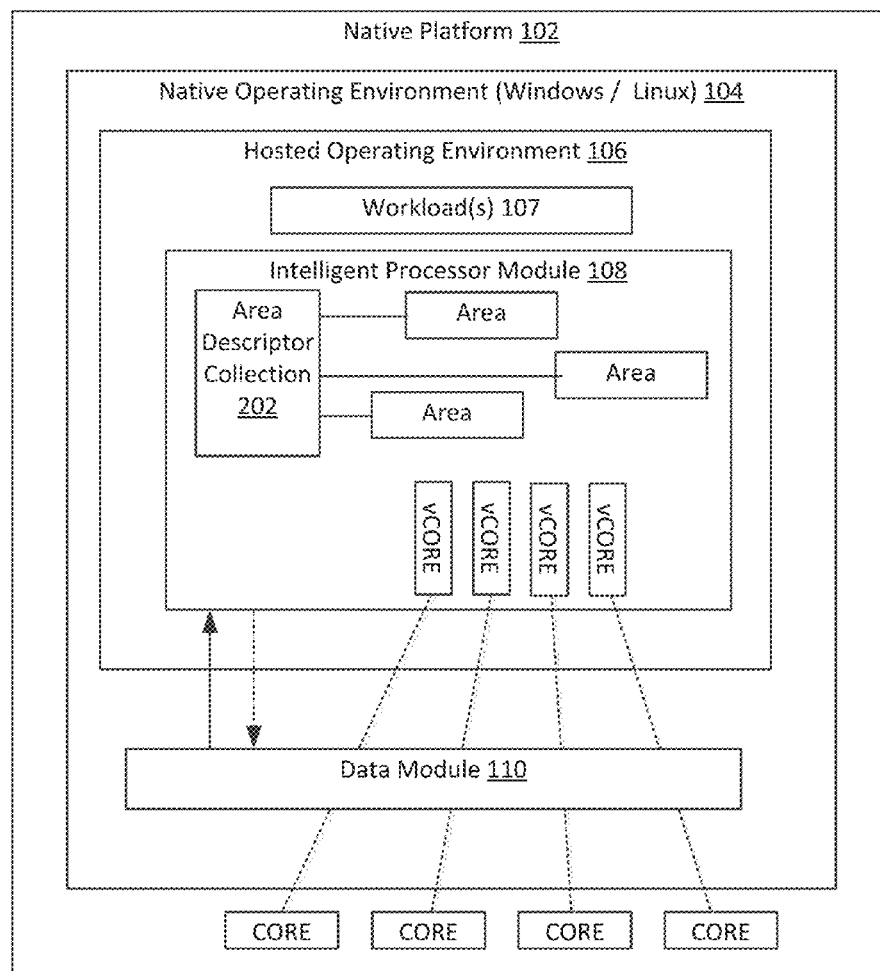
FIG. 1 illustrates an example implementation of a secure migratable architecture hosted within a commodity computing platform, according to an example embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

As briefly described above, embodiments of the present invention are directed to a virtualized computing architecture that is readily migratable across computing systems with limited dependency upon an underlying computing architecture. Accordingly, the virtualized architecture of the present disclosure can be hosted on computing systems having different instruction set architectures and device configurations. The virtualized computing architecture of the present disclosure therefore allows for a virtualized system that implements security features available in mainframe-type computing systems while able to be hosted on commodity systems of a variety of different computing architectures. Such hosted operation allows for simplified migration of the virtualized computing architecture across architecture versions, while reducing the overhead involved with virtualization processes by relying on specific native features included in the architecture and configuration of host computing systems, such as memory management, I/O, and processor features.

Referring now to FIG. 1, one example implementation of a secure migratable architecture 100 is illustrated, according to an example embodiment. In the embodiment shown, a commodity platform 102, such as an Intel-based, x86 computing system is illustrated, hosting a native operating system 104 (also referred to as a commodity operating environment), such as a Windows-based or Linux-based operating system. The native operating system 104 hosts a hosted operating system 106 for the secure migratable architecture, which operates on an intelligent processor module 108 to host non-native workloads on the commodity platform 102. The intelligent processor module 108 is associated with one or more processors, shown as cores, and memory, shown are areas. The intelligent processor module 108 maintains an area descriptor collection that describes memory areas, and which can be used to provide context to the intelligent processor module 108 as to the contents in memory. Details regarding such an area descriptor collection that provides a mapping to the memory of the underlying commodity platform 102 are described below.

In general, the intelligent processor module 108 represents an implementation of a non-native instruction set architecture that is executable on a host computing system that has a native instruction set architecture, and mapped to resources of that host (native) computing system. For example, in the embodiment shown, the intelligent processor module 108 is allocated memory resources, and will include virtual processing cores that translate instructions in the hosted operating environment 106 (e.g., workloads 107) to be executed on corresponding underlying commodity processor cores usable to perform computations. Although in FIG. 1 a one-to-one correspondence between virtual processing cores and native cores is illustrated, a many-to-one correspondence could be used as well. Furthermore, although various native cores could be used in a particular implementation, in a particular implementation a processing core is used that is compatible with an Intel x86-based instruction set architecture. Such an architecture is described in the Intel 64 and IP-32 Architectures Software Developer's Manual, incorporated herein by reference in its entirety and available at http://www.intel.com/content/dam/www/public/us/en/documents/manuels/64-ia-32-architectures-software-developer-instruction-set-reference-manual-325383.pdf The intelligent processor module 108, includes aspects of instruction translation/emulation, but where possible utilizes native features of the commodity platform 102 in a number of ways. For example, in some embodiments, the intelligent processor module 108 is dissociated from low level memory management. For example, the intelligent processor module 108 can operate in a direct addressing arrangement and can rely on the underlying commodity operating system 104 to manage paging functions associated with that memory. Accordingly, much like a workload will rely on an operating system and host platform to manage memory access details, the intelligent processor module 108 and hosted operating system 106 can rely on the native operating system 104 and commodity platform 102 to manage memory and I/O access according to the architecture of that system. In this way, the intelligent processor module 108 represents an emulator to the extent that it hosts non-native software, but avoids attempts to directly manage a reserved memory area allocated to that area. Because of this dissociation between the intelligent processor module 108 and memory management, system memory of the commodity platform 102 can be dynamically associated with, or disassociated from, the process in which the intelligent processor module operates on the commodity platform 102, greatly improving flexibility of operation of such virtualized workloads and allowing memory allocation to change during runtime, rather than requiring all memory allocation to occur at a time that a partition hosting a virtualized system is instantiated. Details regarding memory arrangements and addressing are provided in greater detail below in connection with FIGS. 2-10.

In example embodiments, the intelligent processor module 108 will have various characteristics that allow it to exploit both the advantages of direct addressing and tagged memory as well as direct usage of underlying hardware resources. In particular, arithmetic operations performed in the instruction set architecture implemented by the intelligent processor module 108 are ported by that module to be directly executable by the corresponding arithmetic/logic units of an underlying commodity processor. In addition, the intelligent processor module 108 is implemented including a full instruction set architecture and capable of supporting, among other features, dynamic and modular update, enhanced security models, transactional memory, continuous processing, clustering, virtualization, and fabric awareness.

The hosted operating system 106 generally corresponds to a low-level process that can be executed within the context of the native operating system 104. Although the present disclosure relates primarily to operation of the intelligent processor module 108, it is recognized that some interdependency with the hosted operating system 106 necessarily implies some specific requirements of that environment when it executes on a commodity platform. For example, the hosted operating system 106 is constructed to allow for updates without system reinitialization; for example, the hosted operating system 106 allows for quiescing of interfaces prior to updates to an intelligent processor module 108. When an update message is received, the queues are detached, the module is updated and/or restarted, the new module attaches to the interface queues, and system operation is resumed. Accordingly, rolling updates can be used to update all modules of an operating system from the time it is brought up to the time it is retired.

In example embodiments, the hosted operating system 106 is self-tuning regarding the requirements of the workload as applied by the intelligent processor module 108. If the current workload is such that only a few cores are required, the hosted operating system 106 can save off the processors that are not needed. When the workload increases to where the current number of processors is insufficient, the hosted operating system 106 can dynamically ready additional processors to accommodate the load. Furthermore, the hosted operating system 106 supports virtualization of various types of devices.

In some example embodiments, the hosted operating system 106 is capable of allocating a file in fabric connected storage, laying down a partition table within the file, and mounting the file as a disk. Using copy commands, the hosted operating system 106 would build a new disk for a dynamically deployable system, to allow it to deliver the software installation environment to a target (including a remote target, assuming the system from which it is being pushed has sufficient security rights on the target.)

In the embodiment shown, the hosted operating system 106 will run on top of the intelligent processor module 108 and provide a framework in which other applications can be hosted. This framework can take advantage of the native environment on which it is built, and the hosted operating system 106 manages the resources of the environment. Additional details regarding interaction of the hosted operating system 106 and the intelligent processor module 108 are provided below, following further discussion of operation of the intelligent processor module and associated memory management techniques in connection with FIGS. 2-12.

In some embodiments, one or more associated modules, including data module 110, can be created which are supported by the native operating system 104 and which provide an interface to data outside of the hosted operating system 106, for example data in an external memory, or based on I/O operations. Other modules can include specific I/O or service modules communicatively connected to the intelligent processor module 108 via message queues.

Figure 2:
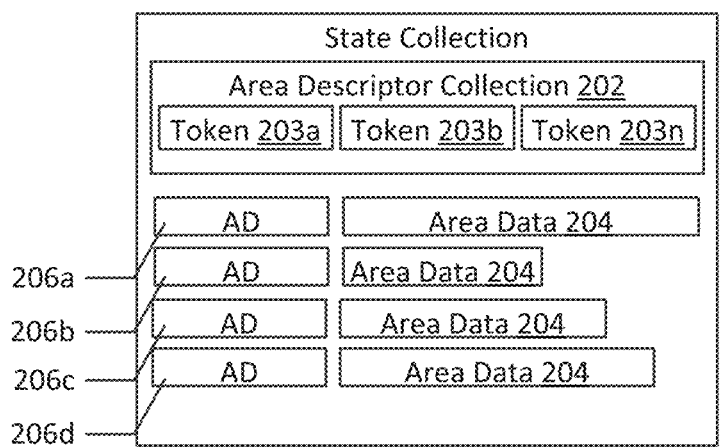
FIG. 2 illustrates an area descriptor collection usable in the secure migratable architecture of FIG. 1, according to an example embodiment.

Referring now to FIG. 2, a memory state 200 is shown that includes an area descriptor collection 202, which is usable in the secure migratable architecture of FIG. 1 according to an example embodiment. Generally, and as noted above, existing E-mode code from Unisys Corporation utilizes a four-bit tag associated with each word of memory. The value of the tag identifies what the data represents. Examples include single precision data, double precision data, code, uninitialized data, untouched area, stack environment words, and many others. However, in the context of the present disclosure, a new tag arrangement is contemplated in which an eight-bit tag is used, allowing for both backward compatibility with the four-bit tag and implementing a large number of additional tag types to identify types of data to the hosted operating system 106 and intelligent processor module 108. Although in some contemplated embodiments, one byte per tag is used, in alternative embodiments other tag lengths may be used as well.

In the embodiment shown, a memory is arranged in a set of areas 204, each of which has an area descriptor 206 (shown as example area descriptors 206a-d) in the area descriptor collection 202 that describes the area. Each area descriptor is referenced by a token 203 (example tokens 203a-n shown) that is used when referring to a specific area descriptor within the area descriptor collection 202. Each area descriptor 206 in the area descriptor collection 202 is associated with a address of the location of the base of the data in the area.

In example embodiments, the tokens 203 can be 56 bits in width, and are not reused. Each token 203 is included in the area descriptor collection 202, and references an area descriptor. However, because, in comparison to legacy MCP architectures no actual memory management is required (that is handled by the underlying commodity processor included in the commodity platform 102), there is no requirement that the area descriptors be included in a table. Rather, area descriptors are simply maintained by the intelligent processor module 108. The hosted operating system 106 can manage active tokens in another type of memory storage arrangement, such as an array, table, structured list, or other memory structure.

Compared to existing area descriptors in E-mode and MCP architectures, in such systems the area descriptors are associated with a virtual address in an address space that uses an area descriptor token and offset, with the token representing an index to a table. In the current embodiment, the token 203 does not index a table, but rather simply resides in the area descriptor collection 202 and references an area descriptor (which in turn references a memory area). The tokens 203 are managed by the intelligent processor module 108, and if an area of memory is freed, that area is returned to hosted operating system 106. In the context of the present disclosure, such tokenization, but avoidance of indexed access, removes the requirement of managing paged arrays as compared to the MCP environment, because each array is unpaged and contiguous. Any paging that is performed would occur in the commodity platform 102. Furthermore, although in the present application the tokens are described as being organized in a table structure, in alternative embodiments, other types of memory structures in which the token 203 can be stored are possible as well.

It is further noted that use of such a memory access abstraction provides additional advantages. For example, in some embodiments of the present disclosure, the intelligent processor module 108 may use a simpler addressing scheme than in existing MCP systems. For example, while an Intel-based processor uses byte addressable memory, MCP systems traditionally use word-addressable memory. According to aspects of the present disclosure, the intelligent processor module 108 will provide byte-addressable memory, reducing friction between it and typical commodity platforms.

In addition, in example embodiments such as that shown, requirements for the intelligent processor module 108 to perform paging, as is required in E-mode, are eliminated, with all memory being contiguous from a lowest address to a highest address, and implemented using full 64-bit addressing (as compared to 39 bits usable for addressing currently used in E-mode, for addressing E-mode words in existing memory addressing schemes).

A further advantage of the memory management features of the present disclosure is an elimination of a requirement for a large, contiguous chunk of memory to be allocated to a hosting process, such as a virtualized partition. In accordance with the present disclosure, memory allocated to the process that includes the intelligent processor module 108 need not be allocated a large contiguous section of memory; rather, each process receives a large virtual address space. Further allocations need not be contiguous, since each is managed by the underlying native operating system 104 that allocated the memory. In addition, security advantages are realized, because there need not be any requirement to share memory privileges with external entities requiring access; read only, write only, or other limited access can be granted instead, by the underlying native operating system 104.

Figure 3:
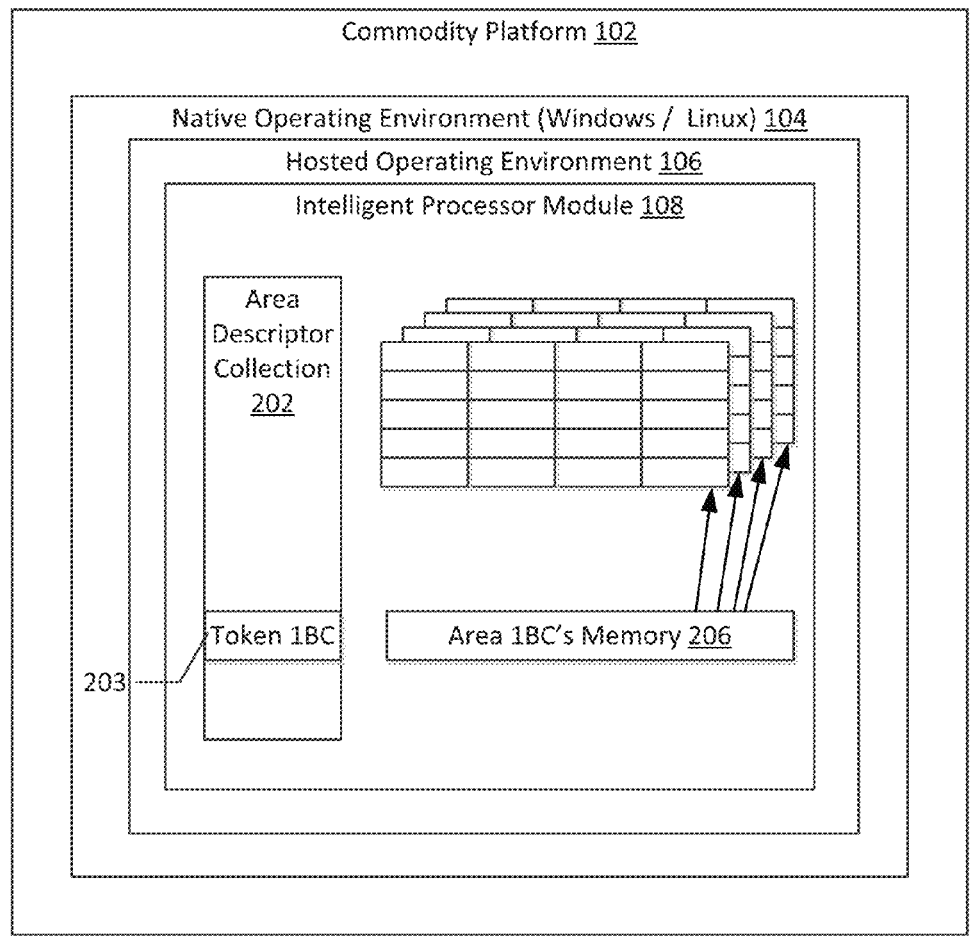
FIG. 3 illustrates a correspondence between area descriptors used by the secure migratable architecture and an underlying virtual addressing memory area.

A specific arrangement illustrating a correspondence between area descriptors used by the secure migratable architecture and an underlying virtual addressing memory area is illustrated in FIG. 3. In this arrangement 300, an area descriptor collection 202 includes a token 203, which in turn provides a reference to an area descriptor 206 associated with a specific area of memory. That area of memory is stored in connection with its attributes based on the area descriptor 206, which includes a number of bytes of memory are included in the area. The base of the segment represents a virtual address within the underlying native operating system 104 and as managed by the commodity platform 102. The intelligent processor module 108, on the other hand, accesses data in the memory area by the token 203, but does not know its address as managed by the native operating system 104. Rather, the paging mechanisms of the underlying native operating system 104, and commodity platform 102, can be used to access the appropriate location in memory, which may include a paged, virtual address.

It is noted that in some instances, in the hosted operating system 106 it may be important to allow for a memory dump of memory associated with the intelligent processor module 108. Such a memory dump could be performed, for example, by walking through the area descriptor collection 202, and writing the contents of all memory areas to disk. Alternatively, a process dump could be performed in the underlying native operating system 104, which would obtain an entire underlying virtual address space used by the intelligent processor module 108 and its internal state.

In addition to the above advantages of directly-addressed memory, it is noted that additional optimizations can be incorporated into the process that implements the intelligent processor module 108, in various embodiments. Such optimizations can lower the difficulty or overhead of implementing a non-native instruction set architecture on a commodity platform, in particular with respect to data types, data access, and memory configurations.

In some specific embodiments in which the non-native instruction set architecture implemented by the intelligent processor module 108 is similar to an MCP-based architecture, it is noted that a concept of tagged memory may be implemented. In a tagged memory implementation, tags are used that identify a memory word as a specific type or kind of word. In the existing MCP-based architecture, a four-bit tag was used, to define memory words of various different types. In embodiments described herein, a one-byte tag is contemplated, allowing for increased identification of data types in memory. In particular, use of tags in memory allow the intelligent processor module 108 to have insight as to the type of data stored in memory, e.g., a bytes, words, double words, floats, doubles, quad words, ASCII, BCD, Unicode, Int8, Int16, Int32, Int64, unsigned variants thereof, or objects. These can include larger data types, such as 256 bit, 512 bit, or large data types (e.g., big integers, etc.). In addition, some tag values can be reserved, to allow the intelligent processor module 108 to be modified to accept future data types, which may allow the module to match underlying arithmetic formats of future commodity platforms 102 as instruction set architectures of such platforms continue to expand to support larger data or more complex expressions.

In addition, in some embodiments the intelligent processor module 108 can be implemented such that its memory addressing is at a byte level, rather than at a word level as is the case for MCP-based systems. Furthermore, because in legacy systems memory is written including a tag portion in an upper portion of a 64 bit chunk with data written in a lower (typically lower 48 bit chunk) of that same data word, there is a drawback of not having contiguous data, but rather requiring words to be split apart and repacked together if and when adjacent words are used. This adds inefficiency in typical MCP-based emulated environments, and violates an assumption made by commodity systems that successive data bytes are at adjacent addresses. In accordance with the present disclosure, storage of tags and data are decoupled, but remain associated with one another. For example, data values stored at adjacent addresses are contiguous, but the areas will still be tagged on a word-by-word basis. The word size will increase to 64 bits of data, and the tag will be external to that data. For every 64 bits of data, one byte of tag memory may be required. So for an area that is 32 64-bit data words in length, two areas are required, one that is 32 64-bit words in length for the data, and one that is 32 DIV 8=4 64-bit words for tag memory. This can be accomplished by allocating a single area and grouping all tags in one location of the allocated memory, either at a base or high-address end of the allocated memory area.

in a still further possibility, two separate segments could be allocated, one for tags and another for data. The area descriptor referenced by a token 203 in the area descriptor collection 202 will then store and link the separate locations for the tag and data. In this arrangement, I/O operations become simplified, because the tags are sequentially organized in an area of memory separate from the data, and therefore a common operation (setting tag values to zero) can be accomplished by an efficient operation, e.g., by a memset operation, available from the underlying commodity platform 102.

In many cases, tags associated with data in a specific area are the same. Accordingly, in some embodiments, the intelligent processor module 108 can be configured such that a single tag can be associated with a memory area, and applies to every unit of data within that area. In this case, referred to herein as a "UniTag", a single value is used and therefore there is no requirement of a separate tag segment with a separate virtual address; rather, the UniTag can be stored as part of the memory descriptor. It is noted that such UniTag areas may be usable for data storage, but are unlikely to represent a stack or other data structure managed by the intelligent processor module 108 which are likely to represent a plurality of different data types.

Accordingly, in such embodiments where a UniTag area is implemented, a tag check is only required once for that area, and data movement operators performed by the intelligent processor module 108 then gain efficiency because those operators, as implemented in a translated commodity instruction set, do not require checking of each word for a tag prior to updates. Furthermore, during allocation, two UniTags could be used that refer to the same virtual addresses in different ways (e.g., as 8-bit unsigned data or 32 bit unsigned data). Accordingly, different software could reference the same data differently.

In addition, use of the UniTag concept in the intelligent processor module 108 provides advantages for I/O operations as well. Because I/O operations tend to only transfer sequential data, no tags are required to be transferred. If different systems require access to the data differently, the area descriptor associated with the area to which received data is stored can be cloned as noted above, with different area descriptors referencing the same area.

To add a new area descriptor to the collection including such a token, an allocation operation, e.g., Allocate AD, can be used, which indicates a length of the memory area that is supported by the area descriptor in bytes, and whether to use a UniTag format. In such arrangements the intelligent processor module 108 will obtain an unused area descriptor token 203, allocates an area, and sets a tag value (or UniTag) value accordingly. UniTag areas are initialized, and tagged areas are initialized, and tag areas are written with predetermined values that indicate that the firmware has knowledge of the type of tag arrangement and that the area has been initialized. For example, UniTag areas can be initialized to zero, and tagged areas can be initialized to any other value known to the hosted operating system 106. This provides additional security, by identifying and distinguishing between tagged and UniTag areas, and preventing the system from writing across applications (e.g., from a UniTag area to tagged areas, or vice versa).

To free a descriptor, a Free AD operation can be used, with the operation receiving the token to be freed. The intelligent processor module 108 would proceed to remove the token 203 from the active descriptor collection 202, and subsequently return the memory in use by the area descriptor 206 to the operating environment (i.e., back to the commodity system).

It is noted that in some implementations, any attempt to dereference a tagged item (like a stack word) which has not been explicitly set to a value, results in an interrupt. Also, when an area is freed, it is put into a queue and a background process zeroes out the memory area prior to deallocation. This foils a technique where a hacker allocates an area of memory, and inspects the garbage that is left over from whatever it was used for previously.

In example embodiments, the intelligent processor module 108 further supports an indivisible read-modify-write cycle, or Readlock. In example implementations, Restricted Transactional Memory (RTM) present in Intel's Broadwell and later processors may be used. The read-modify-write cycle can be accomplished as a transaction, using interlocked primitives (e.g., an interlocked add or other modification operation) to ensure data integrity. Accordingly, the underlying physical processor guarantees the atomicity of such a cycle. Other options usable by an intelligent processor module 108 to provide the indivisible read-modify-write cycle are critical sections, semaphores, and mutexes to protect the code from simultaneous execution.

Referring to FIGS. 1-3 generally, it is recognized that the memory access techniques described herein, as well as the primary conception of the intelligent processor module 108 as providing an execution environment for MCP workloads on Intel-based commodity processors, implies design choices regarding specific implementation of the instruction set architecture embodied in the intelligent processor module 108. For example, due to simplicity of addressing, it would be straightforward to either instantiate a very deep stack, or to otherwise create a large set of registers (e.g., 1024 registers) to allow for flexible data manipulation as compared to existing MCP architectures which are traditionally limited to simulation of Display Registers (Environment registers), S (Top of stack register), F (Historical Chain register), Control State (Interrupt Enable flag), External Flip-flip, Overflow Flip-flop, and the True-False flip-flop. In still further embodiments, a set of registers could be allocated, in virtual form, to each stack, which can be leveraged for faster access. Accordingly, in at least one implementation, a stack is used for state input and output for the operator set, but a register file is used for optimizing execution of operators which act upon the stack.

In some embodiments, various operators can be provided by the instruction set architecture exposed by the intelligent processor module 108 that improve correspondence to underlying native architectures as compared to existing E-mode or MCP-compatible architectures. For example, the intelligent processor module 108 can utilize the time handling and random number generation features of the underlying architecture, which may otherwise be handled, in non-native (hosted) systems using different standards. Other types of modifications to existing instructions may be exposed as well by the intelligent processor module 108.

Referring now to FIGS. 4-11, examples of memory access operations using the processing and memory configurations described above are provided, illustrating operation of the intelligent processor module 108 in example embodiments, and highlighting aspects of the features described above. In each of the embodiments discussed herein, area descriptors, such as those shown in FIGS. 2-3, are used to access underlying memory structures in a variety of ways. It is noted that, irrespective of the memory format, the associated area descriptors will encapsulate all of the information associated with that area descriptor, including state information, base virtual address information, and length of the area (in bytes) will be included. In the case of a UniTag area descriptor, tags for data contained within the area are also included (indicating whether the area is associated with a particular type of data, e.g., 8-bit unsigned, 16-bit signed, 32-bit unsigned, 64-bit unsigned, etc. In case UniTag is not used, a specific tag area is included that specifies a tag of every 64-bit entity included in the area is provided (seen, for example, in FIG. 5).

In some embodiments, an area descriptor (e.g., area descriptor 206) can reference any location in the virtual address space allocated to the process that hosts the intelligent processor module 108. Accordingly, the address and length are set to be described with 64-bit length areas. Accordingly, it is possible for a token associated with any area descriptor to reference classic E-mode memory within a contiguous area, via an offset.

Additionally, in some embodiments the area descriptor can support description of attributes other than address, length, and type. For example, information about the memory device on which the allocated memory is provided could be stored, for example indicating to the intelligent processor module 108 that an allocated memory area is part of a memory space designated as part of an NVRAM device. This allows the intelligent processor module 108, or software stored thereon, to intelligently select to read/write data to specific areas of memory, for example to provide memory-speed runtime logging for audit purposes.

In still further embodiments, the area descriptors can include other attributes as well, for example an attribute regarding replication of memory across host computing systems. The operating system 106 can request that a new area be replication-enabled, and provide the necessary information that enables the firmware to replicate an area of memory to one (or more) remote machines. This provides a very high speed, low latency way of replicating critical system and application data selectively by marking an attribute associated only with specific tagged data. Furthermore, in the event a program on a particular host experiences a severe error and is halted, another host has an exact image of the state of that program at the time of system interruption that could be continued on that replicated host, with a reasonable, if limited, transaction history. Additionally, access control lists could be implemented using area descriptors, providing user access and read/write permissions.

Figure 4:
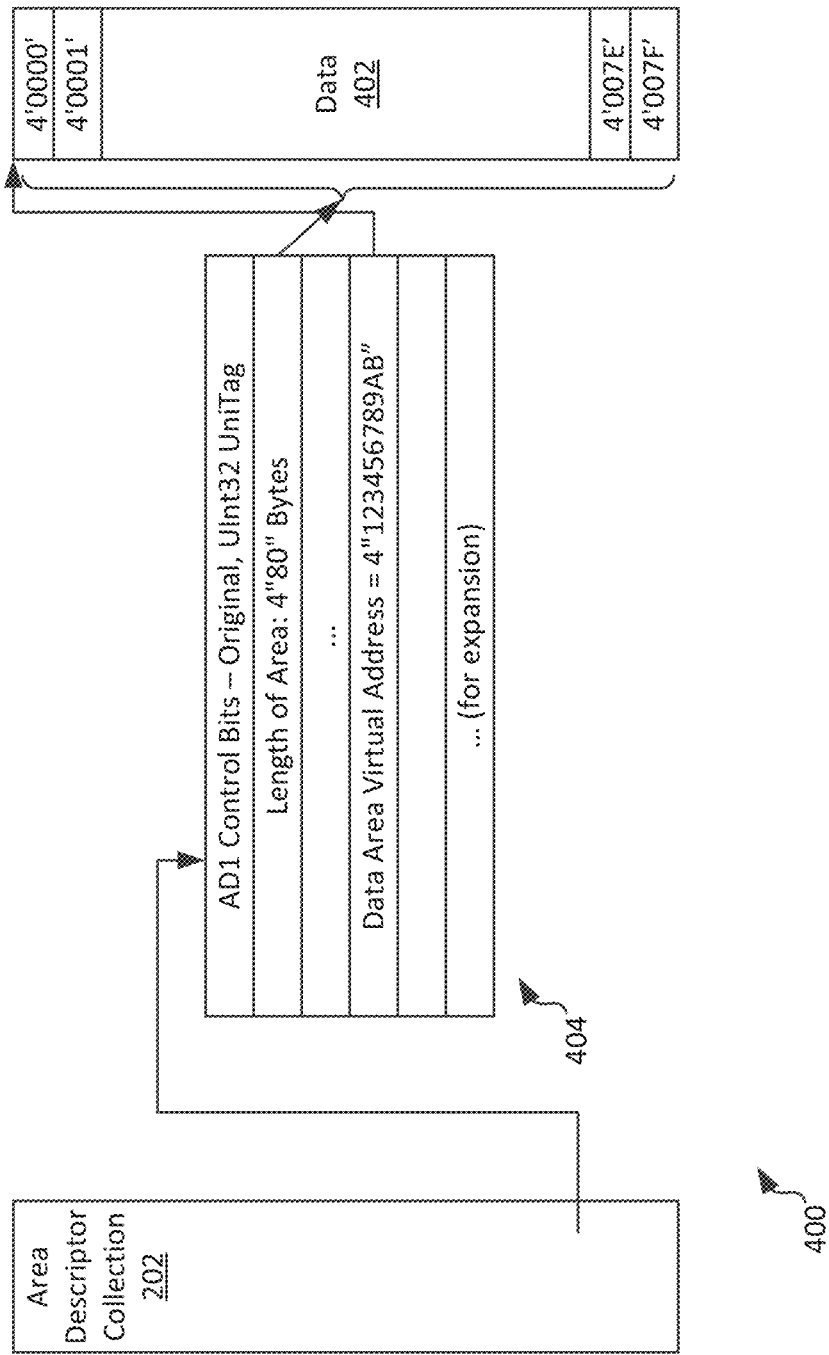
FIG. 4 illustrates processing of a memory operation in an area of tagged memory sharing a single tag, according to an example embodiment.

Now referring specifically to FIG. 4, a logical diagram 400 illustrating processing of a memory operation in an area of tagged memory sharing a single tag is shown, according to an example embodiment. In the diagram 400 as shown, an example allocation of a data area 402 is shown, in which an area descriptor is allocated to an unsigned 32 bit data area that is 128 bytes in length. When a new memory area is to be allocated, an allocate area descriptor operator is invoked, with arguments defining the area to be allocated. If the memory area is to be explicitly tagged (rather than UniTag), the length must be modulo 8, as tags represent the tags of 64-bit words. If the memory area is to be associated with a UniTag (as seen in FIG. 4), the length of the area would be modulo the width of the entity the UniTag represents.

In the example shown in FIG. 4 in which a request is made for a 32-bit unsigned area and the length in bytes is requested as 128 bytes, the allocation operator would be executed providing the length in bytes required which is modulo 4 (because 32-bit unsigned items require 4 bytes per item), an indication of a UniTag area, and the tag value corresponding to 32-bit unsigned datum. The operator returns an area descriptor (AD) token (included in the area descriptor collection 202) assigned, and an area descriptor 404 includes control bits (defining attributes of the memory area), a length, and data area virtual address indicating a location of the data.

Figure 5:
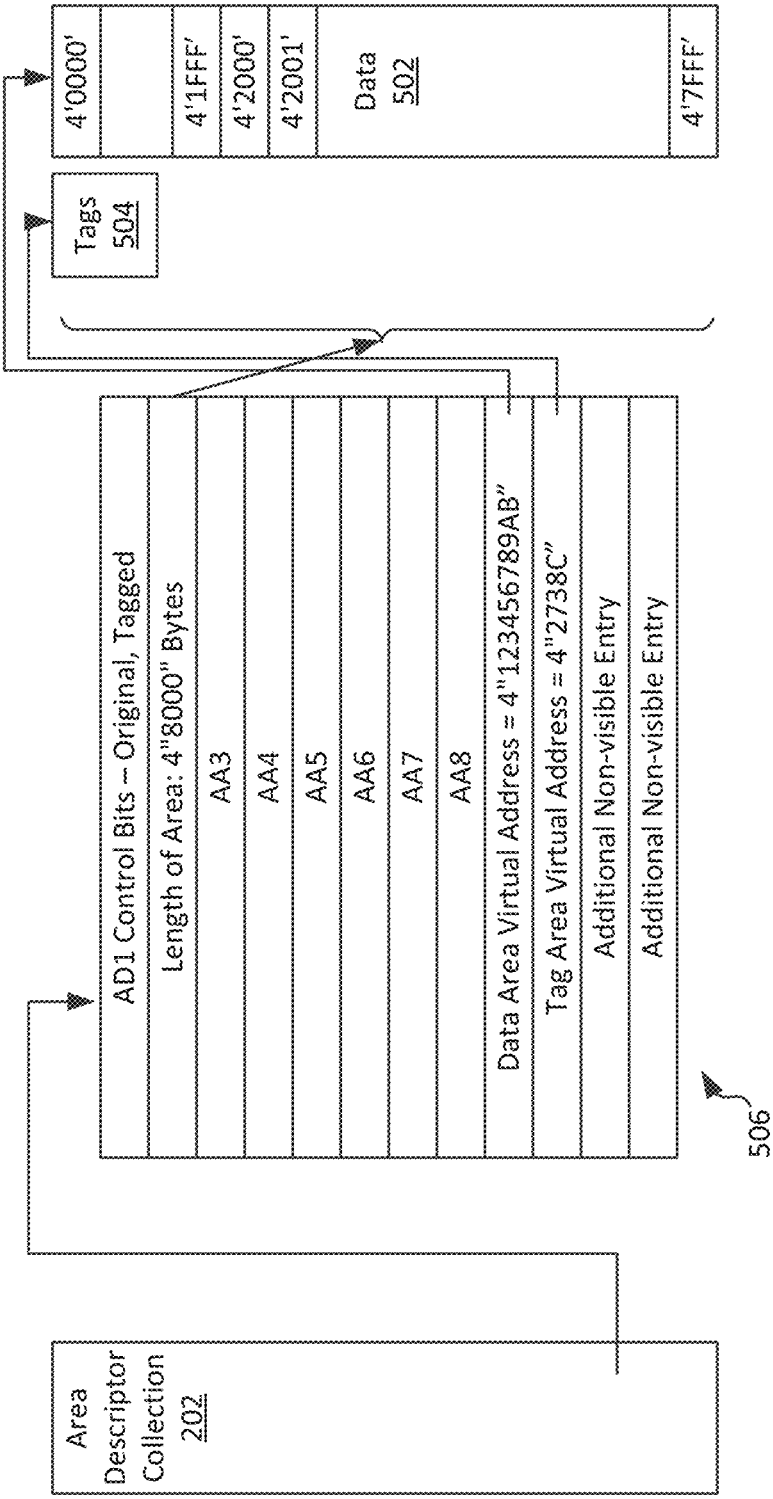
FIG. 5 illustrates processing of a memory operation in an area of tagged memory in which tags are associated with each area of memory, according to an example embodiment.

By way of comparison to the diagram 400 of FIG. 4, FIG. 5 illustrates processing of a memory operation in an area of tagged memory in which tags are associated with each area of memory, according to an example embodiment. In this example, a separate memory area 502 and a tag area 504 are allocated in response to a request for a tagged area of 32K bytes in length. Accordingly, the generated area descriptor 506 includes control bits identifying the type of area allocated and the length of the area, with subsequent area descriptors being associated with different tagged areas. Since each of the tagged areas are 64 bit units, a 32 k area is modulo 8 (using eight bit tags). Furthermore, each area may include an area descriptor, indicating associated contents of that area. In the example shown, eight attribute words (AA1-8) are provided, with attribute words 1-2 being used for control bits and length, and attribute words AA3-8 representing additional words that can describe other attributes of the area. Additionally, a virtual address identifying the data area, and a tag area virtual address are shown (in the instance where tags are stored separately from the data, in a tag area of area descriptor collection 202 as noted above).

In some embodiments, backwards compatibility with previous tagged memory architectures is provided by reserving specific tag values, and recognizing that in some circumstances tags will be included with data in an upper part of a data word. For example, to maintain compatibility with legacy MCP architectures, tags may be located both in a tag area 504 and in upper bits of each data word.

It is noted that, as used by the intelligent processor module 108, memory areas will be addressed by way of area descriptors, which have virtual addresses and lengths managed by the underlying native architecture. Accordingly, an address width of 64 bits and segment offset of 64 bits can be used to identify and address a memory space of an underlying processor, without using the virtual addresses of that underlying memory space, because those virtual addresses are not exposed to the hosted operating system 106 or workloads executed on the intelligent processor module 108. Only area descriptors and offsets within such area descriptors are known to the intelligent processor module 108. As such, the intelligent processor module 108 can use a reference to specific data, which will include the area descriptor and offset to reference a specific memory location as well as the associated tag for that memory location.

In example embodiments, the intelligent processor module 108 can generate a reference that points to a specific byte address within an area, based on the area descriptor token and an offset from that token. The reference includes a tag control byte that specifies the tag which is applied to the target, particularly in instances where the tag applied is stored in a location different from the data in the memory area. Use of the tag control byte describes the shape of the data pointed to by the reference, for example describing the type of data pointed to by the reference. The tag control byte can be included in a reference as a subset of bits within a 64 bit word alongside the area descriptor token, with the area descriptor token taking 56 bits and the tag control byte residing in the remaining 8 bits. A corresponding 64 bit offset completes the reference.

In various embodiments, tag control bytes can take a variety of values, depending on whether the tag is associated with each memory location, or whether associated with a UniTag configuration. In some embodiments, a UniTag value cannot be equal to or less than F (15), as those tag values are reserved for backwards compatibility with E-mode (which requires each memory location to be tagged). A tag can handle any possible tag value, but because tag values 0x0 through 0xF are a backwards compatible format which are all of the same shape, and are found only in tagged areas, the values from 0x0 to 0xF for additional meanings, as reflected in the reference tag control table below:

| Value | Meaning |
|---|---|
| 0 | Void: Address reference only |
| 1 | Tagged Format |
| 2-15 | Reserved for Expansion |
| UniTag | UniTag value to apply to target |

In addition, although disclosed herein as having tags of one byte in length, it is recognized that tag width is not limited to or tied to a byte length, but rather could be arranged in various sizes. Furthermore, tags can simply be referenced in an incrementing manner (e.g., tag, tag+1, etc.). This is because tags can be instantiated in a variety of data lengths (e.g., byte, word, dword, qword) and tag pointers can be incremented by one to advance in memory by an amount corresponding to the data length of the instantiated tag. Accordingly, tags can simply be arranged to be of a constant size corresponding to a size of a predetermined data type, and such varying tag sizes are treated equally within the system as disclosed.

In connection with this memory tagging scheme, a reference with a tag control value of void would be a pure address pointer, with no width, but pointing to a specific offset within an area descriptor. Such a void tag can be created, but not dereferenced to read or write data, as it does not specify a shape (e.g., length) for the data to be read or written, as a security feature. Void references may be later cast to a reference with a format (i.e., having a different tag value) and dereferenced.

It is noted that a common problem in existing computing systems is the lack of protection on pointers. However, using the tagging scheme discussed above, all references must be created after the memory locations which they reference. This eliminates reference counting, and provides protection with very low overhead. Assuming AD numbers are never reused, if a reference is retained after the AD to which it refers is deleted, any attempt to dereference it will result in an error, as the referenced AD is no longer active and an interrupt will be generated.

Figure 6:
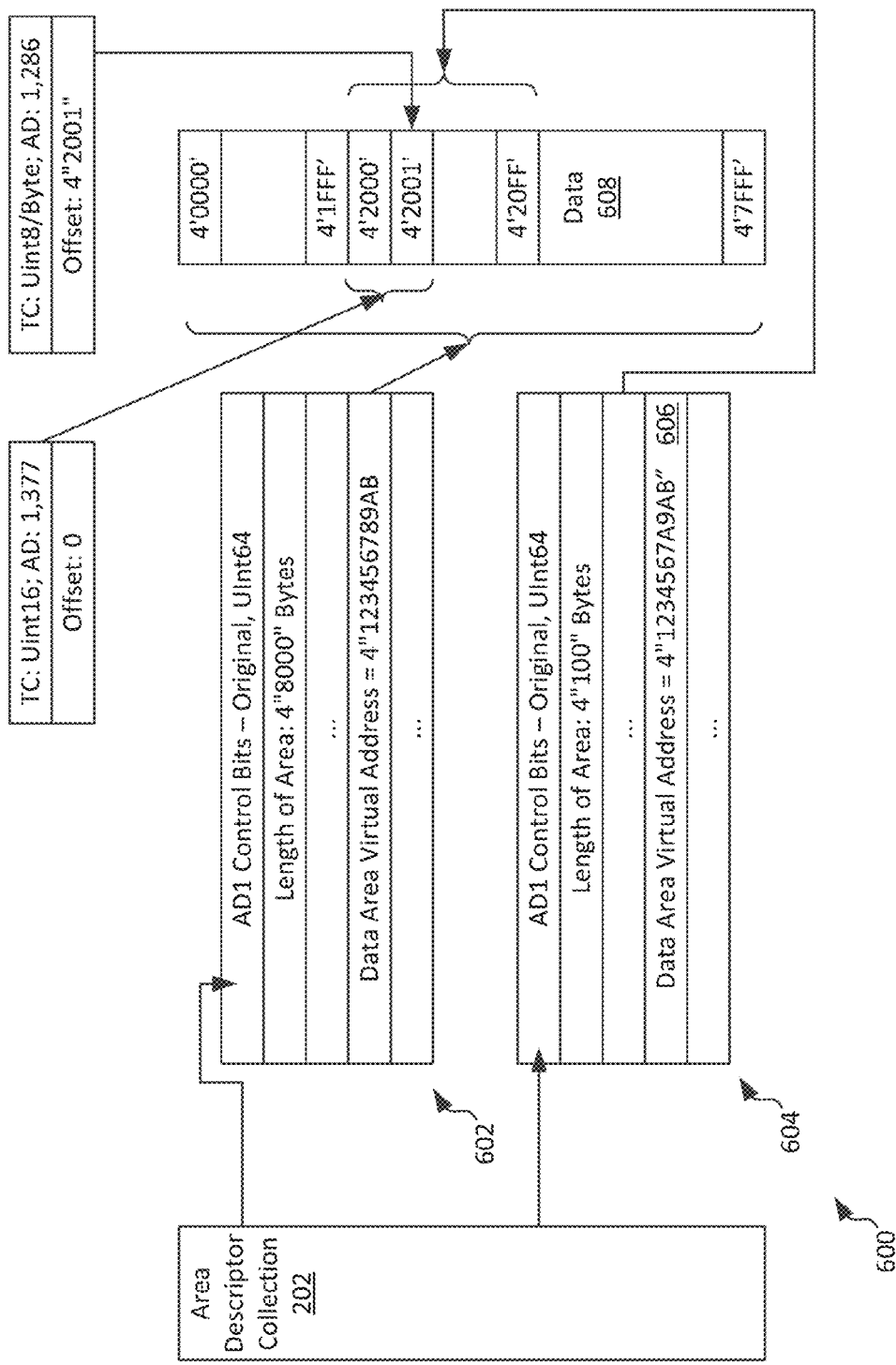
FIG. 6 illustrates addressing an area of memory using cloned area descriptors, according to an example embodiment.

Referring now to FIG. 6, an arrangement 600 for addressing an area of memory using cloned area descriptors is disclosed, according to an example embodiment. The arrangement illustrates an original area descriptor 602 created at virtual address 0x123456789AB with a length of 0x8000 bytes, as a UniTag area of 64-bit unsigned integer entities. A reference is created based off of this area descriptor token, having an offset of 0x2001 bytes from the base of the area descriptor, and a tag control byte indicating a type of 64-bits unsigned.

In the example shown, the area descriptor 602 is cloned, creating a cloned area descriptor 604. This cloned area descriptor 604 indicates a length of 0x100 bytes with an unsigned integer UniTag. The virtual address of the cloned area descriptor 604 starts 0x2000 bytes into the segment of the memory area 608 associated with the area descriptor 602. This clone points to a subset of the area owned by the area descriptor 602. A reference 606 can be created, that can, for example, point to a location with an offset of 0 and a width of 16 bits from the start of cloned area descriptor 604.

Accordingly, it can be seen that areas can easily be subdivided and referenced according to different widths, even when UniTag items are used.

Of course, in cases where traditional E-mode/MCP memory tags are used, such subdivision should be performed with consideration that tags are also included in the upper bits of each data word in memory, as well as in separate tagged areas as noted herein. Furthermore, for data integrity and security reasons, UniTag memory areas will not be subdivided or referenced using tagged memory addressing, and tagged memory will similarly not be addressed by a UniTag addressing scheme. It is noted that operators exist that can move data items from memory areas having a UniTag scheme into areas having a tagged scheme. In such arrangements the type and value of the item may remain the same, but the number of bytes used to contain the item may be different, due at least in part to the additional requirement of additional tag memory. However, movement of data items from tagged memory areas into UniTag memory areas is avoided to prevent casual capturing of tagged data in a UniTag area, which could compromise system security.

Figure 7:
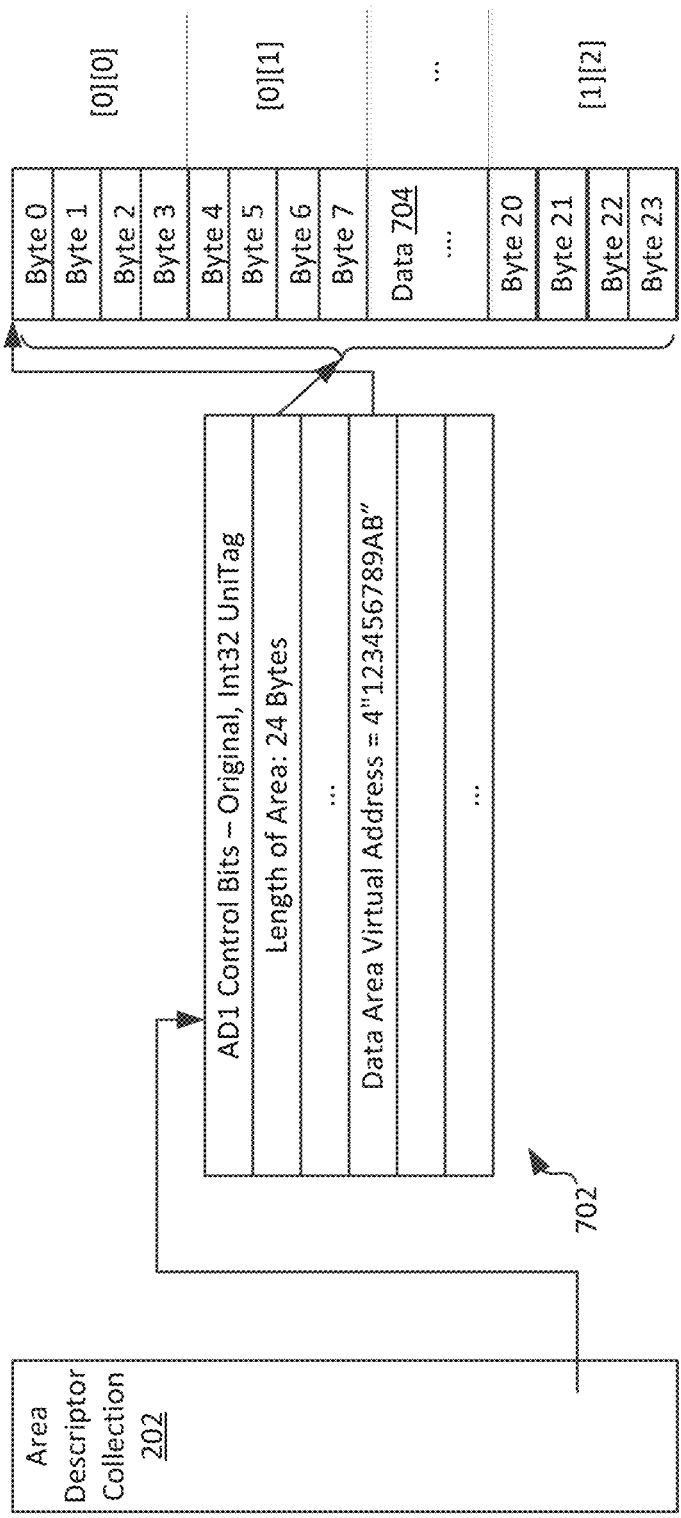
FIG. 7 illustrates addressing an area of memory using area descriptors associated with a memory having a single tag assigned thereto, according to an example embodiment.

FIG. 7 illustrates an arrangement 700 addressing an area of memory using area descriptors associated with a memory having a single tag assigned thereto, according to an example embodiment. In this example, a multidimensional array is illustrated, in which a next row is located immediately adjacent to a preceding row. For example, a table structure instantiated as "int table[2][3]" in C code describes an integer array with 2 elements in the first dimension and 3 elements in the second dimension. Such a structure corresponds to a two dimensional array, but in actuality represents a one dimensional array each of whose elements is an array. Elements are stored by rows, so the rightmost subscript, or column, varies fastest as elements are accessed in storage order. The storage order would appear as: table[0][0], [0][1], [0][2], [1][0], [1][1], [1][2]. This can be handled easily in the architecture discussed herein. A single area descriptor 702 is allocated with a UniTag specifying Int32 (32 bit signed integers) with a length of 6 entries*4 bytes/entry=24 Bytes. The offsets into the AD for each element is shown in the memory area 704. Accordingly, the C language is satisfied as the basic assumption regarding storage ordering is satisfied.

Figure 8:
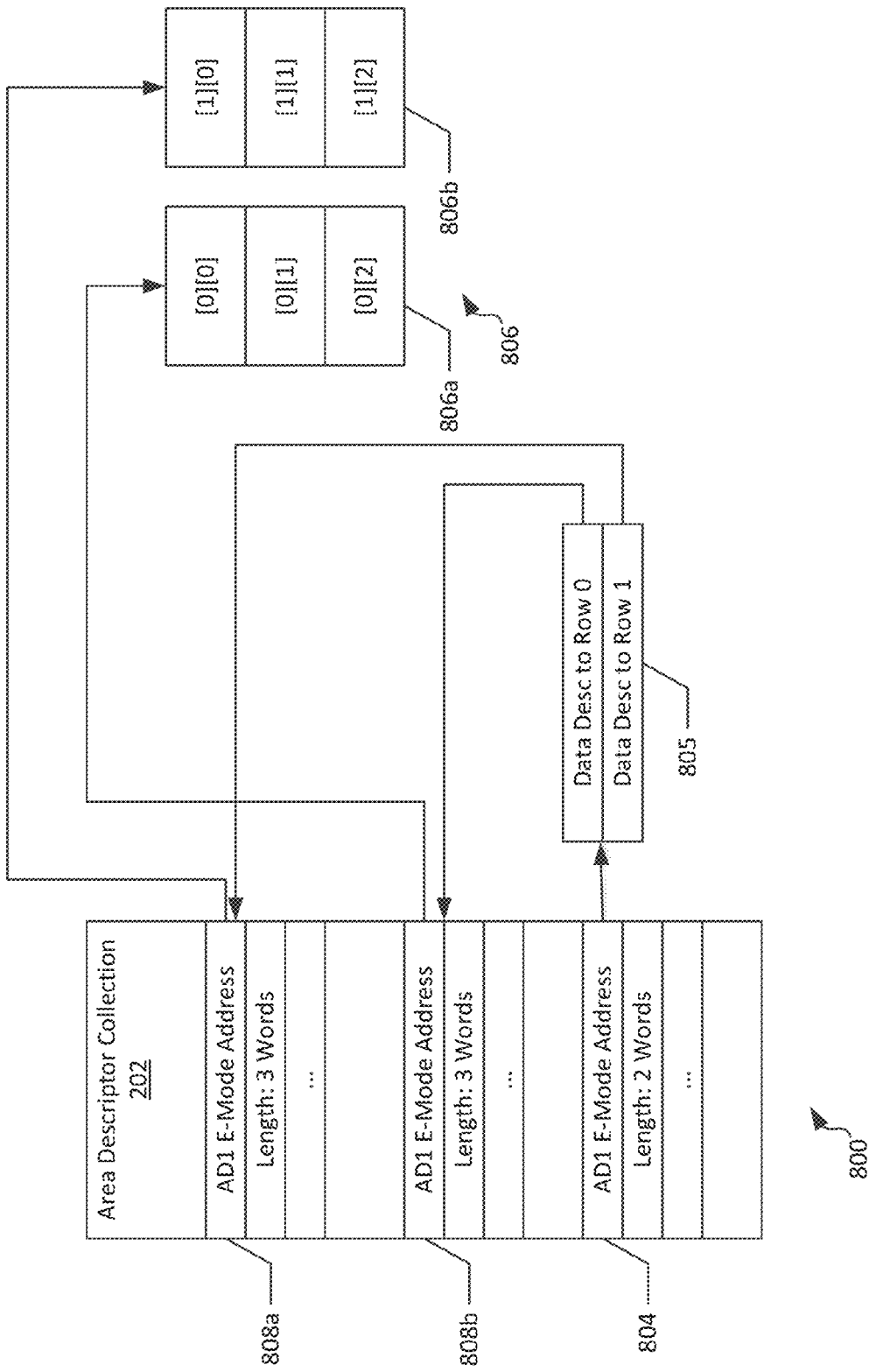
FIG. 8 illustrates example storage of array data in a non-contiguous memory storage format in E-mode code.
Figure 9:
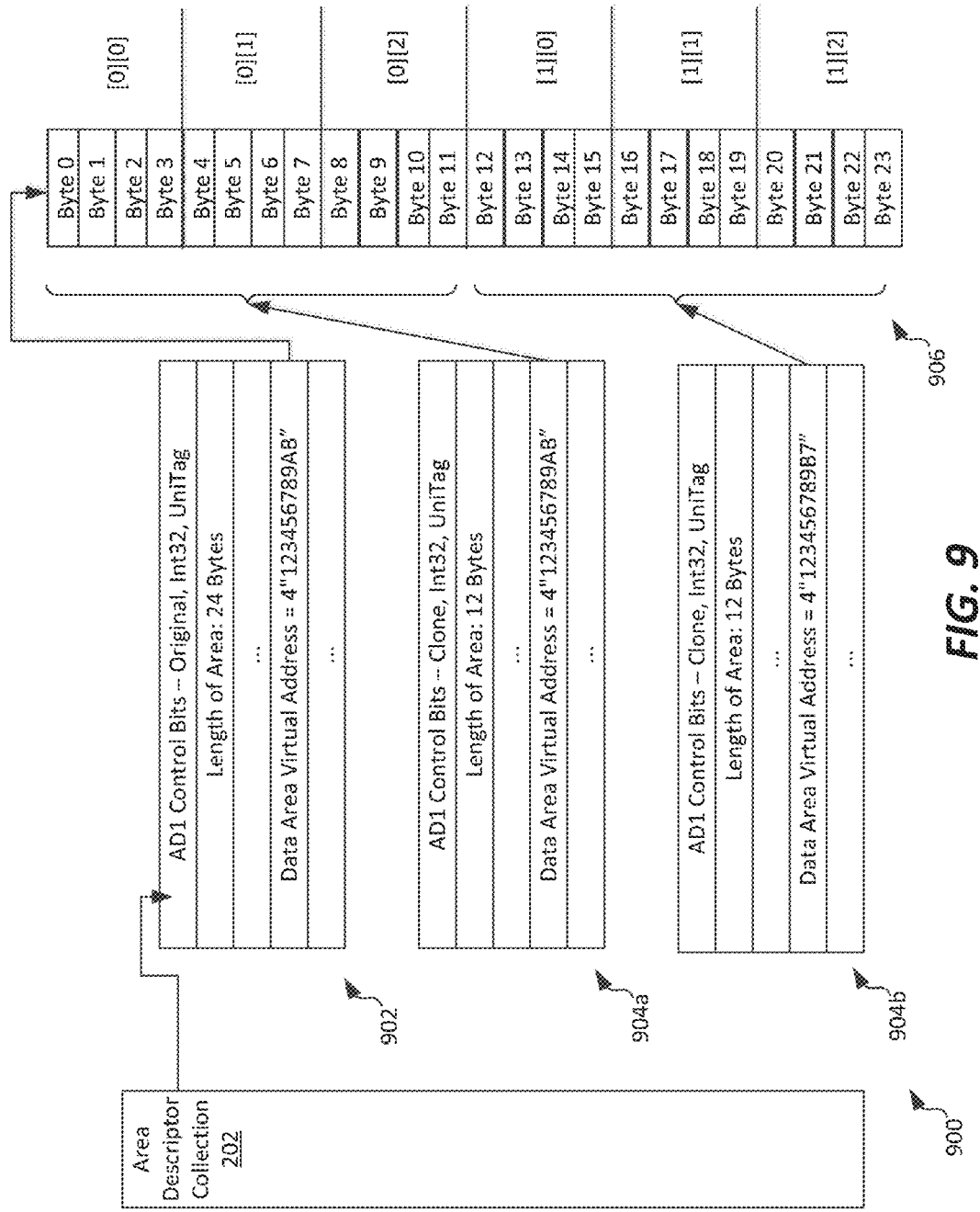
FIG. 9 illustrates an alternative (contiguous) data storage format that has an option for bounds-limit protections, according to embodiments of the present disclosure.

Referring now to FIGS. 8-9, arrangements in which code can be stored according to the tagged memory architecture of the present disclosure are described, which do not rely on ordered, contiguous array structures for multidimensional array memory structures. Initially, and as seen in FIG. 8, an arrangement 800 illustrating such a storage format (e.g., as is available in ALGOL-based storage formats, or other analogous non-C/C++ formats) in traditional E-mode code is shown. In this arrangement, multi-dimensional arrays 806 are stored in separate array rows 806a-b each with a separate area descriptor 808a-b. Such arrays are not contiguous in address space. Furthermore, languages like ALGOL do not require that all the array rows be identically sized:

In traditional E-mode, a page table 802 (a.k.a. dope vector) would be associated with the array. An array base descriptor 804 points to a page 805 with a descriptor for each page. In this case, a descriptor for row 0, and a descriptor for row 1.

In the format as shown, each row is protected from buffer overrun. For example, row 0 and row 1 each have set bounds defined in each associated area descriptor; any attempt to index beyond those bounds results in an interrupt being generated. In the C format, both rows are contained in a single area. The entire array has a set bounds, but the individual rows do not.

Referring to FIG. 9, an arrangement 900 illustrating multidimensional array storage according to the current architecture implemented in the intelligent processor module 108 is described. In this example arrangement 900, a contiguous array equivalent of the C array is shown. In this arrangement, a programmer may have the option between setting secured and unsecured structures, in which buffer overrun may be protected or not, based on programmer choice. If the programmer wants the added protection the architecture described herein can ensure that the programmer does not index a multi-dimensional array improperly, so the programmer could set a secure compile option. This would put each row in a separate area descriptor, and bounds checking would occur (e.g., via the structure of FIG. 8). In this arrangement, any attempt at dereferencing a pointer which went beyond the end of a row would generate an interrupt.

As is shown in the arrangement 900 of FIG. 9, an original area descriptor 902 represents the entire array, and is subdivided into two rows via the use of clone area descriptors 904a-b to access memory 906. The compiler could just as easily chosen to make two original area descriptors, one for row 0 and one for row 1. That would occupy one less area descriptor overall, but in that instance the code would have to "page switch" between the pages. Here, any page switching is handled entirely by the software, not the underlying architecture. E-mode page tables and pages are interlinked in a very rigid way, and the E-mode operators include features used to walk the structures to move across pages during their execution. By way of contrast, in the present architecture if paging is required, it is up to the software to provide whatever mechanisms are appropriate; the operator set only knows about area descriptors, which have a base and a length.

It is noted that although some types of code structures are scoped (i.e., limits-bound), this is the exception rather than the rule in current operating environments and current code structures (e.g., as implemented in C/C++). For example, concepts such as lexicographical levels tend not to exist, with all procedures created and handled equally. Such arrangements require consistency with legacy and mainframe systems which may have such lexicographical levels, and which may have size limits as to activation records due to bit limit sizes. Accordingly, in aspects of the present disclosure, although the intelligent processor module 108 will maintain a stack, the stack will be a word wide (64 bits) and include an accompanying tag byte. The stack will be associated with an area descriptor having a base virtual address and a length. Lexicographical levels can be maintained on the stack by way of cloned area descriptors, such as were described above. Because an area descriptor can be cloned and a subset of the original area descriptor referenced in the newly cloned area descriptor, the cloned area descriptor can represent an expanse of an activation record.

In addition, the intelligent processor module 108 can be configured to allocate a buffer, store data in the buffer, and pass that buffer to the hosted operating system 106 as a parameter for an interrupt. The hosted operating system 106 then would have the responsibility to free the area descriptor when it completes use of the interrupt data.

Figure 10:
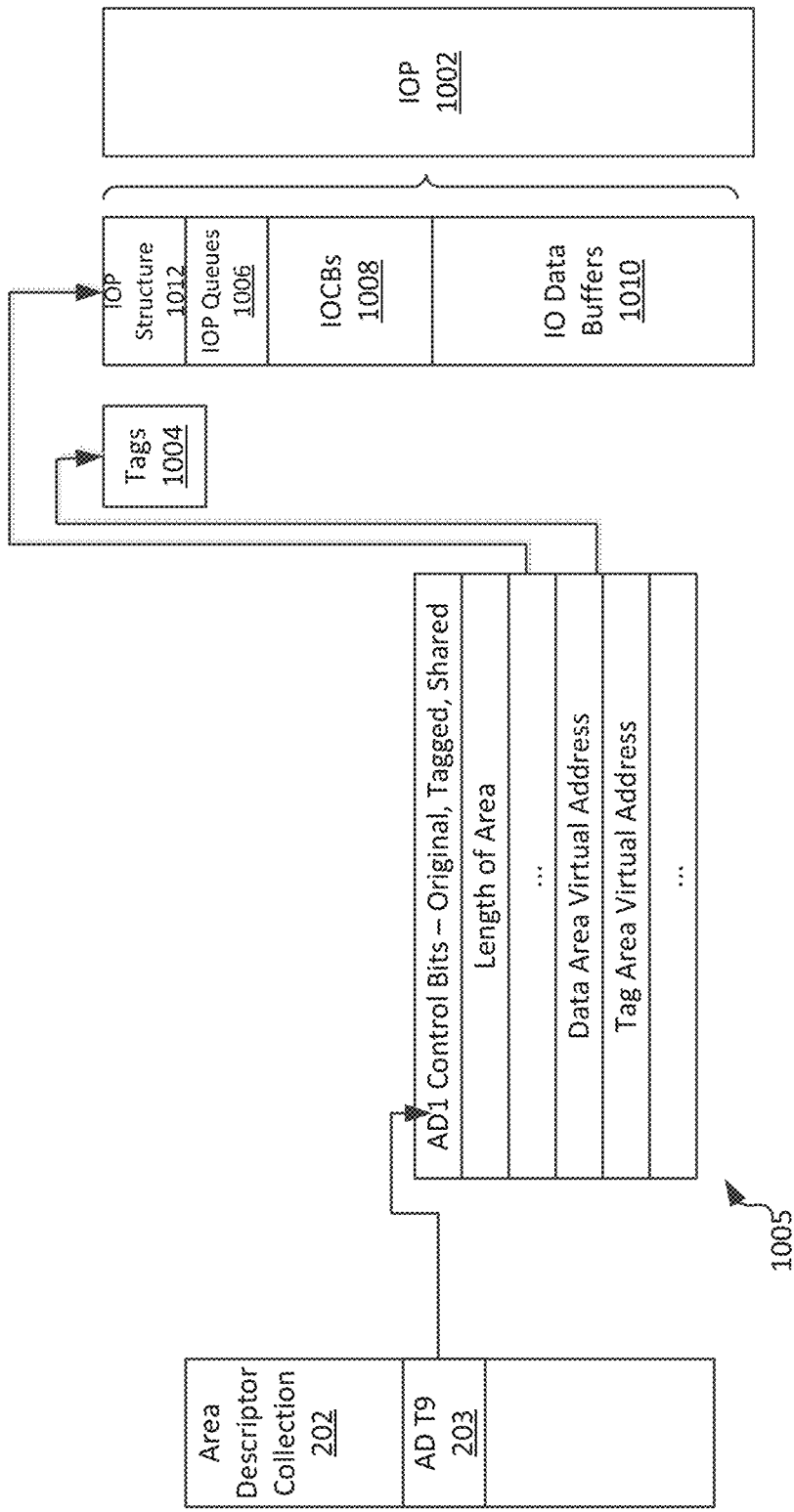
FIG. 10 illustrates addressing an area associated with I/O operations and an I/O processor (IOP) using area descriptors, according to an example embodiment.

In addition to memory operations, the intelligent processor module 108 can manage I/O operations using similar abstractions, by referencing an external data module implemented as an I/O processor (IOP). Such an IOP would have access to the virtualized memory for purposes of data access as well as access to I/O control blocks (IOCBs) that describe what each I/O operation is to do. The IOP also has access to the initiation and result queues associated with I/O operations. Referring now to FIG. 10, an arrangement 1000 is illustrated in which I/O operations and an I/O processor (IOP) 1002 are managed using area descriptors, according to an example embodiment. In the example shown, the area descriptor collection 202 includes a token 203 that references an area descriptor analogous to those described above. That area descriptor can reference a specific set of tags 1004 that are associated with a known area descriptor segment 1005 in memory that stores I/O structures, including IOP queues 1006, IOCBs 1008, and I/O data buffers 1010.

In the embodiment shown, the entirety of the memory allocated to the process hosting the intelligent processor module 108 is not completely shared with an IOP associated with that module. Rather, the known area descriptor segment 1005 within the area descriptor collection 202 can be created, and used by the intelligent processor module 108 by sharing that segment with the IOP 1002. This area descriptor segment 1005 can contain data structures and I/O buffers that are used by the intelligent processor module 108, and communicated to the IOP 1002, to which that intelligent processor module 108 is associated. In such an embodiment, the IOP 1002 would be able to access this area descriptor segment 1005. This would allow the intelligent processor module 108 to build I/O operations, and the IOP 1002 could access such I/O operations.

In such an embodiment, the intelligent processor module 108 can be configured to enqueuer IOCBs into initiation queues and dequeuer completed IOCBs from result queues. Similarly, the IOP 1002 can dequeuer IOCBs from the initiation queue and enqueuer IOCBs into a result queue upon completion.

Of course, as with other memory areas allocated to the intelligent processor module 108, this known area descriptor segment could be deallocated, and a different area descriptor segment could be allocated. Accordingly, the segment could change each time it is allocated, with the different segment identity communicated to the IOP 1002.

It is noted that in embodiments of the present disclosure implemented on distributed commodity architectures, the IOP(s) 1002 may run on separate servers and interconnect with the servers which are running the intelligent processor module 108, for example via InfiniBand. Through the use of RDMA, in some such embodiments an IOP 1002 is able to directly read and write from an entire span of memory allocated to such an intelligent processor module 108; however, that span of memory is different from the area descriptor segment 1005 that is directly used to define and share I/O operations between the intelligent processor module 108 and IOP 1002 that are not performed via RDMA.

In additional embodiments, the intelligent processor module 108 can be configured to allocate a further small area of memory, for example in an IO structure 1012, which stores interrupt vectors. The IOP 1002 can turn on an IOP finish interrupt bit, which can be used by the intelligent processor module 108 to generate an IO finish interrupt. Additionally, the intelligent processor module 108 can then generate an IO finish interrupt to the hosted operating system 106 and update its status in this IO structure 1012 so IOPs 1002 can determine a free/busy status of each pending intelligent processor module 108. In arrangements using multiple intelligent processor modules 108, the IOP 1002 can locate an idle intelligent processor module 108, rather than requiring an occupied intelligent processor module 108 update the IO finish interrupt.

Figure 16:
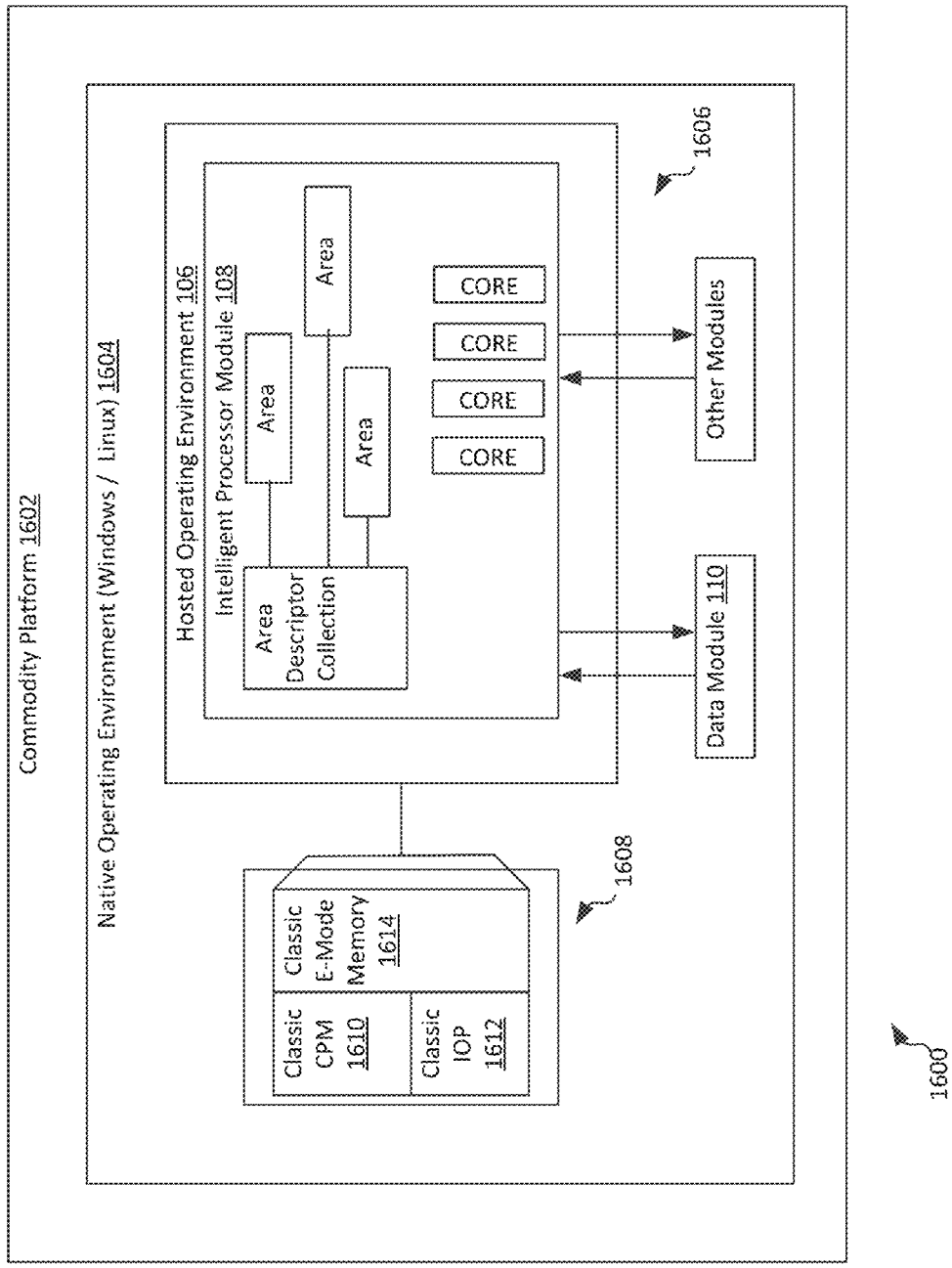
FIG. 16 illustrates a computing platform that hosts a system including the secure migratable architecture described herein as well as a legacy hosted platform, according to an example embodiment.

In example embodiments, the IOP 1002 and intelligent processor module 108 share status and interrupt information via the shared known area descriptor segment 1005, which can be maintained, but periodically renamed to ensure security. This renaming operation (i.e., referencing the known area descriptor segment 1005 with a different area descriptor) will minimize the chance of malware writing to that area. It is noted that only writes to a changed status word would typically cause disruption of I/O operations. Such a shared known area descriptor segment 1005 can be used in association with another module (e.g., the "other modules" as seen in FIG. 16, below), such as an encryption module, for purposes of data access/processing.

In an alternative embodiment, the hosted operating system 106 would determine whether an area of memory allocated to the intelligent processor module 108 should be shared with an external entity, such as the IOP 1002 (or other software, such as an external cryptographic processor). In such an embodiment, the hosted operating system 106 would allocate a memory area and associated area descriptor, and store in that memory area any information desired to be shared. A share memory attach (SHMA) operator would then be used, supplying the area descriptor token as an argument, as well as the type of access needed (read, write, read/write, etc.). The intelligent processor module 108 would then share the memory with a specific name and access rights. This could occur by the intelligent processor module 108 or hosted operating system 106 supplying a name, either as part of the data or as an argument included in a message to a remote system. Such an arrangement requires agreement between the hosted operating system 106 and the external entity (e.g., the IOP 1002), and allows for easier updates and changes. Once shared, the name is communicated to the external entity, which then maps to the shared area and gains access to the area.

With respect to specific interaction between the intelligent processor module 108 and IOP 1002, data buffers can be used such that I/O data buffers 1010 are of UniTag type, eliminating tag manipulation typically required by I/O operations. Accordingly, user data would not be visible outside of the environment of hosted operating system 106, except during the time the I/O is active. This improves security of memory access as compared to existing mainframe (e.g., MCP-based) systems.

Figure 11:
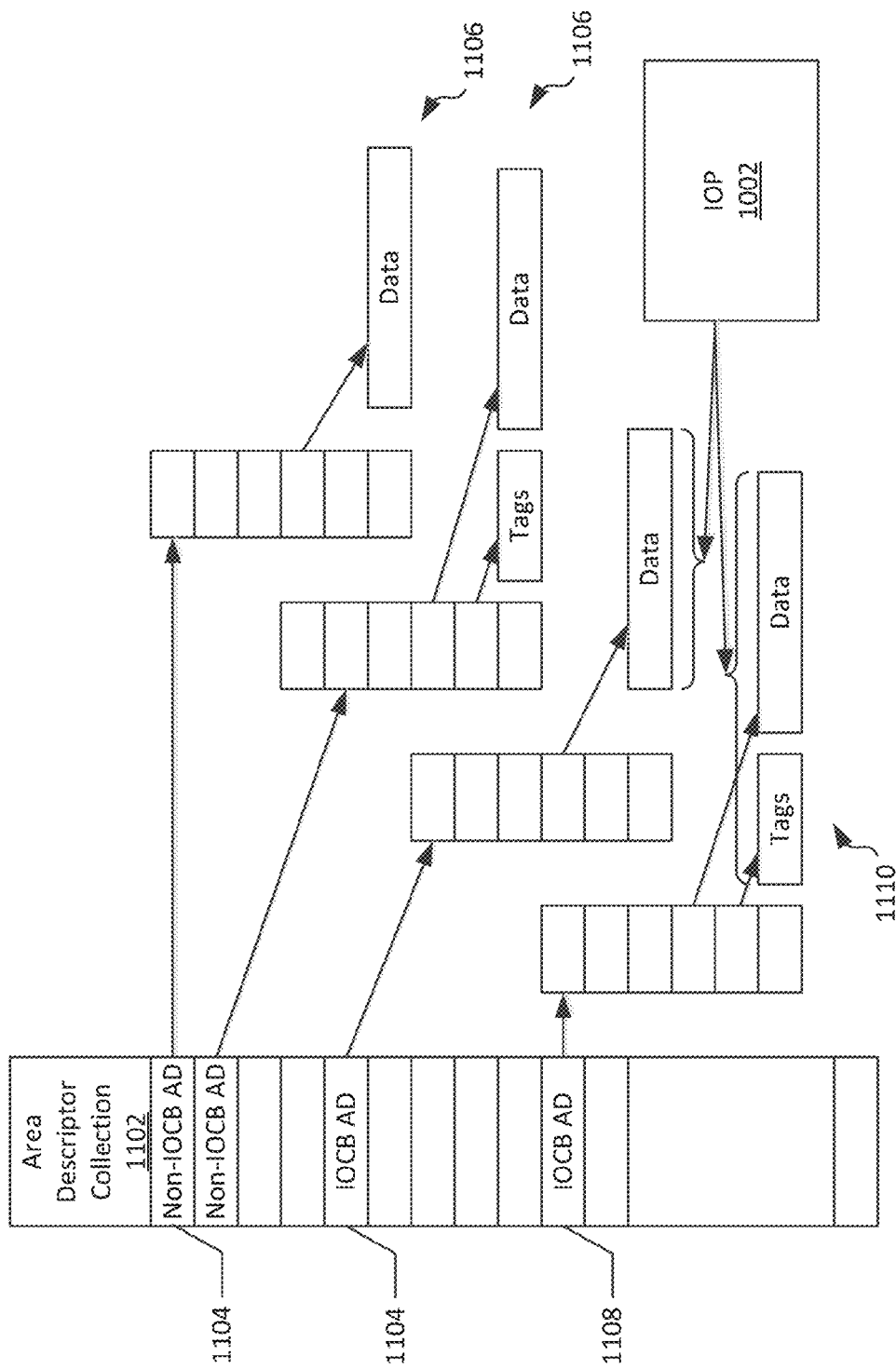
FIG. 11 illustrates mixed use of an area descriptor collection for both data storage and addressing as well as I/O operations, according to an example embodiment.

Referring now to FIG. 11, a further arrangement 1100 is illustrated in which an area descriptor collection 1102 is provided that mixes use of area descriptors for data storage and I/O operations, according to an example embodiment. The area descriptor collection includes tokens referencing non-IOCB area descriptors 1104 which reference data segments 1106 (as shown, either tagged or UniTag), as well as IOCB area descriptors 1108 that reference data buffers 1110 accessible via the IOP 1002.

In the arrangement 1100 shown, when an operating system 106 executes a share memory attach (SHMA) operator, the intelligent processor module 108 will share the buffer and inform IOP 1002 of the name of the buffer. Because the IOCB contains references in this case, a memory area will typically not be of a UniTag type. The IOP 1002 will map to the area and activate the IOCB 1008.

In this embodiment, the act of sharing the area descriptor will act as I/O initiation, and therefore an I/O initiation queue is no longer required. Similarly, the IOP 1002 would, upon completion of the I/O, unmap the associated area descriptor, such that the memory is no longer shared with the IOP 1002. The hosted operating system 106 would then perform a Shared Memory Detach (SHMD) operator to free that memory associated with the IOCB and data buffer. This could be performed, for example, by the IOP 1002 queueing an indication of the IOCB that is completed to the intelligent processor module 108, which then would deliver an interrupt to the hosted operating system 106 providing the token associated with the completed IOCB. The hosted operating system 106 could then perform the Shared Memory Detach (SHMD) operator.

In such embodiments, the hosted operating system 106 will optionally include a result queue, although such a queue is not inherently required by the intelligent processor module 108. If a result queue is used, the hosted operating system 106 will enqueue the area descriptor token for use in finishing the I/O processing. This allows the I/O buffers to be visible external to the intelligent processor module 108 only for a brief period of time before being deallocated. As with memory areas, I/O buffers could be overwritten/zeroed during deallocation.

In alternative embodiments, I/O operation handling can be managed differently. For example, in one alternative embodiment for handling I/O operations, the IOP 1002 can generate an I/O event and store that event token in the IOCB 1008 in association with a completed I/O operation. In a still further embodiment, the input and output buffers and IOCBs can be replicated from a host on which the intelligent processor module 108 is located to a host on which the IOP 1002 resides, a need for sharing and unsharing of operators is removed. Rather, in such embodiments, the data is replicated in the appropriate direction for the corresponding buffer.

In still further embodiments, and to avoid data storage block size mismatches and other data mismatches between the intelligent processor module 108 and IOP 1002 that interfaces with the storage system of the underlying commodity platform 102, the IOP 1002 can be configured to return status information to the intelligent processor module 108, such as completed without error, completed with correctable error, completed with error. In cases of error, the IOP 1002 could further log some data associated with the I/O operation to allow for management of errors. By way of simplifying the data passed back to the intelligent processor module 108, there may he shortened timeframes for integration of new types of I/O devices, since such I/O devices only need to be integrated with the IOP, and no additional integration is required for use with the hosted operating system 106 or intelligent processor module 108.

As an extension to such embodiments abstracting data I/O from the intelligent processor module 108, in some embodiments the IOP 1002 and corresponding intelligent processor module 108 can treat every resources as a file, analogously to the manner in which Linux manages I/O operations. In such an embodiment, a file is viewed as a stream of bytes, and the IOCB 1008 can define a specific device to which an I/O is directed. This IOCB content can be an identifier of a device, or an identifier of a network address of a device.

In embodiments in which I/O operations are addressed to devices as though they are files, such file access—type I/O operations can be addressed to remote and web-accessible addresses, and IOPs could be located in various partitions throughout a multi-partition fabric. An example of such a multi-partition fabric is discussed in U.S. patent application Ser. No. 15/001,374 , entitled "Persistent Guest and Software-Defined Storage in Computing Fabric", the disclosure of which is incorporated by reference in its entirety. In such an arrangement, a local IOP 1002 in a common partition with an intelligent processor module 108 issuing the I/O request, which can then reroute the I/O operation to a remote IOP for processing. That remote IOP would build a result, and make it available to the requesting IOP. The local IOP can then get the data into the local memory as above, and finish the I/O operation. From the perspective of hosted operating system 106 and intelligent processor module 108, the I/O operation appears to be managed by the local IOP.

Referring back to FIG. 1, further details regarding the operating system 106 that is configured to operate on the intelligent processor module 108 are described. In general, the operating system 106 is constructed to allow for updates without system re-initialization. Accordingly, the operating system 106 is configured to support quiescing of interfaces to the intelligent processor module 108, allowing queues to be detached, the intelligent processor module 108 updated, and system operation resumed. Accordingly, rolling updates to various modules, including the intelligent processor module 108 and portions of the operating system 106, are possible.

In addition, the hosted operating system 106 is configured to support native data types widely used in commodity environments, including support for various compiled data written in known languages, such as C, C++, and other languages in widespread use, allowing for exploitation of C library functions to provide services to the hosted operating system 106 that would otherwise not be available in existing mainframe-type systems. Additionally, call-outs to existing native functions may be accessed via such standard languages, and intrinsic operations of native/commodity hardware can be supported as well. For example some commodity processors, such as Ivy Bridge and later processors from Intel Corporation of Santa Clara, Calif., include a random number generator sourced from thermal noise and accessed by a specific operator (RDRAND). Other random number operators (e.g., RDSEED) are available as well, and can be exposed by direct access via the operating system 106. In some embodiments of the hosted operating system 106, a runtime library, such as the .NET Common Language Runtime, may be incorporated and exposed directly within the hosted environment of the hosted operating system 106. In this way, such features are available within an environment that is compatible with legacy mainframe systems, for example via call-out or native support.

In addition to the above, the hosted operating system 106 can be configured to support an arbitrary number of intelligent processor modules 108 being associated with the single hosted operating system 106. To support distribution of tasks within the hosted environment on the various intelligent processor modules 108, the hosted operating system 106 can be implemented with an array of associations between intelligent processor modules 108 and underlying cores in the native/commodity hardware. Such intelligent processor modules 108 can be dynamically allocated or redistributed among underlying cores, based on the hosted workload.

In embodiments, the hosted operating system 106 supports virtualization of non-native systems, for example by allocating files in fabric-connected storage, establish a partition table within the file, and mount the file as a disk. The disk could then be built as desired with deployable software, and then unmounted/closed, allowing the disk/file to be used as a boot unit for a new machine, to which the hosted operating system 106 can dynamically deliver such a disk. In such an arrangement, the boot disk would represent a dynamically created and customized boot unit.

In addition to the above, the hosted operating system 106 can support different versions of intelligent processor modules 108, for example to allow use of different versions that utilize different features (i.e., expose different instructions or other extended features). At execution time, the hosted operating system 106 is configured to inspect the intelligent processor modules 108 with which it is associated. If all features are supported, execution can occur. If features are not supported, either a firmware update to change a version of the intelligent processor module 108 could occur, or alternative paths (perhaps having lower/different performance) could be taken, depending on whether a particular feature is present. In a still further option, source code could be recompiled at runtime to be executable only using the features supported the current intelligent processor module (s) 108. In yet another option, the hosted operating system 106 can generate an interrupt and emulate unsupported features using features that are supported. Although this may affect performance, it would allow for execution of workloads irrespective of the version of the intelligent processor modules 108 that are present in a particular system.

In example embodiments, additional operating system—specific features are implemented that allow for universal compatibility. For example in embodiments of the hosted operating system 106, universal time (rather than local time) is tracked. Additionally, time can be managed using the timestamp counter typically present in commodity processors. Furthermore, to the extent specific operations are time-sensitive or measured in time, a WAIT operator could be issued, providing an event token, which is completely opaque to the firmware, and a time period which needs to elapse prior to having the firmware return the event token. An interrupt could be generated when the time period expires. In cooperation with such an interrupt, expired tokens could be queued, and the hosted operating system 106, upon receipt of an interrupt, could empty the queue of all expired tokens and handle such interrupts (either all at once, or on an as-needed basis).

In embodiments, the hosted operating system 106 will have a fair scheduler, allowing for prioritized scheduling of critical processes but preserving some baseline processing capabilities for each of the processes hosted by that operating system (rather than using a simple priority based scheme that can lead to starvation of neglected processes). Additionally, the hosted operating system 106 provides a user interface in association with mainframe computing support.

Figure 12:
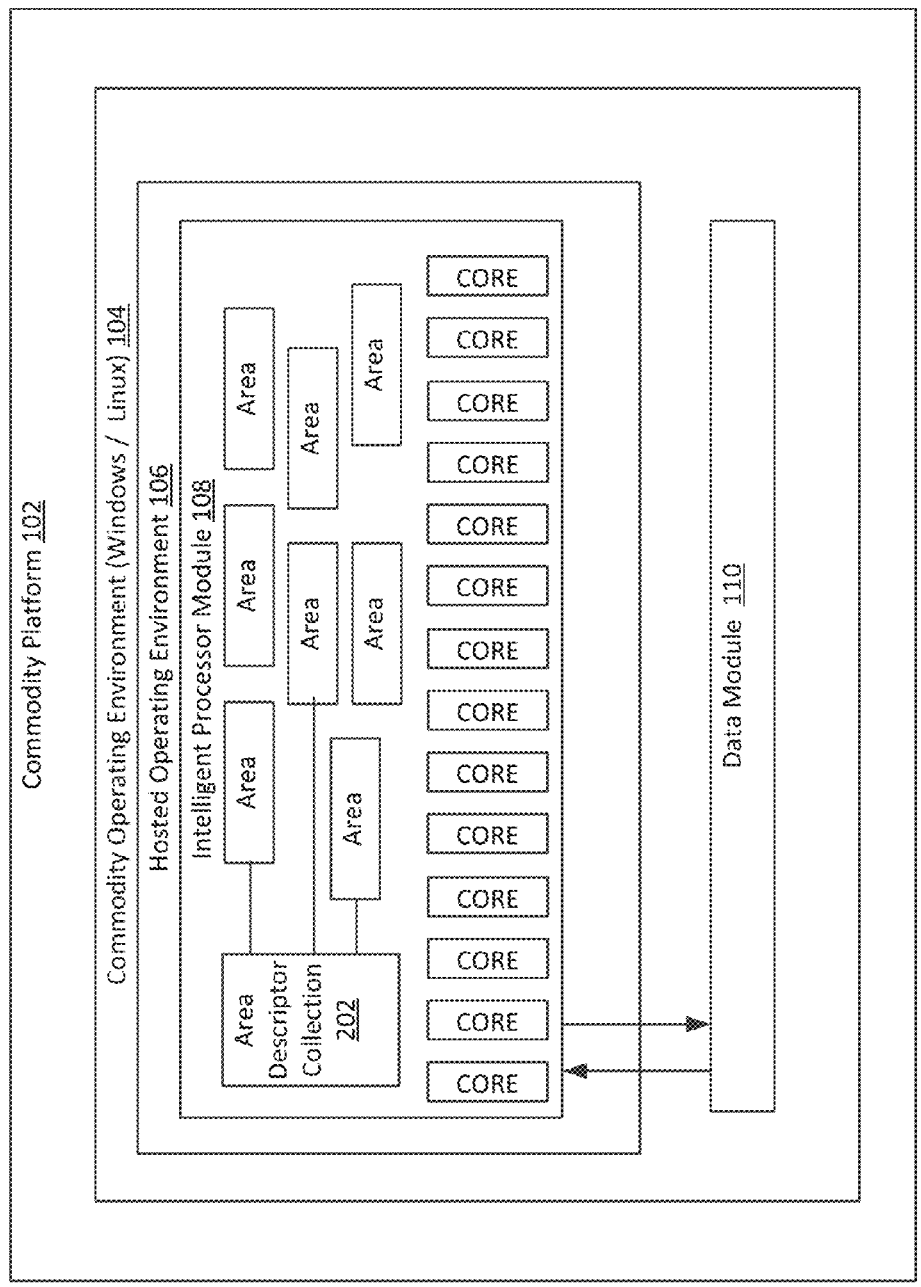
FIG. 12 illustrates a scaled-up implementation of the secure migratable architecture of FIG. 1, according to a first possible configuration.
Figure 13:
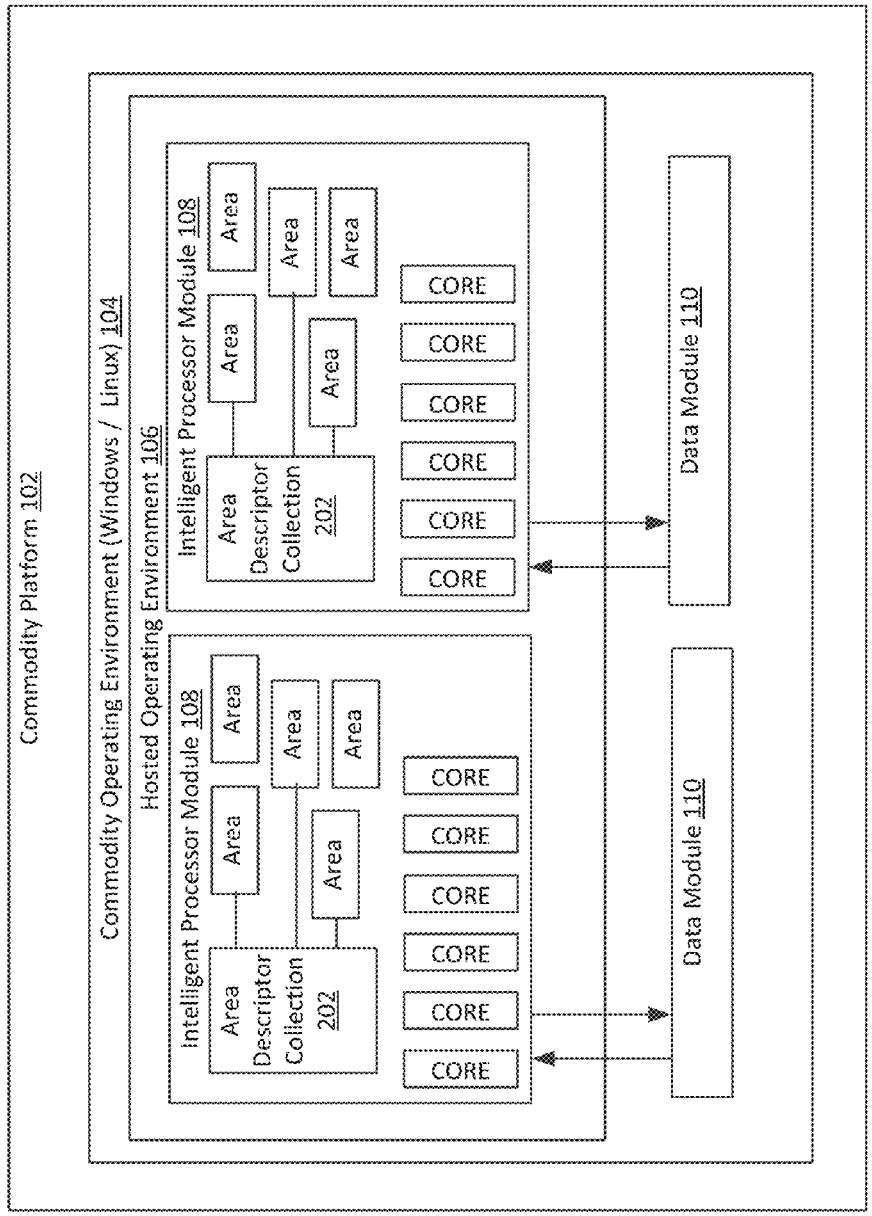
FIG. 13 illustrates a scaled-out implementation of the secure migratable architecture of FIG. 1, according to a second possible configuration.

In various embodiments, the hosted operating system 106 can monitor for saturation to determine a need to either scale-up (to encompass greater amounts of resources per intelligent processor module 108) or scale-out (to distribute to other platforms, for example when resources of a platform have been exhausted). Illustrations of such scale-up are provided in the arrangements of FIGS. 12-13, while illustrations of scale-out are illustrated in further detail below. Referring specifically to FIG. 12, the scaled-up implementation 1200 of the intelligent processor module 108 allocates a plurality of cores and memory areas to a common intelligent processor module 108, in a way that allows for increased processing capabilities of the intelligent processor module 108. Similarly, and as shown in the illustration of FIG. 13, a common hosted operating system 106 can scale-up to allow for a plurality of intelligent processor modules 108 in association with that operating system.

Referring to FIGS. 1-13 generally, it is noted that the secure migratable architecture, and operation thereof as described herein, has a number of advantages over existing mainframe systems, as well as existing virtualization systems hosting such mainframe software. The secure migratable architecture also has a number of advantages relative to virtualization systems generally. Such advantages include aspects relating to security, performance, capacity, availability, and flexibility, among others.

Regarding security, the secure migratable architecture described herein retains a tagged memory concept to enforce data type identification, and ensure that area descriptors are not reused, thereby preventing access of systems using stale area descriptors. Additionally, because deallocated memory can be zeroed, the secure migratable architecture will return one or more areas to the operating environment when deallocated. The deallocated memory areas can be overwritten by zeroes, or other known values, before deallocation, to avoid the possibility that lingering data is accessed by other software running on a host commodity platform. Additionally, to enhance security, legacy items will not be accessible via UniTag features, and void pointers (i.e., pointers lacking a width) are prevented from being dereferenced. Similarly, references cannot be created to memory areas that do not exist. Furthermore, because attributes are encapsulated within an area descriptor, security concepts such as read/write access can be managed at an architectural level. Additionally, memory is by default (and with some exceptions associated with I/O or other external features) not shared, increasing security.

Regarding performance, such performance is improved greatly by removing paging from a hosted operating system, with only paging occurring, as needed, at the underlying, commodity system level. Additionally, because of use of native numeric formats, arithmetic performance is improved. Furthermore, because of tag reorganization (separation of tag and data) and use of UniTag concepts, tag checks can be simplified, as well as data packing/unpacking and writing of adjacent data. Performance can further be improved by relying on existing compilers and languages that implement efficient correspondence to underlying, native architectures.

Regarding capacity, large addressable memory spaces are provided, as well as use of larger data types (e.g., Big Integers, etc.). Additionally, a tagged architecture allows the secure migratable architecture to reserve some tags for future arithmetic format developments. Furthermore, by allowing an intelligent processing module to identify to an operating system specific execution features relating to capacity and operation, the system overall can dynamically reconfigure to optimize use of resources both locally (as indicated in FIGS. 12-13) and throughout a computing fabric. Details regarding distribution through a computing fabric are provided below in connection with FIGS. 16-36.

Regarding availability, the secure migratable architecture of the present disclosure allows for update without a service interruption by supporting quiescing and updating portions of the architecture (both the intelligent processor module 108 and portions of the hosted operating system 106) without losing a state of operation. Additionally, because memory can be replicated, faults on one platform can be compensated for by restarting such a system on a remote system with limited interruption. Furthermore, because new environments can be replicated across a computing fabric allows for management of resource consumption in a way that avoids performance limitations on particular workloads.

Regarding flexibility, the secure migratable architecture allows for faster updating and changing of an instruction set architecture to accommodate different commodity instruction set architectures, and allows for realtime replacement of modules to change the hosted instruction set architecture as desired. Furthermore, dynamic updates allow new features or fixes to be introduced without service interruptions. Data interchange between the hosted environment and the underlying commodity system allows for quick incorporation of features into the hosted environment.

Other advantages relative to existing mainframe systems exist as well, including, among other features, improved user interfaces and flexibility to accommodate a full complement of programming languages and feature libraries included therein. Other advantages are present as well, as reflected in the present disclosure.

II. Host Hardware for Secure Migratable Architecture

Figure 14:
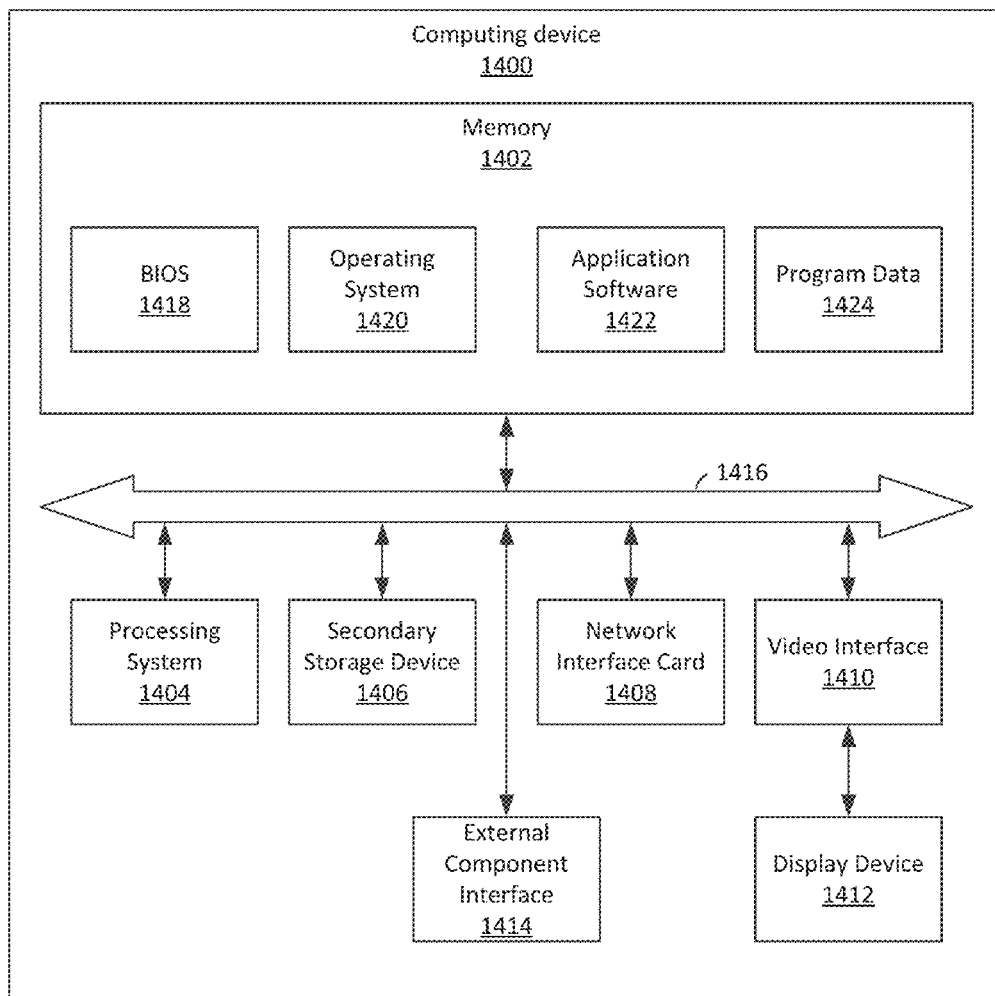
FIG. 14 is a block diagram of a computing system in which aspects of the present disclosure can be implemented.
Figure 15:
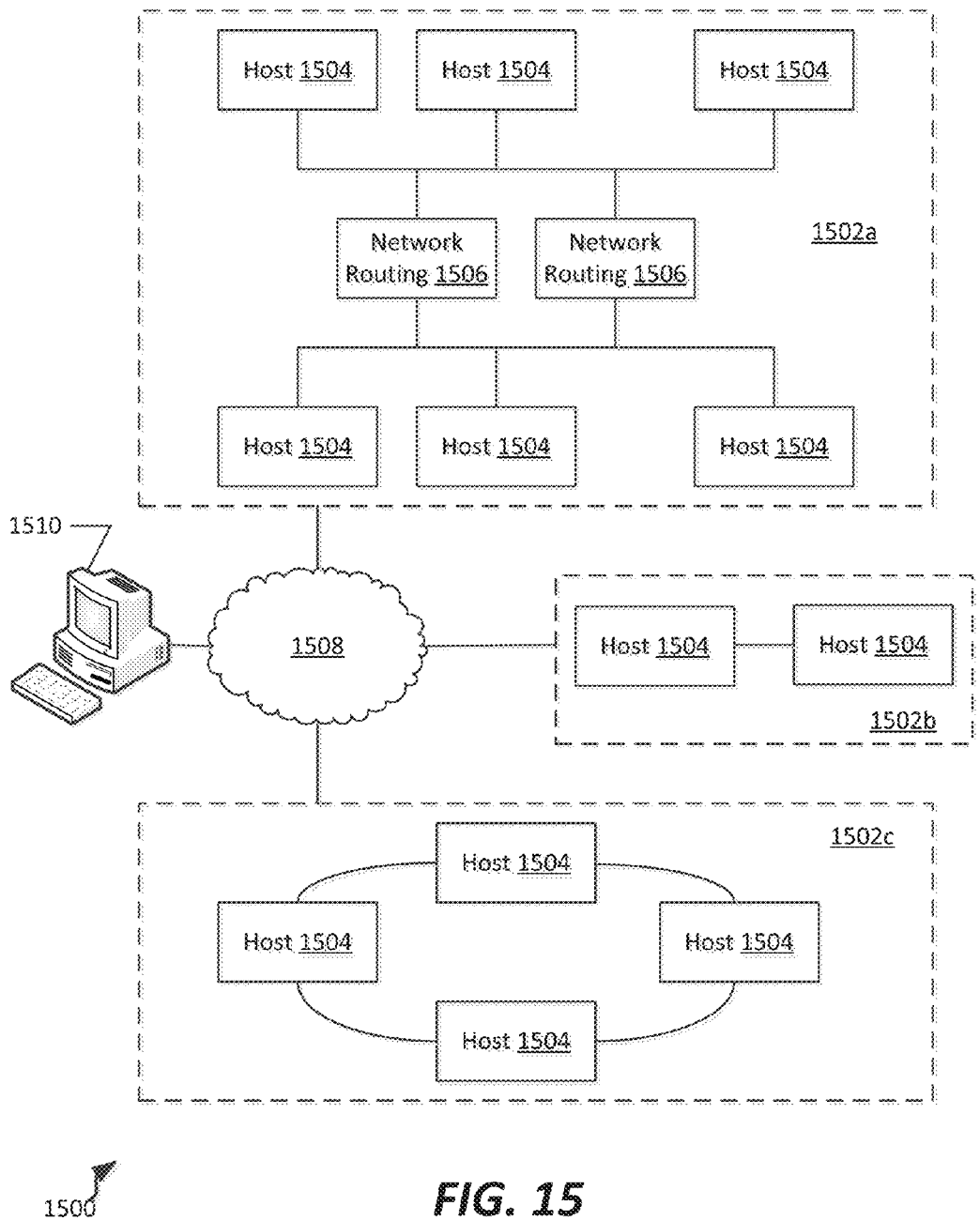
FIG. 15 illustrates a distributed multi-host system in which aspects of the present disclosure can be implemented.

Referring to FIGS. 14-15, example configurations of computing devices are shown that may be used to host the secure migratable architecture of the present disclosure are illustrated. In FIG. 14, a schematic illustration of an example computing system is provided. In various embodiments, the computing device 1300 implements one particular instruction set architecture, such as the x86, x86-64, or IA64 instruction set architectures. In alternative embodiments, other instruction set architectures, such as ARM, MIPS, Power, SPARC, or other commodity instruction set architecture can be used. The computing device 1400 can be used to execute non-native software using the secure migratable architecture described herein, in accordance with the methods and systems described herein.

In the example of FIG. 14, the computing device 1400 includes a memory 1402, a processing system 1404, a secondary storage device 1406, a network interface card 1408, a video interface 1410, a display unit 1412, an external component interface 1414, and a communication medium 1416. The memory 1402 includes one or more computer storage media capable of storing data and/or instructions. In different embodiments, the memory 1402 is implemented in different ways. For example, the memory 1402 can be implemented using various types of computer storage media.

The processing system 1404 includes one or more processing units. A processing unit is a physical device or article of manufacture comprising one or more integrated circuits that selectively execute software instructions. In various embodiments, the processing system 1404 is implemented in various ways. For example, the processing system 1404 can be implemented as one or more physical or logical processing cores. In another example, the processing system 1404 can include one or more separate microprocessors. In yet another example embodiment, the processing system 1404 can include an application-specific integrated circuit (ASIC) that provides specific functionality. In yet another example, the processing system 1404 provides specific functionality by using an ASIC and by executing computer-executable instructions.

The secondary storage device 1406 includes one or more computer storage media. The secondary storage device 1406 stores data and software instructions not directly accessible by the processing system 1404. In other words, the processing system 1404 performs an I/O operation to retrieve data and/or software instructions from the secondary storage device 1406. In various embodiments, the secondary storage device 1406 includes various types of computer storage media. For example, the secondary storage device 1406 can include one or more magnetic disks, magnetic tape drives, optical discs, solid state memory devices, and/or other types of computer storage media.

The network interface card 1408 enables the computing device 1400 to send data to and receive data from a communication network. In different embodiments, the network interface card 1408 is implemented in different ways. For example, the network interface card 1408 can be implemented as an Ethernet interface, a token-ring network interface, a fiber optic network interface, a wireless network interface (e.g., WiFi, WiMax, etc.), or another type of network interface.

The video interface 1410 enables the computing device 1400 to output video information to one or more display units 1412. The one or more display units 1412 can be various types of devices for displaying video information, such as an LCD display panel, a plasma screen display panel, a touch-sensitive display panel, an LED screen, a cathode-ray tube display, or a projector. The video interface 1410 can communicate with the display unit(s) 1412 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 1414 enables the computing device 1400 to communicate with external devices. For example, the external component interface 1414 can be a USB interface, a FireWire interface, a serial port interface, a parallel port interface, a PS/2 interface, and/or another type of interface that enables the computing device 1400 to communicate with external devices. In various embodiments, the external component interface 1414 enables the computing device 1400 to communicate with various external components, such as external storage devices, input devices, speakers, modems, media player docks, other computing devices, scanners, digital cameras, and fingerprint readers.

The communication medium 1416 facilitates communication among the hardware components of the computing device 1400. In the example of FIG. 14, the communication medium 1416 facilitates communication among the memory 1402, the processing system 1404, the secondary storage device 1406, the network interface card 1408, the video interface 1410, and the external component interface 1414. The communication medium 1416 can be implemented in various ways. For example, the communication medium 1416 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1402 stores various types of data and/or software instructions. For instance, in the example of FIG. 14, the memory 1402 stores a Basic Input/Output System (BIOS) 1418 and an operating system 1420. The BIOS 1418 includes a set of computer-executable instructions that, when executed by the processing system 1404, cause the computing device 1400 to boot up. The operating system 1420 includes a set of computer-executable instructions that, when executed by the processing system 1404, cause the computing device 1400 to provide an operating system that coordinates the activities and sharing of resources of the computing device 1400. Furthermore, the memory 1402 stores application software 1422. The application software 1422 includes computer-executable instructions, that when executed by the processing system 1404, cause the computing device 1400 to provide one or more applications. The memory 1402 also stores program data 1424. The program data 1424 is data used by programs that execute on the computing device 1400.

Aspects of the present disclosure are practiced in an electrical circuit comprising discrete electronic elements, packaged or integrated electronic chips containing logic gates, a circuit utilizing a microprocessor, or on a single chip containing electronic elements or microprocessors. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

Referring now to FIG. 15, example arrangements of multi-system arrangements are shown utilizing a plurality of commodity computing systems. As illustrated in FIG. 15, a system 1500 in which the para-virtualization systems of the present disclosure can be implemented is shown. The system 1500 is, in the embodiment shown, distributed across one or more locations 1502, shown as locations 1502*a-c*. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 1502*a-c* each includes one or more host systems 1504. The host systems 1504 represent host computing systems, and can take any of a number of forms. For example, the host systems 1504 can be server computing systems having one or more processing cores and memory subsystems and are usable for large-scale computing tasks. In one example embodiment, a host system 1504 can be as illustrated in FIG. 14.

As illustrated in FIG. 15, a location 1502 within the system 1500 can be organized in a variety of ways. In the embodiment shown, a first location 1502*a* includes network routing equipment 1506, which routes communication traffic among the various host systems 1504, for example in a switched network configuration. Second location 1502*b* illustrates a peer-to-peer arrangement of host systems. Third location 1502*c* illustrates a ring arrangement in which messages and/or data can be passed among the host computing systems themselves, which provide the routing of messages. Other types of networked arrangements could be used as well.

In various embodiments, at each location 1502, the host systems 1504 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 1502*a-c*, a variety of communication technologies can also be used to provide communicative connections of host systems 1504 at different locations. For example, a packet-switched networking arrangement, such as via the Internet 1508, could be used. Preferably, the interconnections among locations 1502*a-c* are provided on a high-bandwidth connection, such as a fiber optic communication connection.

In the embodiment shown, the various host system 1504 at locations 1502*a-c* can be accessed by a client computing system 1510. The client computing system can be any of a variety of desktop or mobile computing systems, such as a desktop, laptop, tablet, smartphone, or other type of user computing system. In alternative embodiments, the client computing system 1510 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well, for example management services applications that are provided by a fabric service manager application.

It is noted that, in various embodiments, different arrangements of host systems 1504 within the overall system 1500 can be used; for example, different host systems 1504 may have different numbers or types of processing cores, and different capacity and type of memory and/or caching subsystems could be implemented in different ones of the host system 1504. Furthermore, one or more different types of communicative interconnect technologies might be used in the different locations 1502*a-c*, or within a particular location.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIGS. 14-15 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Although particular features are discussed herein as included within a computing device, it is recognized that in certain embodiments not all such components or features may be included, within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, although in the embodiments of FIGS. 14-15 shown, the computing devices represent a physical computing system, the various endpoints and servers of the present disclosure need not be directly implemented on a hardware-compatible system. Rather, such endpoints or servers could be implemented within a virtual computing system or virtual partition of a computing system. In some embodiments, the endpoints and/or servers of the present disclosure are implemented in a partitioned, multiprocessor environment, with the various partitions in which endpoints and/or servers reside being managed by a system virtualization software package.

III. Coexistence of Secure Migratable Architecture

The secure migratable architecture described above in connection with FIGS. 1-13 provides a basis for system-wide flexibility in terms of coexistence of different systems with different instruction set architectures, either on the same platform or within a common computing fabric. Furthermore, because the secure migratable architecture provides an abstracted interface that exposes a non-native instruction set architecture to hosted workloads, as such workloads change, hosting configurations may be adjusted accordingly. FIGS. 16-36 illustrate example configurations of a secure migratable architecture using one or more of the above-described embodiments, in which such flexibility and adaptability advantages are illustrated in further detail.

Referring to FIG. 16, a computing platform 1600 is shown that hosts a system including the secure migratable architecture described herein as well as a legacy hosted platform, according to an example embodiment. In the example shown, the computing platform 1600 includes a commodity platform 1602 hosting a commodity operating system 1604, analogous to the commodity platform and environment 102, 104 described above in connection with FIGS. 1-13. In the embodiment shown, the commodity operating system 1604 hosts both a secure migratable architecture 1606 and a legacy partition 1608. The secure migratable architecture 1606 can be as noted above in connection with FIG. 1; however, it can be arranged in communication with a separate partition 1608 that hosts a classic MCP-based virtualized system, including a central processing module 1610, I/O processor 1612, and E-mode memory 1614. It is noted that the partition 1608 requires a substantial virtualization layer allowing it to execute on the commodity platform 1602, and requires a reserved memory area to allow for storage of data in a manner that is expected by the existing MCP architecture. By way of contrast, the secure migratable architecture 1606 maintains data and addresses data in a manner that allows addressing control to be managed by the commodity operating system 1604, and therefore does not require a monolithic selection of memory to be allocated at the time of instantiation. Furthermore, because the secure migratable architecture 1606 is configurable to execute legacy workloads, any workloads executing on the separate partition 1608 can be ported to be hosted by the secure migratable architecture 1606, and ultimately resources associated with the partition 1608 can be freed and that partition deallocated.

Figure 17:
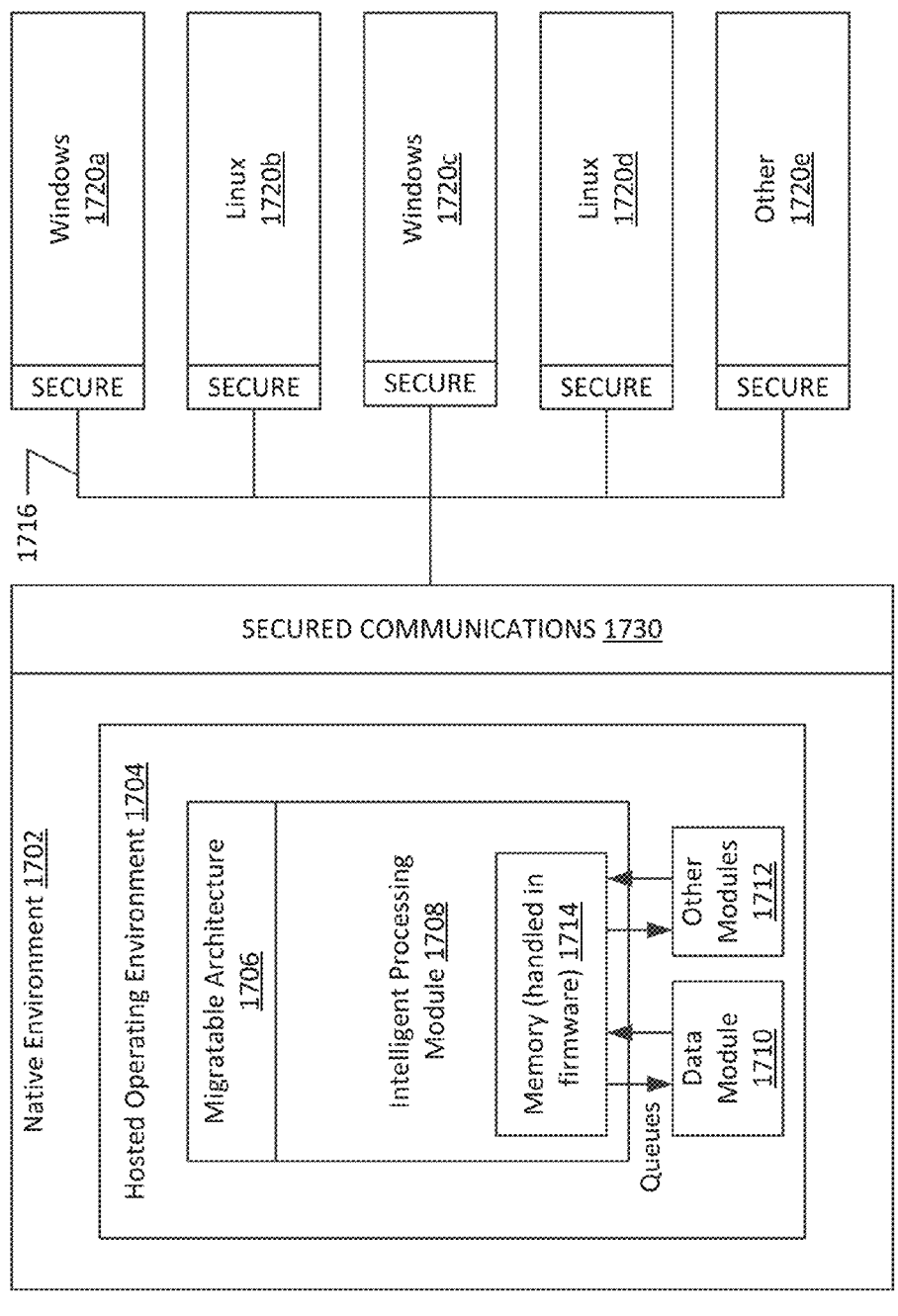
FIG. 17 illustrates a multi-system computing environment in which a plurality of different systems can communicate with each other according to predefined security rights, according to an example embodiment.

Referring now to FIG. 17 a multi-system computing environment 1700 is shown in which a plurality of different systems can communicate with each other according to predefined security rights, according to an example embodiment. In the embodiment shown, a commodity computing platform 1702 can host an operating environment 1704, which in turn hosts the migratable architecture 1706 that includes an intelligent processor module 1708. The migratable architecture 1706 can correspond, in various embodiments, to a non-native operating system and one or more hosted workloads, executable via the intelligent processor module 1708 (corresponding in turn to the intelligent processor module 108 described above). In addition, a data module 1710 and associated module 1712 are further included in the operating environment 1704, and can include data access mechanisms and cryptography mechanisms usable on the commodity computing platform.

In the embodiment shown, the commodity computing platform 1702 can be communicatively connected via a network 1716 to a plurality of other computing platforms, shown as systems 1720*a-e* (collectively systems 1720). In the embodiment shown, the systems 1720*a-e* can operate using either the same or different operating systems; in the example shown, Windows-based and Linux-based operating systems are provided. In the example arrangement shown, each of the systems 1720 and the commodity computing platform 1702 include secure communications software 1730 installed thereon. The secure communications software 1730 generally provides for secure communications among trusted ones of the systems, and allows users to define secure subnetworks among the systems 1702, 1720. For example, communities of interest that include some subset of these systems can allow for secure communications among those trusted systems, while making that network entirely opaque to (hidden from) systems not included in that community of interest. In example embodiments, such communities of interest can be created using Stealth secure communications technologies provided by Unisys Corporation of Blue Bell, Pa. Example details of such Stealth technologies are discussed in the following patent applications, the disclosures of which are hereby incorporated by reference in their entireties:

U.S. Provisional patent application Ser. No. 14/688,348, entitled "Enterprise Management for Secure Network Communications Over IPsec", filed Apr. 16, 2015.

U.S. Provisional Patent Application entitled: Distributed Security on Multiple Independent Networks using Secure "Parsing" Technology, by Robert Johnson, U.S. patent application Ser. No. 60/648,531, filed Jan. 31, 2005.

U.S. Patent Application entitled: Integrated Multi-Level Security System, by Robert Johnson, U.S. application Ser. No. 11/339,974 filed Jan. 31, 2006, claiming the benefit of the previous provisional application.

U.S. Patent Application entitled: Integrated Multi-Level Security System, by Robert Johnson et al., U.S. application Ser. No. 11/714,590 filed Mar. 6, 2007 which is a continuation-in-part of U.S. application Ser. No. 11/339,974.

U.S. Patent Application entitled: Integrated Multi-Level Security System, by Robert Johnson et al., U.S. application Ser. No. 11/714,666 filed Mar. 6, 2007 which is a continuation-in-part of U.S. application Ser. No. 11/339,974.

U.S. Patent Application entitled: Integrated Multi-Level Security System, by Robert Johnson et al., U.S. application Ser. No. 11/714,598 filed Mar. 6, 2007 which is a continuation-in-part of U.S. application Ser. No. 11/339,974.

U.S. patent application Ser. No. 12/272,012, entitled "Block Level Data Storage Security System", filed Nov. 17, 2008.

The present disclosure also incorporates by reference the disclosures of commonly assigned applications including:

U.S. patent application Ser. No. 12/336,558, entitled "Data Recovery Using Error Strip Identifiers", filed Dec. 17, 2008.

U.S. patent application Ser. No. 12/336,559 entitled "Storage Security Using Cryptographic Splitting", filed Dec. 17, 2008. U.S. patent application Ser. No. 12/336,562, entitled "Storage Security Using Cryptographic Splitting", filed Dec. 17, 2008.

U.S. patent application Ser. No. 12/336,564, entitled "Storage Security Using Cryptographic Splitting", filed Dec. 17, 2008.

U.S. patent application Ser. No. 12/336,568, entitled "Storage Security Using Cryptographic Splitting", filed Dec. 17, 2008.

U.S. patent application Ser. No. 12/342,636 entitled "Storage Communities Of Interest Using Cryptographic Splitting", filed Dec. 23, 2008.

U.S. patent application Ser. No. 12/342,575, entitled "Storage Communities Of Interest Using Cryptographic Splitting", filed Dec. 23, 2008. U.S. patent application Ser. No. 12/342,610, entitled "Storage Communities Of Interest Using Cryptographic Splitting", filed Dec. 23, 2008.

U.S. patent application Ser. No. 12/342,379, entitled "Secure Network Attached Storage Device Using Cryptographic Splitting", filed Dec. 23, 2008.

U.S. patent application Ser. No. 13/493,023, entitled "Software Handling Of Hardware Error Handling In Hypervisor-Based Systems", filed Sep. 5, 2012.

U.S. patent application Ser. No. 13/547,148, entitled "Automated Provisioning of Virtual Machines", filed Jul. 12, 2012.

IV. Operation of Secure Migratable Architecture in Distributed and Virtualized Arrangements Referring now to FIGS. 18-21, methods executable on the secure migratable architecture are described in which memory, I/O, and workload management operations can be performed on one or more such systems 1702, 1720 according to aspects of the present disclosure are discussed. In general, the methods of FIGS. 18-21 generally correspond to operations that provide for improved efficiency, performance, and reliability of workloads hosted on the secure migratable architecture described herein, including operations on a single commodity platform and reorganization of workloads across multiple commodity platforms in a way that leverages existing partitioning and security technologies.

Figure 18:
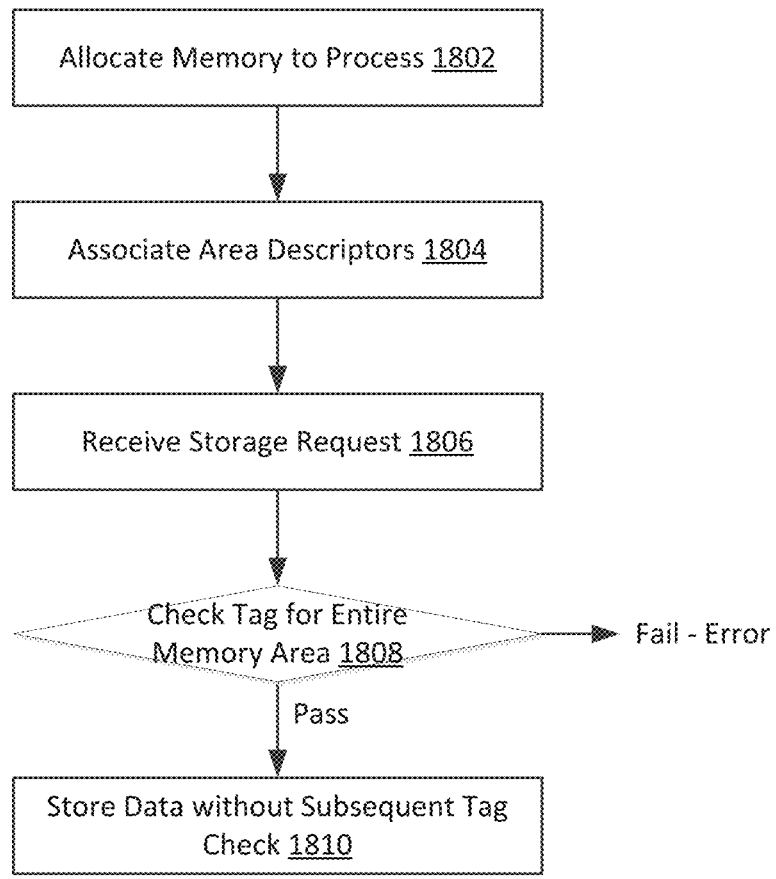
FIG. 18 is a flowchart of a method of storing data in a memory allocated to and managed by the secure migratable architecture described herein.

Referring to FIG. 18, a flowchart of a method 1800 of storing data in a memory allocated to and managed by the secure migratable architecture described herein is shown. The method 1800 generally corresponds to storage of data on a single commodity system; however, in connection with the present disclosure, and as noted above, such data storage can readily be replicated across platforms to allow for backup data distributed across a computing platform including a plurality of such systems.

In the embodiment shown, the method 1800 includes allocating a memory associated with a process (step 1802). The process can be, for example a process encapsulating an intelligent processing module, such as modules 108, 1708 discussed above. Accordingly, allocating memory to the process can be performed at the time the process is instantiated, or at any time during operation of such modules.

The method 1800 includes associating one or more area descriptors with the allocated memory (step 1804). As noted above, this can include, for each allocated memory area, defining an area descriptor and associating a token with that area descriptor in an area descriptor collection, with the area descriptor including an absolute address and length of the memory area that is allocated, as well as additional properties of the area (e.g., access rights, types of data in the memory area, a type of tagging used, addressing granularity, etc.)

A storage request can be received at an intelligent processing module (step 1806), which can include, for example, data and an address at which the data is to be stored. Notably, the data is arranged in the manner expected in a non-native architecture that is exposed by the intelligent processing module, and the address represents an absolute (non-paged) address within a memory space exposed by that module. In the embodiment shown, that memory area is accessed by way of the area descriptor and an offset, and a tag associated with the memory area is reviewed (step 1808). In the embodiment shown, the data may extend across a plurality of bytes; however, in some circumstances data can be stored in a UniTag environment where tags are associated with collective data (rather than associating a byte tag with every data word). If this tag check fails, the storage request cannot proceed, and the method 1800 terminates in failure. However, assuming the tag check occurs successfully, the method 1800 can proceed with storage of the data across multiple words as needed without subsequently checking a tag of each data word prior to storage (step 1810). It is noted that, in some embodiments, even where such data is not stored in a UniTag arrangement, only a single tag check (of the tags associated with the explicitly tagged area) may be required.

Figure 19:
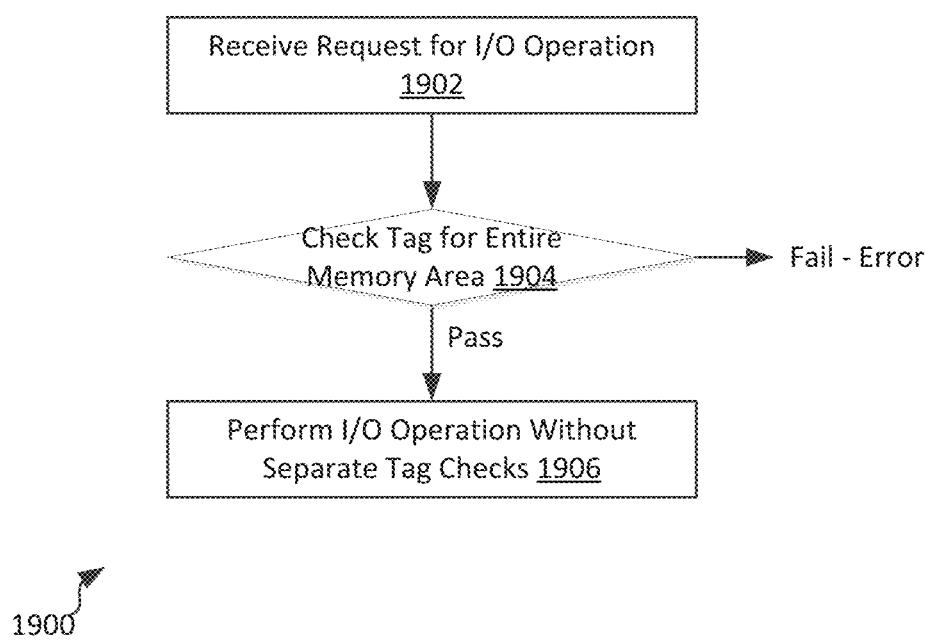
FIG. 19 is a flowchart of a method of performing an I/O operation managed by the secure migratable architecture described herein.

Referring to FIG. 19, a flowchart of a method 1900 of performing an I/O operation managed by the secure migratable architecture described herein is illustrated. The method 1900 can be performed using the features illustrated in FIGS. 10-11, above, in example embodiments.

In the example shown, the method 1900 includes receiving a request for an I/O operation at an intelligent processing module (step 1902). The method includes performing a tag check (step 1904) on a memory area associated with a particular I/O area, for example on an IOCB that is to be accessed by an IOP that will handle the I/O operation. If the tag check fails, the I/O operation cannot proceed, and the method 1900 terminates in failure. However, assuming the tag check is performed successfully, the I/O operation may be initiated, for example by the intelligent processing module adding the I/O operation to a queue to be handled by the IOP, or otherwise signifying to the IOP that the I/O operation is to be performed (step 1906). As above, with respect to the memory write operation, in embodiments of the present disclosure, separate tag checks need not be performed on each of the data words read from or written to the I/O device identified by the I/O operation. Furthermore, because tags and data are stored separately in embodiments of the present disclosure, separation of tags and data or combination of tags and data as data enters/exits the hosted environment is not needed. Rather, continuous segments of data can be read or written from memory to I/O devices without regard to intervening tags (which are removed in such embodiments).

Figure 20:
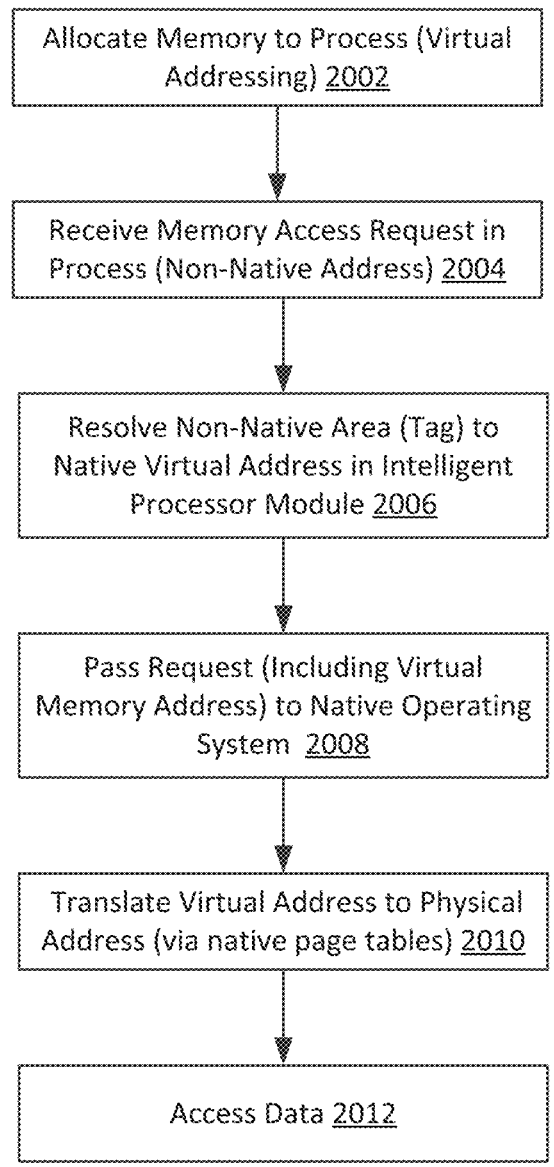
FIG. 20 is a flowchart of a method of retrieving data from a memory allocated to and managed by the secure migratable architecture described herein.

FIG. 20 is a flowchart of a method 2000 of retrieving data from a memory allocated to and managed by the secure migratable architecture described herein, according to an example embodiment. Method 2000 generally is performed by some combination of an underlying, native operating system of a commodity platform and an intelligent processing module hosted thereon.

In the embodiment shown, the method 2000 includes allocating memory to a process (step 2002). As in FIG. 18, above, the process can be, for example a process encapsulating an intelligent processing module, such as modules 108, 1708 discussed above. Accordingly, allocating memory to the process can be performed at the time the process is instantiated, or at any time during operation of such modules.

The method 2000 includes receiving a memory access request at the process (step 2004). The memory access request can be received, for example, from a workload hosted by the intelligent processing module, for example a non-native workload executing on a native, commodity platform. The memory access request, in the embodiment shown, corresponds to a request that includes a direct address, in 64-bit format, without any requirement for paging or resolution of a virtual address within the non-native addressing format. This is because, as noted above, the intelligent processing modules of the present disclosure can be allocated a contiguous, 64-bit addressable memory space that can represent a plurality of non-contiguous memory areas in the native platform; the commodity operating system on which the process hosting the intelligent processing module is tasked with managing correspondence between memory buffers and underlying virtual addresses, while the native operating system manages virtual to physical addressing, as noted below.

In the embodiment shown, the method 2000 includes resolving the memory access request at an intelligent processor module (step 2006). This can include translating an access request to a specific memory buffer, for example a memory buffer with a predetermined memory access token, to a 64-bit direct address that is exposed within the hosted environment executing on the intelligent processor module by an area descriptor. The direct address can then be issued a memory access request by the intelligent processor module, which passes that request to the underlying operating system (step 2008). That underlying operating system will calculate a virtual (paged) address based on the direct address resolved by the intelligent processor module (step 2010), and access data at the resolved address (step 2012). It is noted that the intelligent processing module, will typically not have knowledge of the underlying virtual addressing scheme, nor will it expose such virtual addresses to workloads it hosts. Rather, the underlying environment will translate between the virtual and physical address spaces; the intelligent processing module will maintain a correspondence between the virtual addresses allocated to the hosted environment by the commodity environment and the areas accessible via the area descriptor tokens maintained in the area descriptor table. For example, the intelligent processing module will merely access memory by an area descriptor that includes properties of the data in memory, an address, and a length of a segment associated with the area descriptor, while the underlying architecture may lack any such descriptors but may require virtual address resolution and paging based on the specific underlying commodity architecture.

It is noted that although resolution of specific addresses are described above as passed from a hosted process to the intelligent processor module to a native operating system (and associated commodity platform), it is recognized that an opposite resolution may take place to pass data or an address back from the native system to the hosted process.

By way of further illustration of the address resolution arrangement described above in connection with FIG. 20, a non-native process executing in a system as described herein, hosted by hosted operating system 106, may have allocated to it a memory buffer. That memory buffer may have an assigned token with a predetermined value (in the example herein, 0x87). That token refers to an area descriptor, which describes a number of attributes of the underlying allocated memory. The token is stored in an area descriptor collection. A request to the memory area will correspond to a request at a memory location to an area and including an offset. For example, a starting virtual address in memory space for data bytes associated with the token may be, for example, 0x40000, and a starting virtual address in memory space for tag bytes may be, for example, 0x54320.

Assuming the workload wants to write a value of 0xFF to the byte in the buffer located 0x20 bytes offset from the beginning of the memory area, the workload executes a non-native instruction which indicates that a store is to occur at offset 0x20 of token 0x87 and it is to store the value 0xFF. The intelligent processor module executes the instruction and validates that the token is part of the collection. The intelligent processor module then accesses the attributes stored in the area descriptor referenced by the token to get the start address of the buffer, which is 0x40000. The intelligent processor module then adds the offset specified to this value, giving a value of 0x40020. The intelligent processor module then validates that the tag value associated with the address is compatible with the store (i.e., is capable of receiving the storage of data). Assuming that is true, the intelligent processor module then writes the byte referenced by this address to the value 0xFF.

This write instruction is, at this point, passed to the commodity processor. A write instruction of 0xFF at 0x400020 is therefore mapped to a specific page of memory as determined by page tables managed by that underlying native operating system, based on the physical memory allocated to the intelligent processor module by the native operating system. The commodity processor then converts from a virtual address to a physical address of RAM holding the data, for storage.

Figure 21:
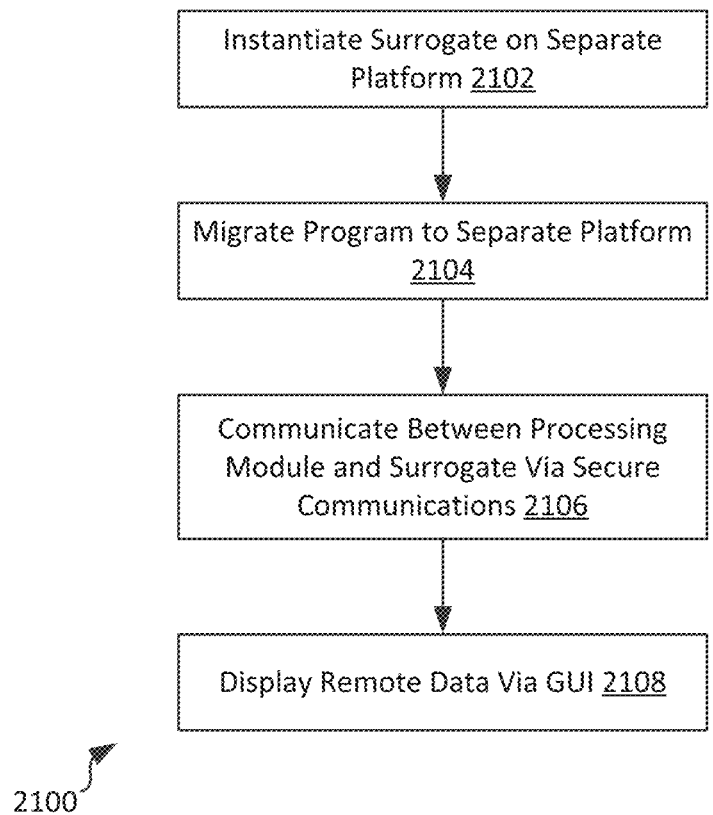
FIG. 21 is a flowchart of a method of migrating a workload from the secure migratable architecture described herein to a separate host platform, according to an example embodiment.

Referring to FIG. 21 a flowchart of a method 2100 is shown for migrating a workload within secure migratable architecture described herein, for example from an initial platform to a separate host platform, according to an example embodiment. The method 2100 can be performed, for example, by coordination of an operating system and one or more intelligent processing modules, such as the operating system 106 and similarly the migratable architecture 1706 and/or the intelligent processor modules 108, 1708, described above, in order to scale up or scale out processing tasks as platform resources become limited due to increased workloads or partitioning, or to distribute execution of tasks to provide redundancy across a computing fabric. Details regarding such a method, and variants thereof, are illustrated in detailed embodiments of FIGS. 22-25 as well.

In the embodiment shown, the method 2100 includes instantiating a surrogate process on a separate platform (step 2102). The surrogate process can be hosted by a commodity operating system, and can correspond to a container capable of receiving non-native data that is executable by an intelligent processing module, for purposes of migration. The surrogate process can be, for example, a copy of or different version of the intelligent processing module, or an analogous module capable of hosting execution of a process that is designed to execute via a non-native instruction set architecture that is supported by the intelligent processing module.

The method 2100 includes migration of a hosted program to a separate platform on which the surrogate process resides (step 2104). For example, the hosted program can be halted on the platform on which the intelligent processing module is executing, and transferred or copied to the separate platform on which the surrogate process resides. The migrated, or copied, program, can be re-connected to I/O resources used by that workload, with any resolution needed by the hosted program to update the manner in which the program connects to that I/O resource if needed based on the new location of the hosted program on the separate platform. The hosted program can then execute on the surrogate process, in a manner analogous to operation hosted by the intelligent processing module.

The method 2100 includes communicating, between the intelligent processing module and the surrogate process, information regarding the execution of the hosted program securely across a computing fabric (step 2106). This can include, for example, establishing a secure connection between the separate platform hosting the surrogate process and hosted program and the original platform hosting the intelligent processing module via a Stealth-based security connection, with both platforms included within a common community of interest. Such a secured connection can allow for remote usage of existing I/O resources on the original platform after a hosted program is migrated, as noted above.

In the embodiment shown, the hosted program may include a display component that would normally be provided on the platform hosting the intelligent processing module. Accordingly, to preserve this appearance to an end-user, the method 2100 includes displaying remote data generated at the separate platform by execution of the hosted platform on the surrogate process, as received at the original platform by the intelligent processing module (step 2108). This can be accomplished, for example, via the secure communication software described above. Accordingly, although it may appear to a user that an original platform is executing the hosted program, the hosted program may be executing on a different platform altogether, with user interface information associated with that program communicated to the original platform for display (e.g., as in a remote desktop configuration, such as shown below).

It is recognized that this mechanism for migrating intelligent processing modules across commodity platforms may also be extended to allow for migration between versions of either the intelligent processing modules or adjusting of workloads hosted by those intelligent processing modules. In the case of updating of versions of the intelligent processing module, it is noted that migration across commodity platforms nay be in fact be involved, but rather that the intelligent processing module be quiesced and its state saved, such that the intelligent processing module can be replaced with an updated version of that module and have its state information restored in the updated version to allow for resumed execution on an updated intelligent processing module.

Figure 22:
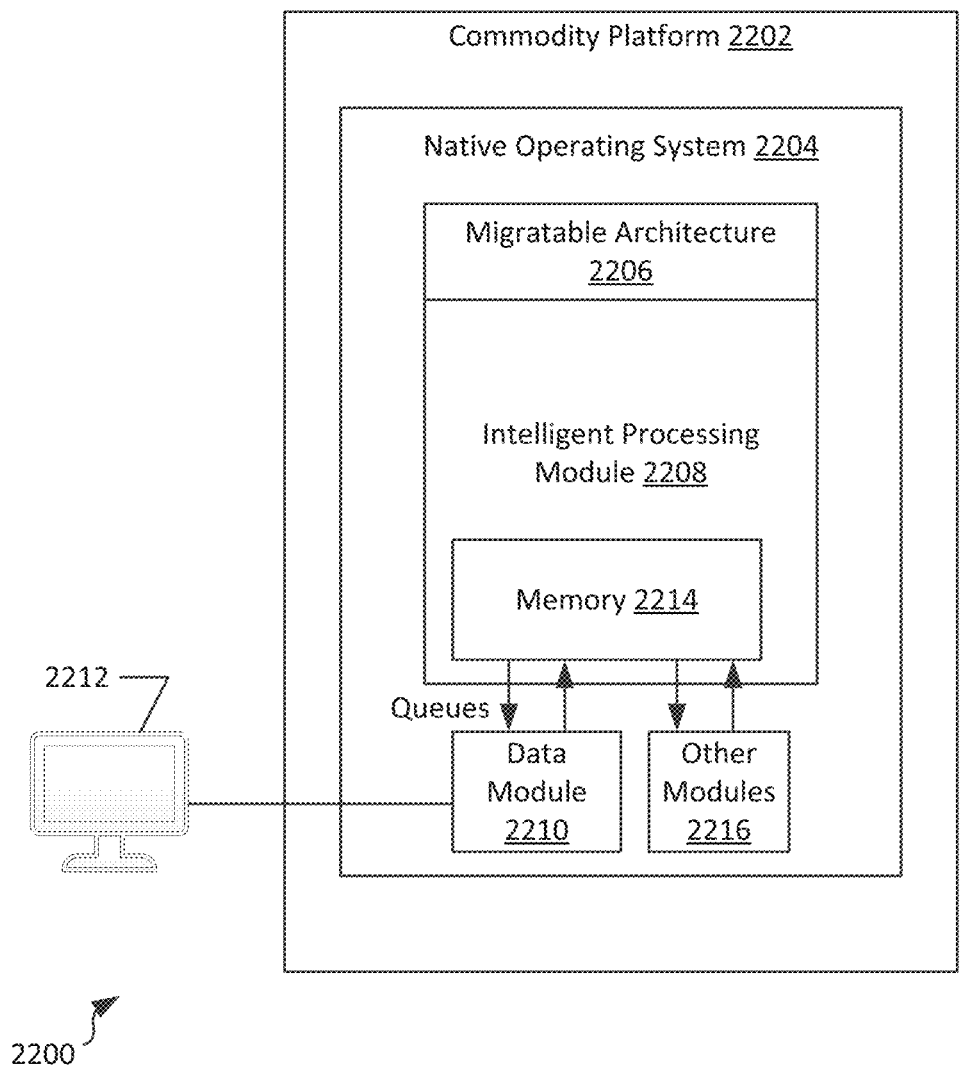
FIG. 22 is a block diagram of a secure migratable architecture hosted within a commodity computing platform, according to an example embodiment of the present disclosure.

Referring now to FIGS. 22-26, an example arrangement of computing platforms is illustrated that highlights the flexibility with which hosted programs can be executed on different platforms within an organization or on systems managed by or on behalf of an organization. As an initial arrangement, FIG. 22 illustrates a system 2200 that includes a standard secure migratable architecture as discussed above, including a commodity platform 2202, a commodity operating environment 2204, a migratable architecture 2206 (e.g., a hosted operating system), and an intelligent processor module 2208. As noted above, the intelligent processing module can be connected to a data module 2210, which may transmit data to external systems, in this case shown as display 2212. As illustrated, the intelligent processor module 2208 can have allocated thereto memory 2214 that is handled in firmware; additionally, the memory 2214 and intelligent processor module 2208 can interface with other types of modules 2216 resident within the commodity operating environment 2204.

As explained above, one or more hosted programs can be stored in the memory 2214 and executed. The one or more hosted programs can be written to be executed according to a non-native instruction set architecture that is supported by the intelligent processor module 2208 and the migratable architecture 2206, but which is not natively executable in the commodity platform 2202 or within the commodity operating environment 2204. Such hosted programs can include, for example, mainframe workloads or other non-native workloads that have different data formats, instructions, or other features that cause incompatibility with the underlying commodity systems.

Figure 23:
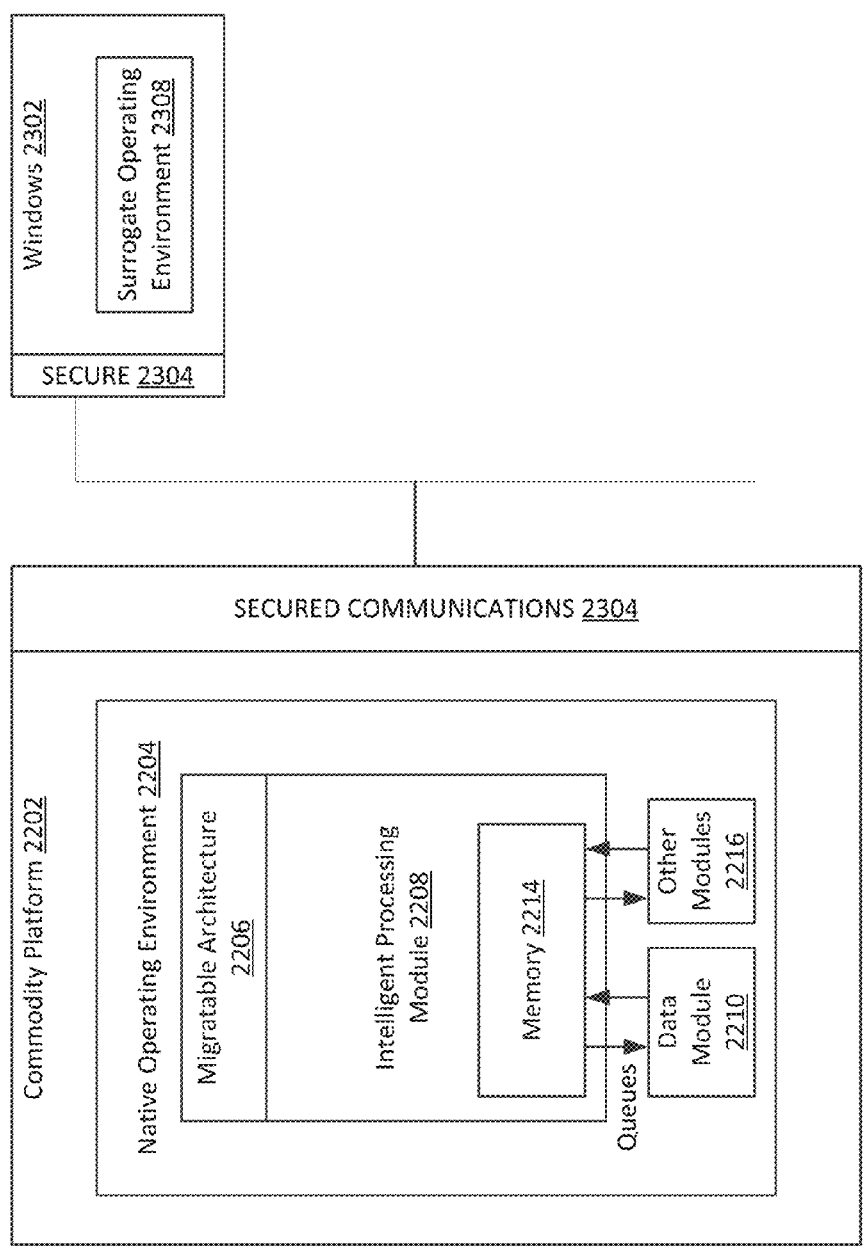
FIG. 23 is a block diagram of a secure migratable architecture hosted within a commodity computing platform and communicatively connected to a surrogate environment usable to host a remote workload, according to an example embodiment of the present disclosure.

In the example embodiment of FIG. 23, an arrangement 2300 includes the system 2200 of FIG. 22, but communicatively connected to a separate platform 2302. The commodity platform and separate platform 2302 can be communicatively connected via a network, and communications secured using secured communications software 2304 resident on each of the platforms 2202, 2302. The secured communications software 2304 can implement any of a variety of encryption mechanisms, such as the Stealth security software solution described above.

In the embodiment shown, a surrogate operating environment 2308 is instantiated on the separate platform 2302. The surrogate operating environment 2308 is generally an environment analogous to the migratable architecture 2206 and intelligent processor module 2208, in that it supports a same instruction set architecture. Of course, the separate platform 2302 may have a same or different commodity architecture as compared to the commodity platform 2202.

Figure 24:
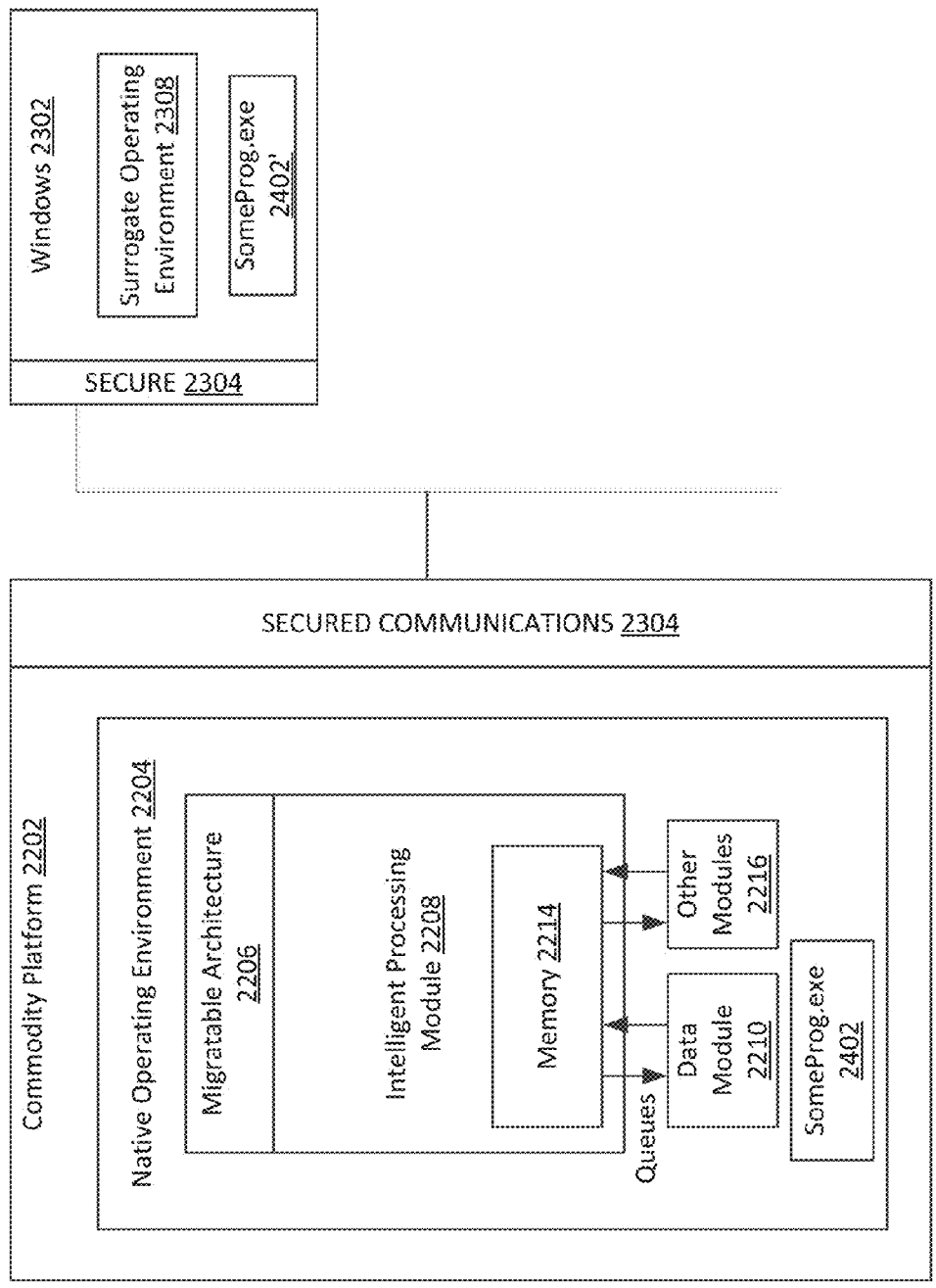
FIG. 24 is a block diagram of a secure migratable architecture hosted within a commodity computing platform and communicatively connected to a surrogate environment hosting a remote workload, according to an example embodiment of the present disclosure.

As seen in FIG. 24, the arrangement 2300 can include a hosted program 2402 executing on the commodity platform 2202. The hosted program 2402 is executed by the intelligent processor module 2208, on the migratable architecture 2206. However, in some embodiments, it may be desirable to move the hosted program 2402 to a different computing system. Accordingly, as illustrated in FIG. 24, a copy of the hosted program 2402' is created on the separate platform, and its execution is managed via the surrogate operating environment 2308.

Figure 25:
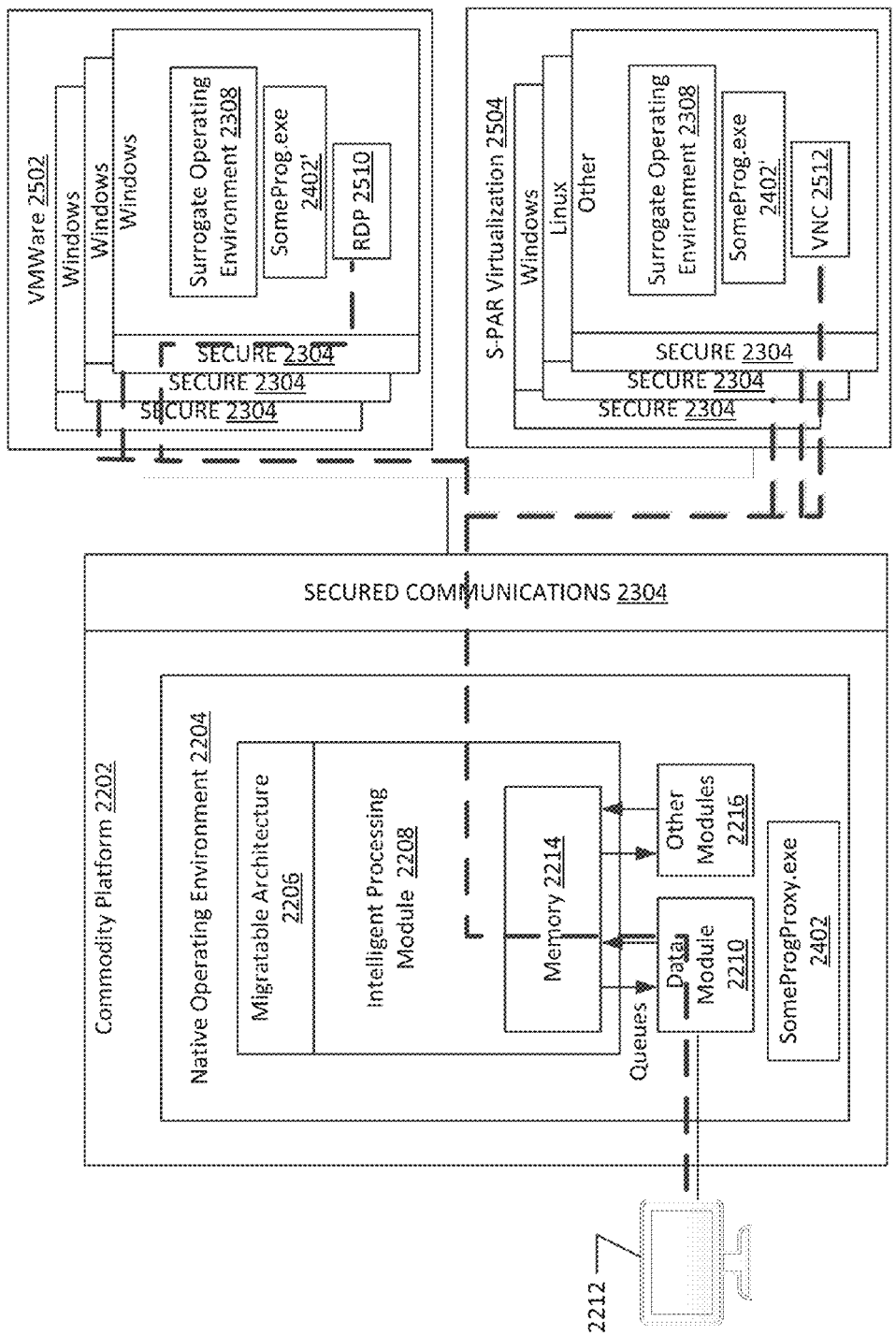
FIG. 25 is a block diagram of a secure migratable architecture hosted within a commodity computing platform and communicatively connected to a surrogate environment hosting remote workloads and providing a remote user interface display within a networked computing fabric.

Extending this arrangement logically, it is noted that a variety of different types of processes can be distributed across various computing platforms (either physical or virtual platforms). Additionally, the same program can be executed on a plurality of different platforms, to distribute processing tasks. As seen in FIG. 25, an arrangement 2500 illustrates integration of the hosted program 2402 at a plurality of remote computing systems. In the embodiment shown, a plurality of different virtualized platforms are illustrated that are communicatively connected to the commodity platform 2202. For example, a VMware platform 2502 is illustrated on which a plurality of Windows-based partitions reside. Each of those Windows-based partitions can host a surrogate operating environment 2408 as noted above, as well as a replicated version of the hosted program 2402'. In addition, an optional remote desktop protocol based program 2510 can execute on one or more such partitions, allowing desktop display to be routed back to the commodity platform 2202 via the intelligent processor module 2208 and via data module 2210 to the display 2212. Accordingly, a user of the commodity platform 2202 may view information displayed by the hosted program 2402' as though it was executed locally. Similarly, a further platform 2504 can host a plurality of different types of partitions, for example Windows-based, Linux-based, or other types of partitions. Platform 2504 can be segmented into a plurality of virtualized partitions using the s-Par secure partitioning system described above and available from Unisys Corporation. As with the VMware platform 2502, one or more such partitions can host a surrogate operating environment 2308 that allows for execution of hosted program 2402'. In general the surrogate operating environment 2308 allows a user to instantiate, monitor, stop or continue, terminate, or log operations associated with hosted workloads (e.g., hosted programs). A virtual network connection 2512 can be provided to allow for virtual terminal access to the hosted program 2402' on platform 2504, similarly allowing for display to a user on display 2212.

Figure 26:
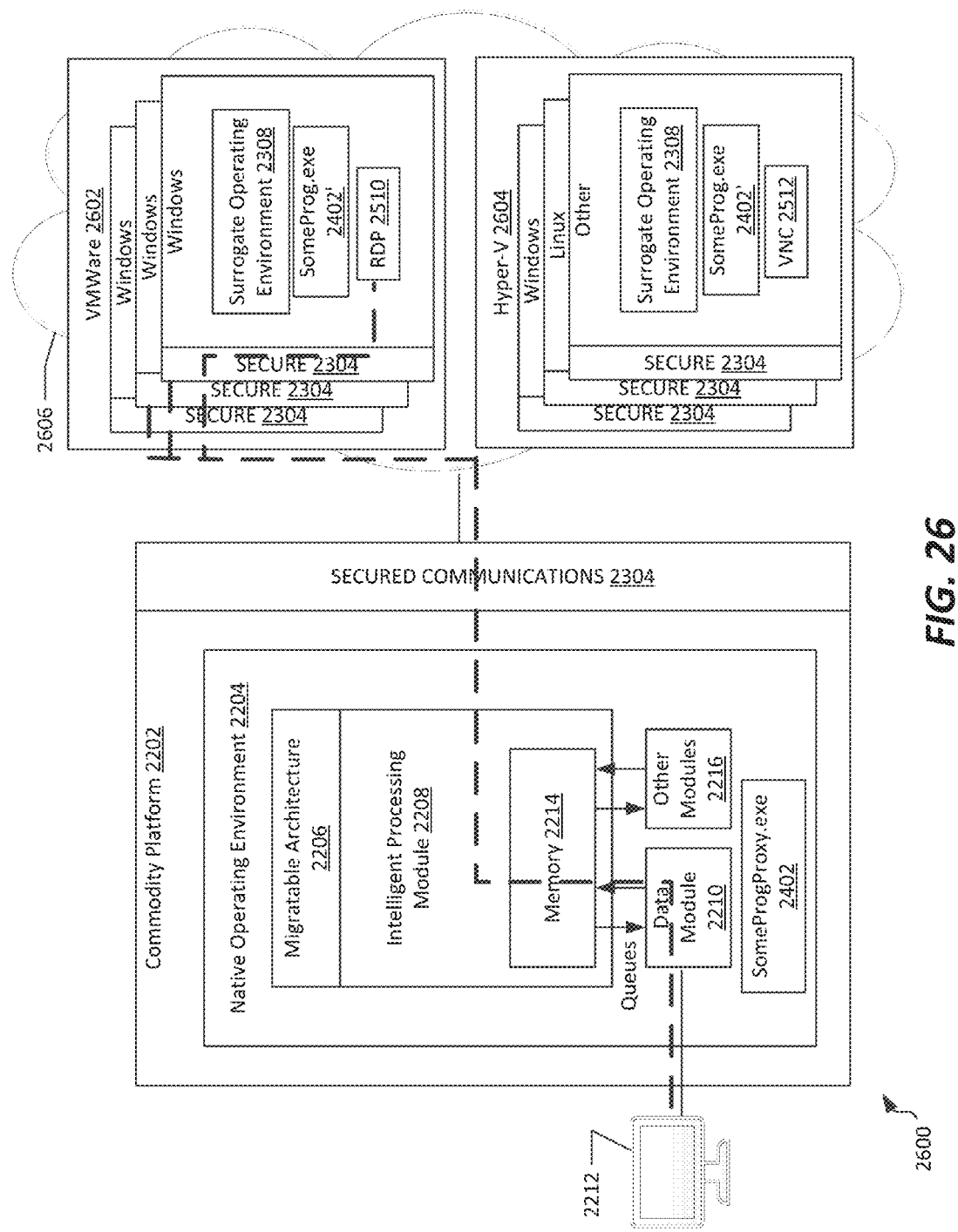
FIG. 26 is a block diagram of a secure migratable architecture hosted within a commodity computing platform and communicatively connected to a surrogate environment hosting remote workloads and providing a remote user interface display within a hybrid cloud computing fabric.

Although, in FIG. 25, a computing fabric including a plurality of different partitions may be included within an organization or enterprise, in some embodiments, the computing fabric can be distributed external to that organization or enterprise as well. In such circumstances, the secure migratable architecture can similarly be distributed to remote systems as well. As illustrated in FIG. 26, an arrangement 2600 is illustrated that is analogous to that described above, but shows a platform 2602 hosting VMware-implemented partitioning and a second platform 2604 hosting Hyper-V-implemented partitioning within a cloud environment 2606. In the embodiment shown, the hosted program 2402' can be executed within a remote, cloud-based partition, in the same manner as discussed above in connection with FIG. 25. Because the cloud-hosted partitions are Windows-based or Linux-based partitions, execution of the hosted program 2402' by a surrogate operating environment 2308 is analogous to the organization or enterprise example, even if that partition is itself virtualized within the cloud environment 2606.

Figure 27:
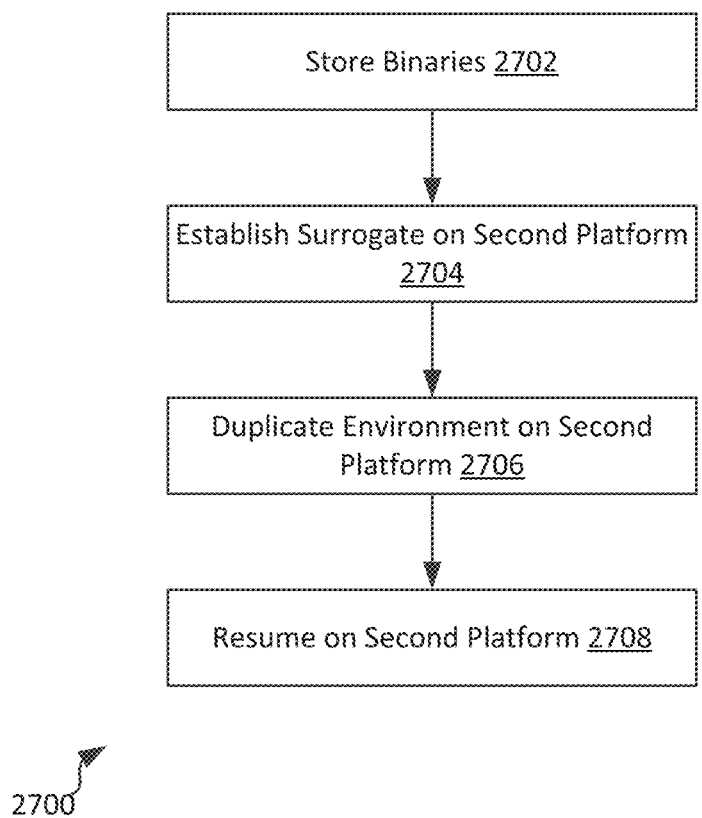
FIG. 27 is a flowchart of a method of migrating a secure migratable architecture to a separate computing platform, according to an example embodiment.
Figure 28:
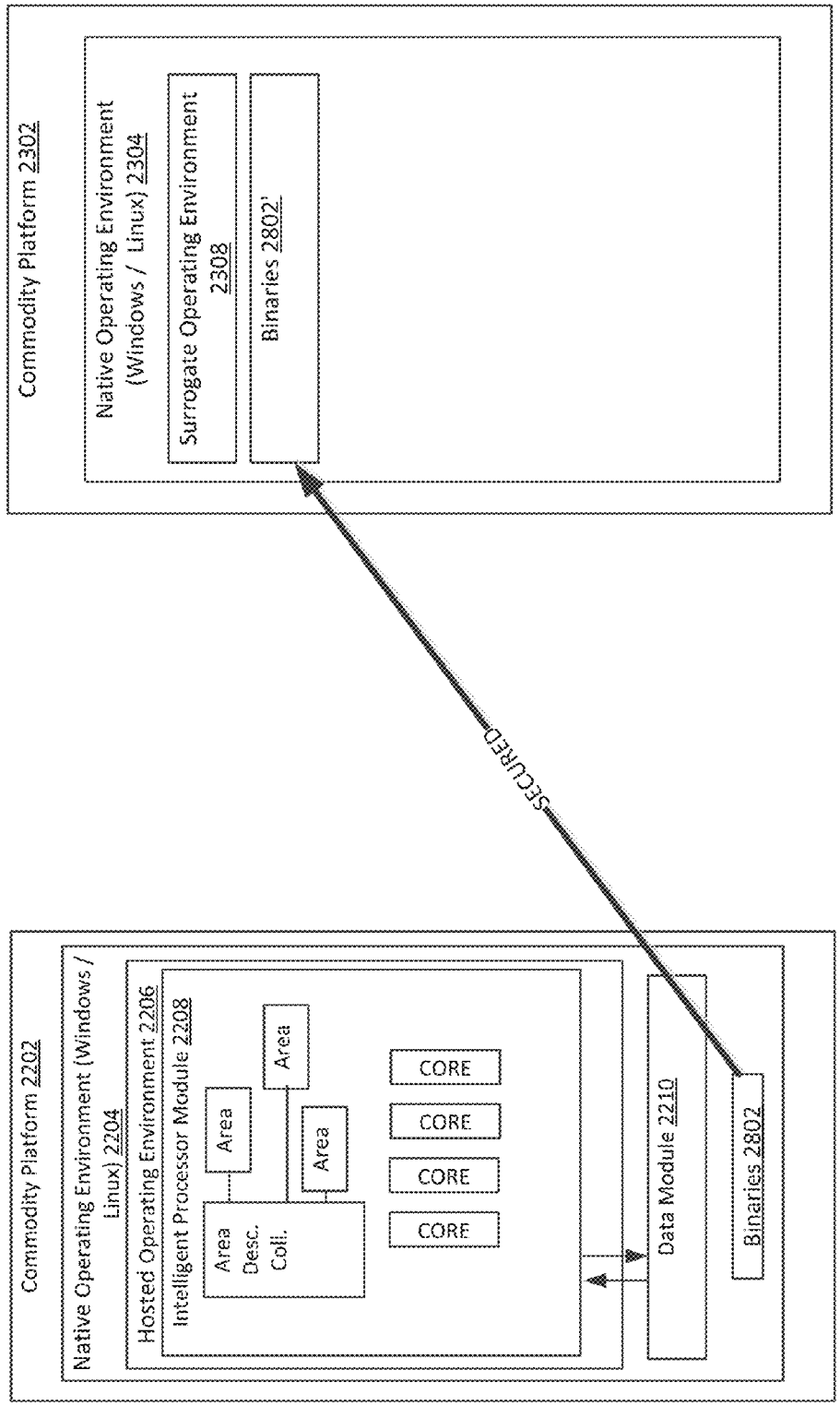
FIG. 28 is a block diagram of computing platforms between which a secure migratable architecture can be migrated.
Figure 29:
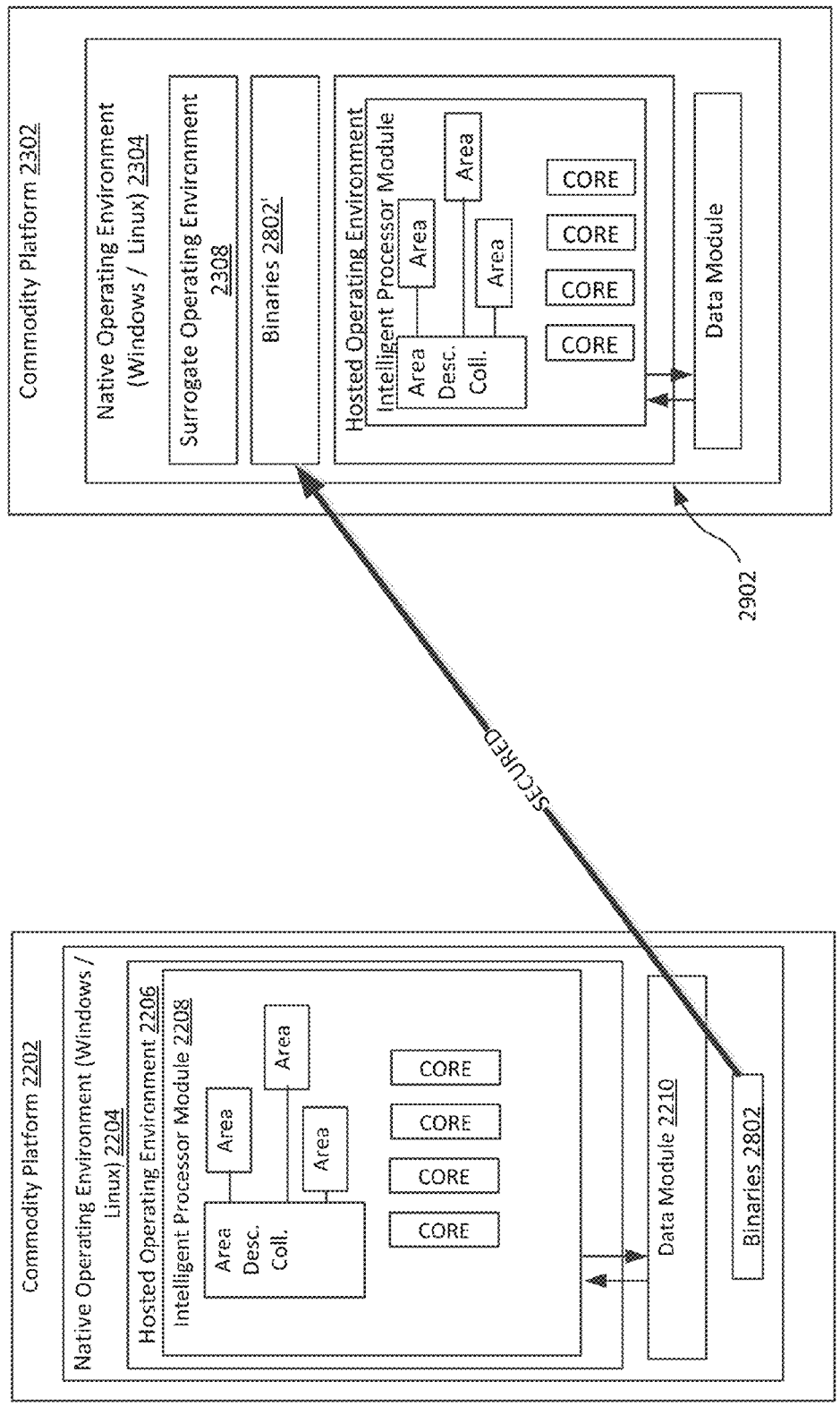
FIG. 29 is a block diagram of computing platforms between which a secure migratable architecture has been migrated.

Referring now to FIGS. 27-29, additional details regarding transference of features of the secure migratable architecture are provided, in accordance with example embodiments of the present disclosure. The transference of features in the examples provided can be between two physical platforms, virtual partitions, or a combination thereof, as described above.

As illustrated in FIG. 27, a method 2700 of migrating a secure migratable architecture to a separate computing platform includes storing binaries on an initial commodity platform (step 2702). The binaries can be, for example binaries representing an intelligent processing module and a data module and the current execution state thereof on a commodity platform. The method includes establishing a surrogate of the architecture on a second platform (step 2704), analogously to the manner described above for migrated processes in connection with FIGS. 22-26. The method 2700 further includes duplicating the binaries to a second platform and using the surrogate to instantiate the secure migratable architecture on the second platform using the binaries for the intelligent processing module and the data module (step 2706). The method 2700 includes resuming operation of the environment on the second platform (step 2708) based on the transferred intelligent processing module and data module.

Referring now to FIGS. 28-29, block diagrams of computing platforms illustrating migration of the secure migratable architecture are shown. FIG. 28 is a block diagram of a system 2800 including computing platforms between which a secure migratable architecture can be migrated. In the system 2800 as shown, a commodity platform 2202 having a commodity operating environment 2204, as noted above, can host an operating environment 2206 that includes an intelligent processor module 2208. The intelligent processor module 2208 can similarly be interfaced to data module 2210. Binaries 2802 of the intelligent processor module 2208 and data module 2210 are captured at the commodity platform 2202 and transferred as binaries 2802' to a second commodity platform 2302 hosting a commodity operating environment 2304. A surrogate operating environment 2308 receives the binaries 2802' via a secured connection.

As illustrated in FIG. 29, a system 2900 is shown that represents an updated migration state as compared to system 2800 of FIG. 28. In this example, the binaries 2802' are expanded to form a migrated secure migratable architecture 2902, representing a relocated version of the architecture (including elements 2206, 2208, 2210) originally located on the commodity platform 2202.

Figure 30:
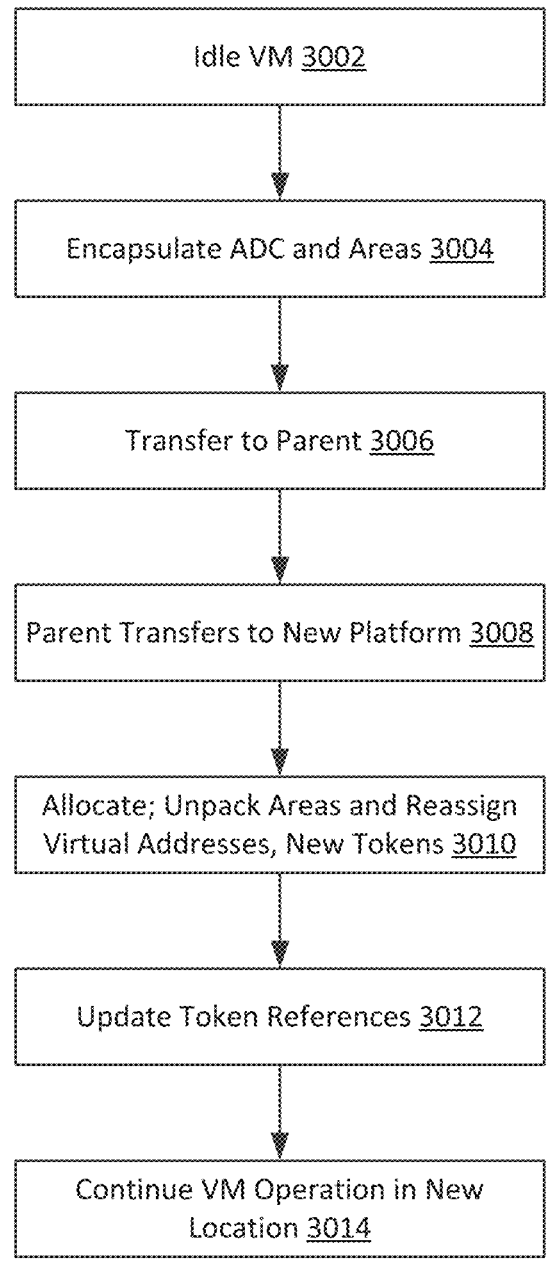
FIG. 30 is a flowchart of a method of replicating a hosted process across computing platforms, according to an example embodiment.

Referring now to FIGS. 30-36, a general method and a set of systems are illustrated that provide additional details regarding embodiments in which hosted processes can be replicated across computing platforms. FIG. 30 is a flowchart of a further method 3000 of replicating a hosted process across computing platforms, according to an example embodiment. In this embodiment, the hosted process generally represents a virtualized environment that can be replicated across computing platforms or partitions.

As illustrated in FIG. 30, a method 3000 for replicating host processes across platforms or partitions includes idling a virtual machine (step 3002). In the embodiment shown, the virtual machine corresponds to an intelligent processing module that executes code stored in memory areas associated with that module (i.e., referenced by area descriptors included in the area descriptor collection affiliated with the module). Accordingly, because the intelligent processing modules of the present disclosure can implement a non-native instruction set architecture that is not supported otherwise by the commodity platform on which that module resides, the intelligent processing module and associated hosted operating system can represent a virtualization system on which non-native workloads can be hosted. However, as compared to existing virtualization systems, such systems can be dynamically allocated and resources dynamically adjusted, as well as allow for migration between platforms mid-execution, as illustrated herein.

In the embodiment shown, the method 3000 includes encapsulation of the area descriptor collection and memory areas that represent a current state of execution of an intelligent processing module (step 3004). The method also includes transferring the area descriptor collection and memory areas to a parent platform (e.g., the commodity operating system and platform on which the intelligent processing module executes (step 3006), which in turn transfers the encapsulated data to a new platform step 3008). On the new platform, the memory areas are unpacked and reassigned to resources of the new platform (step 3010). This includes reassigning the memory areas to virtual addresses on the new platform, and creating new tokens that are to be associated with each of the area descriptors and associated memory areas, and updating token references to the area descriptors and areas step 3012). Once such tokens are updated to correctly reference memory areas on the new platform, an intelligent processing module can resume execution on the new platform from the memory areas, which corresponds to continued operation of the virtual machine on that new platform (step 3014).

Figure 31:
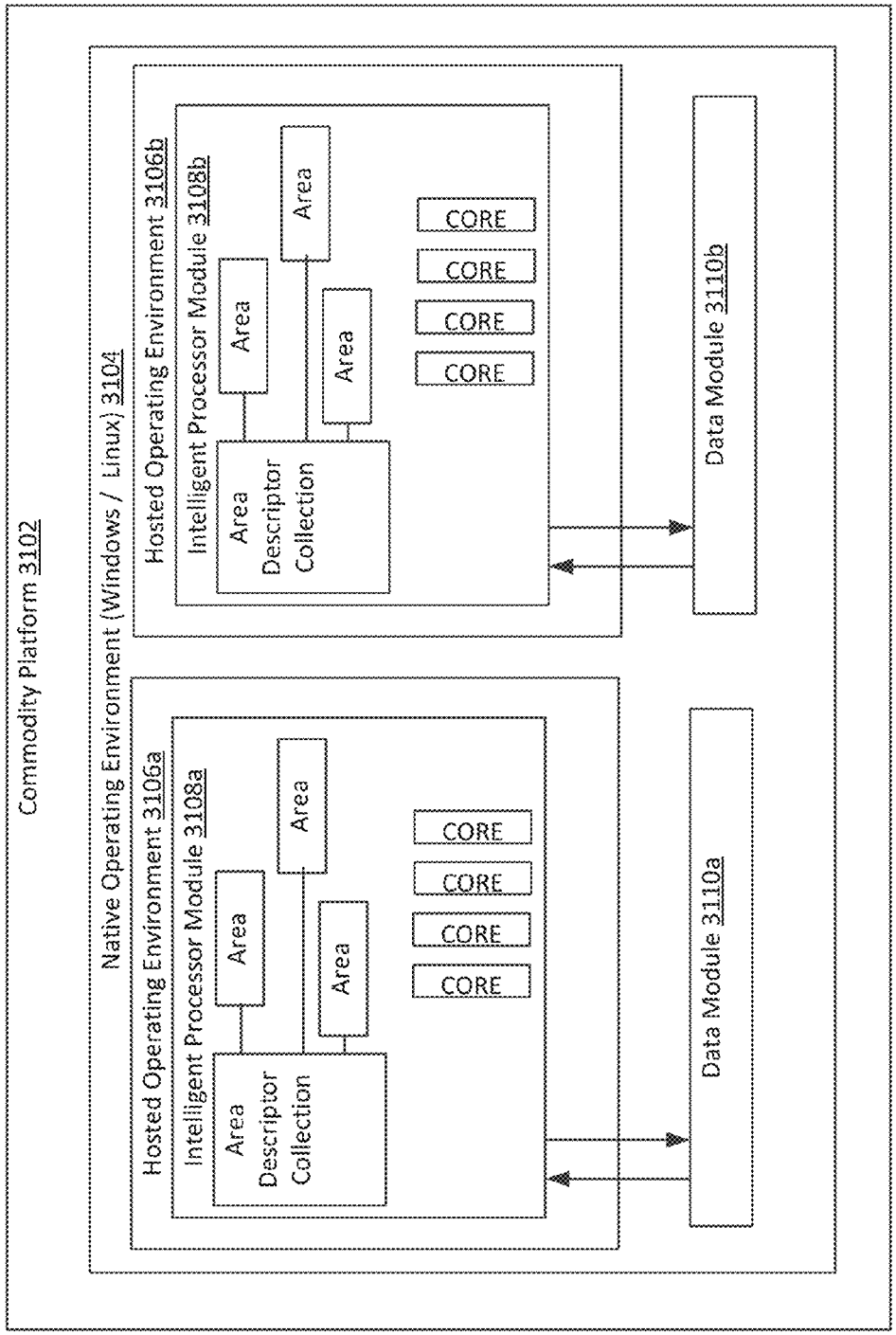
FIG. 31 is a block diagram illustrating replication of a hosted process on a computing platform, according to a possible embodiment.
Figure 32:
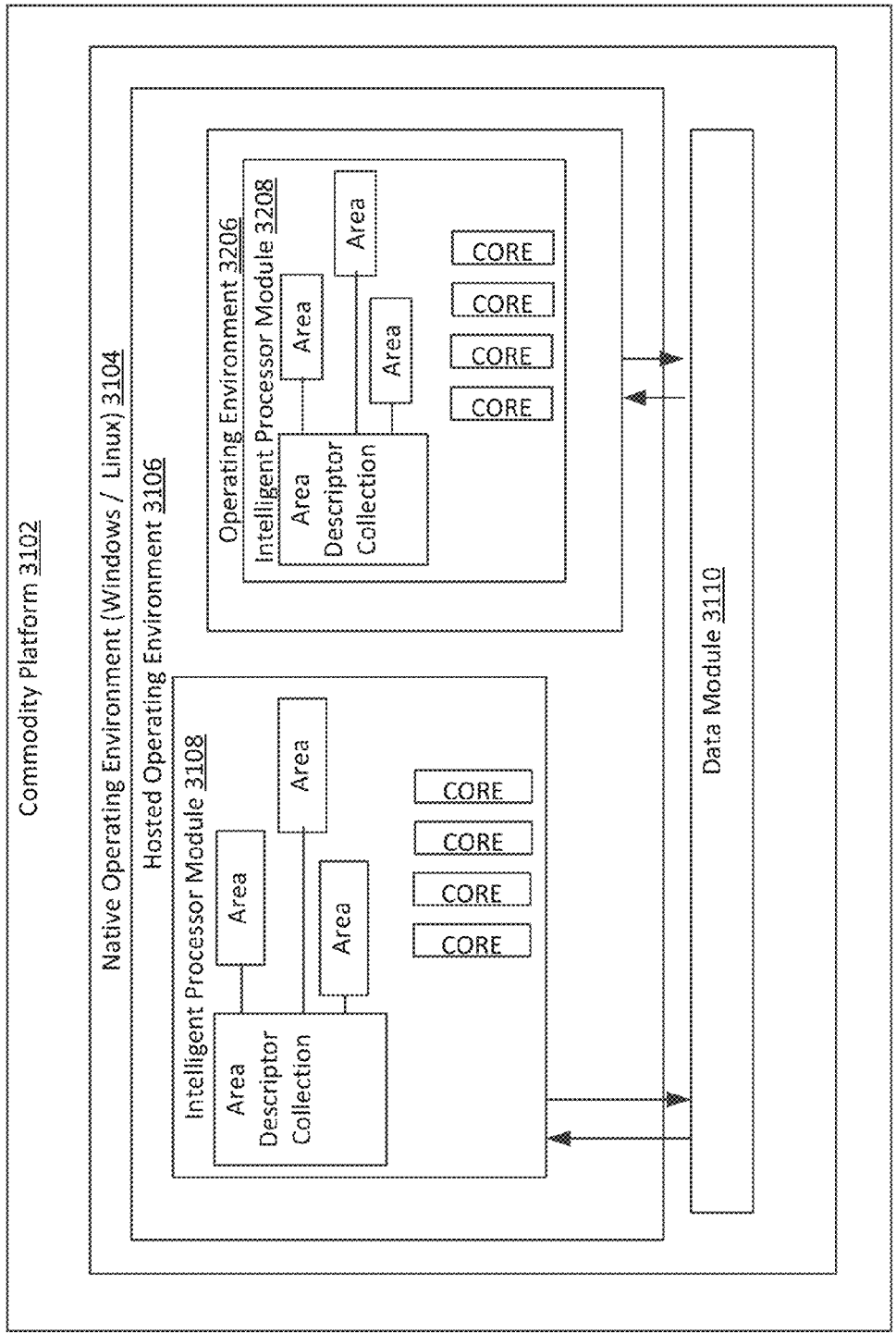
FIG. 32 is a block diagram illustrating replication of a hosted process on a computing platform, according to a further possible embodiment.

As an initial matter, FIGS. 31-32 illustrate arrangements in which a hosted process is replicated on a single platform. In such embodiments, the hosted process can correspond to a process encapsulating the secure migratable architecture; in some embodiments, the hosted process represents a process that is hosted by the secure migratable architecture. In the embodiment of FIG. 31, an arrangement 3100 includes a commodity platform 3102 operable with a commodity operating environment 3104 hosts a plurality of separate, independently executable versions of a secure migratable architecture, including an operating environment 3106*a-b*, intelligent processor module 3108*a-b*, and data module 3110*a-b*, respectively. Such architectures operate independently, and separately manage memory and data access.

By way of contrast, in FIG. 32, an alternative arrangement 3200 is shown in which a first version of a secure migratable architecture hosts a second version of such an architecture. As illustrated in arrangement 3200, an operating environment 3206 and associated intelligent processor module 3208 are hosted within operating environment 3106, and share access to a common data module 3110. In this arrangement, the hosted operating environment 3206 can seamlessly interchange data with the operating environment 3106, and allows for simply migration of environment 3206 and associated intelligent processor module 3208, for example due to resource depletion on the commodity platform 3102, business rules, or other reasons.

In this arrangement, it is noted that because the data module 3110 is external to either operating environment 3106, 3206, the data module can communicate with multiple such operating environments, and can manage queues with multiple intelligent processor modules 3108, 3208. In addition, data module 3110 can be constructed as a distributed module across platforms, and can service other operating environments as well. This has further advantages because it allows for simpler update of external modules, since only a single module needs to be updated if functionality of the data module changes. Messages can be passed between the data module 3110 and environments 3106, 3206 to, for example, update, stop processing queues, detach, shut down, update, invoke, attach, and resume processing, allowing for such updates to occur.

Figure 33:
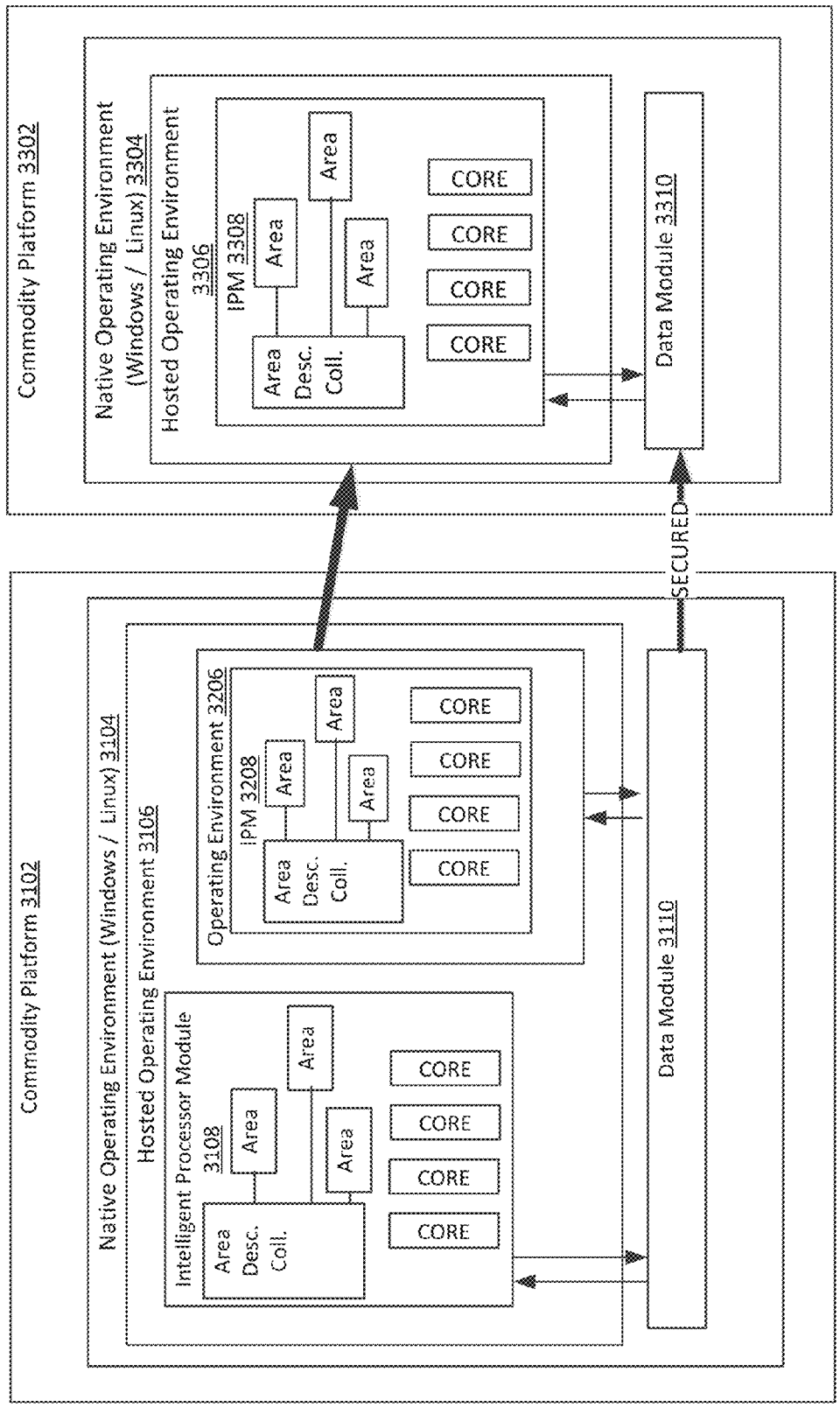
FIG. 33 is a block diagram illustrating migration of a replicated hosted process to a second computing platform, according to a possible embodiment.

Referring to FIG. 33, a system 3300 is illustrated in which the arrangement 3200 is implemented, and which migrates operating environment 3206 and intelligent processor module 3208 to a separate platform 3302. Additionally, data module 3110 is copied to the separate platform 3302, and instantiated as data module 3310. Once instantiated on the separate platform 3302, the data modules 3110, 3310 can exchange data via a secure connection, for example to exchange data between the platforms 3102, 3302 for purposes of exchanging data among virtualized instances within operating environments 3106, 3306.

Figure 34:
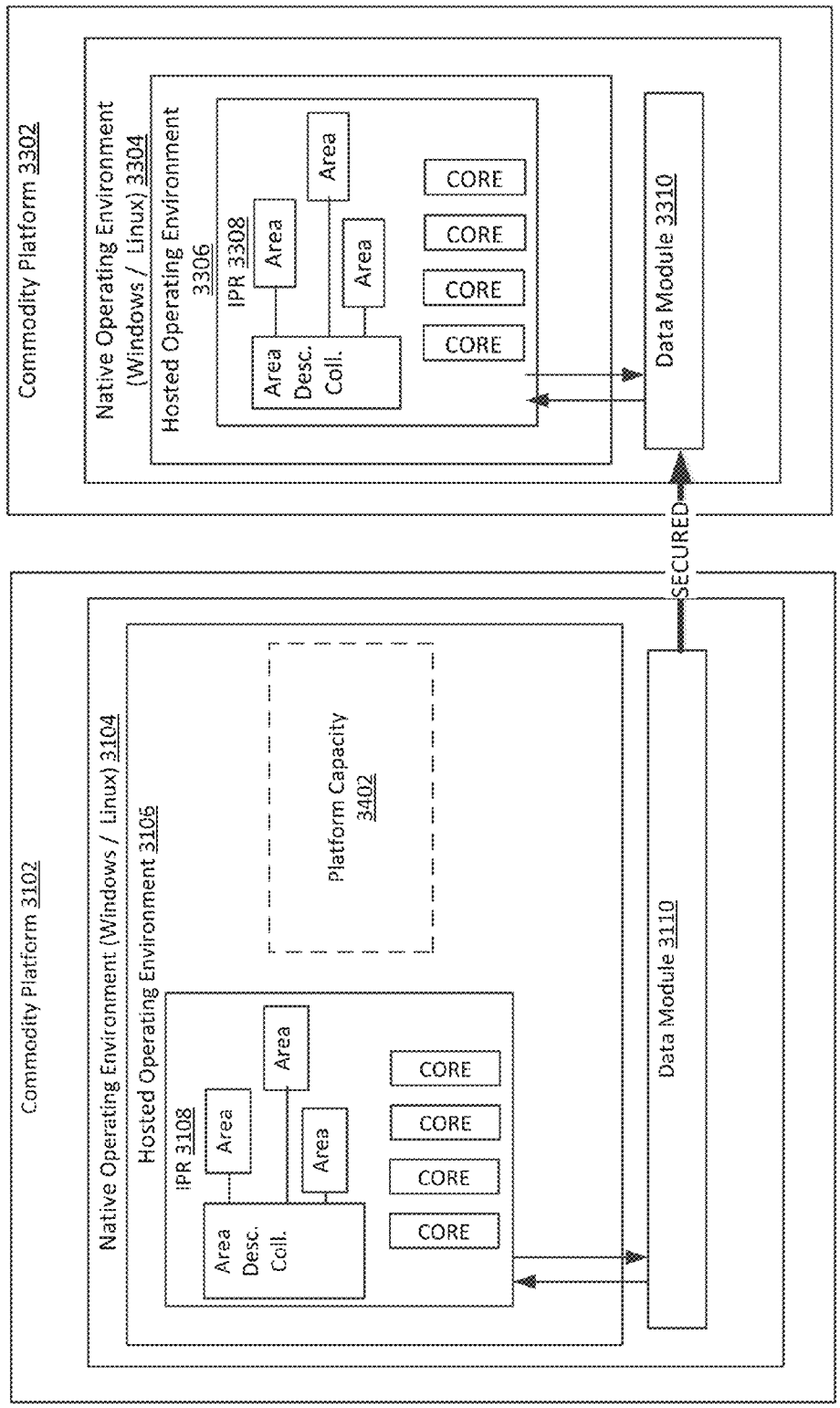
FIG. 34 is a block diagram illustrating completed migration of a replicated hosted process to a second computing platform.

FIG. 34 is a block diagram illustrating system 3300 after completed migration of a replicated hosted process to the platform 3302, as compared to FIG. 33. In the system 3300 as illustrated, the operating environment 3306, intelligent processor module 3308, and data module 3310 are migrated to the separate platform 3302, and therefore environment 3206 and intelligent processor module 3208 are not needed, and are deallocated. This frees platform capacity 3402 on the commodity platform 3102, allowing operating environment 3106 or other resources within the commodity operating system 3104 to utilize those resources differently.

Figure 35:
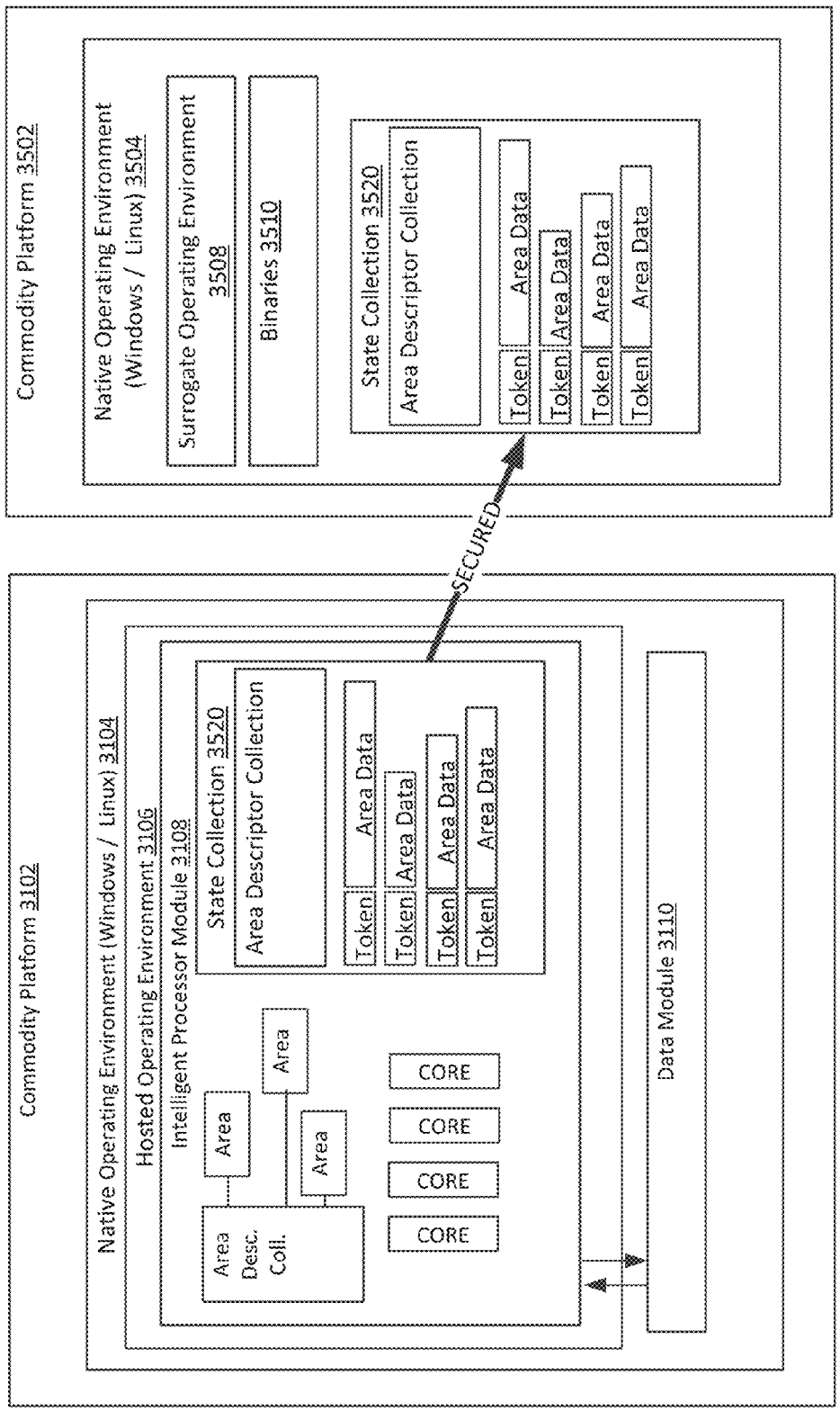
FIG. 35 is a block diagram illustrating migration of memory state information to a replicated hosted process on the second computing platform.
Figure 36:
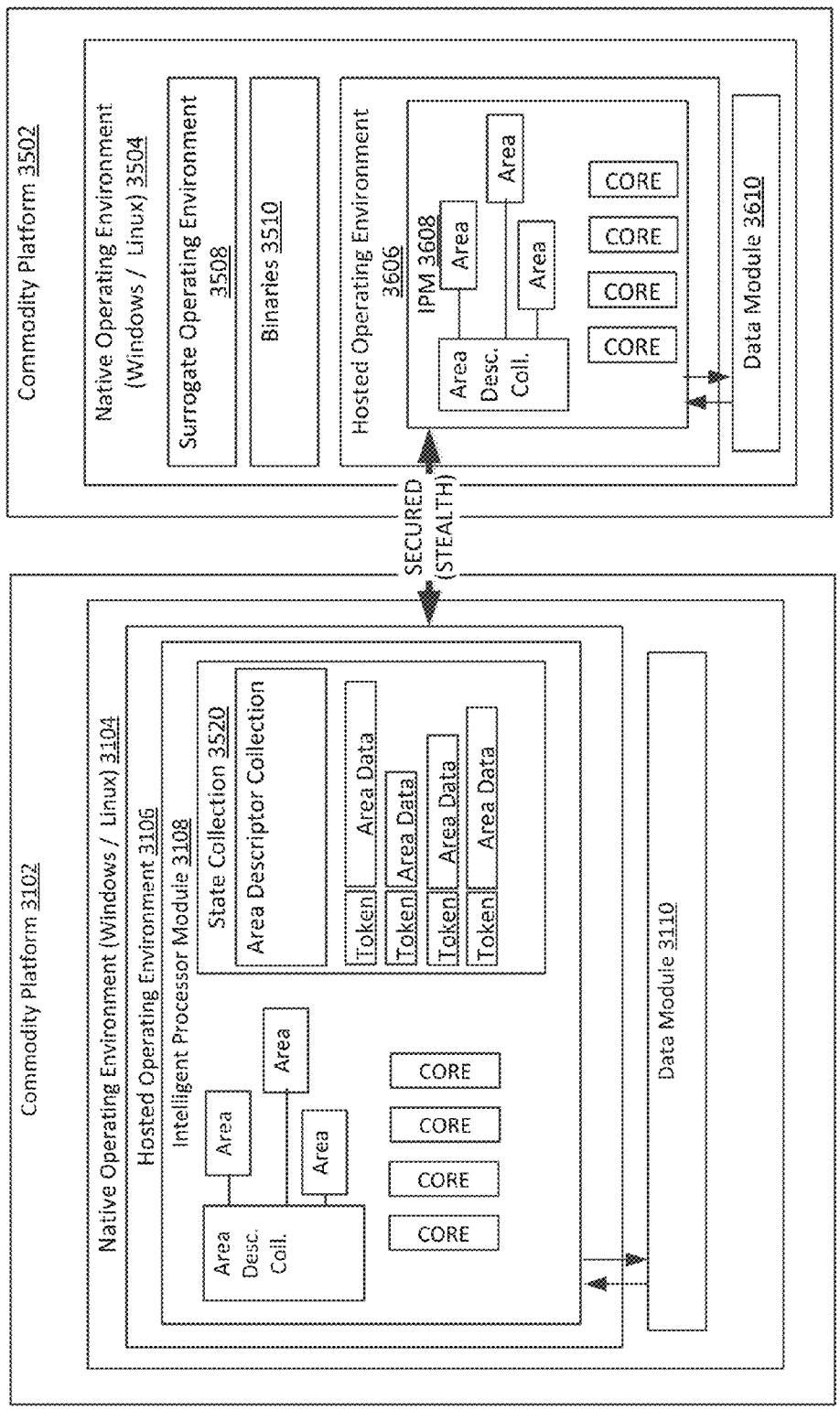
FIG. 36 illustrates a secured communication connection between a secure migratable architecture on a first computing system and a migrated version of a secure migratable architecture operating on a second computing system, according to an example embodiment.

Referring to FIGS. 35-36, additional details regarding migration of a secure migratable architecture are shown. In FIG. 35, migration of memory state information from the commodity platform 3102 to the separate platform 3502 is shown. Such migration can correspond, for example to encapsulation of the area descriptor collection and memory areas, as well as transfer of such data, to the separate platform, as illustrated in steps 3004-3008 of FIG. 30, above. In the example shown, state collection 3520 is saved after the intelligent processor module 3108 is idled, and transferred to memory of the separate platform 3502 via a secured connection. The separate platform 3502, in the embodiment shown, hosts a commodity operating system 3504, which supports surrogate operating environment 3508. Further, as shown in FIG. 36, the surrogate operating environment 3508 can instantiate a new operating environment 3606 and intelligent processor module 3608 from binaries 3510 and the state collection 3520, such that the operating environment 3606, when execution of the intelligent processing module 3608 is started, will continue execution from the point in time the intelligent processor module 3108 was idled to store state collection 3520. Accordingly, Referring to FIGS. 1-36 generally, it is noted that a variety of advantages are realized by the secure migratable architecture discussed herein. For example in addition to the advantages discussed above generally, it is noted that the secure migratable architecture is readily reconfigurable and migratable across computing platforms, and can quickly be replicated to distribute task execution for fault tolerance and task execution efficiency/throughput. Furthermore, because the secure migratable architecture has greater flexibility than existing virtualization systems regarding resource utilization, it can be used on different types of commodity platforms, including embedded platforms or other systems having non-standard I/O devices, limited resources, and typically non-contiguous memory area allocation.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A computing system comprising: a programmable circuit configured to execute instructions according to a first computing architecture;
   a memory communicatively connected to the programmable circuit, the memory storing software executable by the programmable circuit, the software including:
   an operating system; and
   a process including a firmware environment representing a virtual computing system having a second computing architecture different from the first computing architecture and one or more workloads to be executed within the process, the software executable to perform a method including:
   upon initiating execution of the process, allocating a portion of the memory for use by the process during execution;
   and executing the process hosted by the operating system, wherein the firmware environment manages the portion of the memory using a token associated with one or more area descriptors to describe the portion of the memory and a tag, each of the one or more area descriptors defining to the firmware environment a base address and an offset at which a buffer memory area is located, the base address translated to an address in the memory managed by the operating system
   wherein the firmware receives a write request from the one or more workloads, translating the request to a specific memory buffer corresponding to the token, adding an offset to the base address at which the buffer memory area is located, the buffer memory area being within the portion of memory allocated for use by the process, validate that the tag value associated with the address is compatible, write the a value of the memory access request at the offset address,
   the write value and the offset address is passed to the first computing architecture, wherein the first computing architecture converts the virtual address to a physical address and writes the value in the memory.

2. The system of claim 1, wherein the one or more area descriptors are included in an area descriptor collection managed by the firmware environment.

3. The system of claim 1, wherein the portion of the memory is, according to the second architecture implemented in the firmware environment, directly addressable.

4. The system of claim 3, wherein the portion of the memory is, from the perspective of the first architecture implemented by the programmable circuit and operating system, addressable using one or more virtual addresses.

5. The system of claim 1, wherein the area descriptor encapsulates a plurality of attributes of the memory area within the portion of memory.

6. The system of claim 1, wherein the one or more area descriptors are unique within the firmware environment across the entire duration of execution of the process.

7. The system of claim 1, wherein the one or more area descriptors reference a memory area having a common tag value associated with all the memeory locations within the memory area.

8. The system of claim 1, wherein the one or more area descriptors includes a link to a tag area, the tag area including a tag byte associated with each data word in the memory area.

9. The system of claim 8, wherein the memory area is organized in contiguous 64-bit data words, wherin the tag area is seperate from the memory area containing the data words.

10. The system of claim 1, wherein the one or more area descriptors includes a descriptor associated with access rights to the memory area.

11. The system of claim 1, wherein the one or more area descriptors includes a descriptor identifying a type of memory associated with the memory area.

12. A computer-implemented method comprising: upon initiating execution of a process, allocating a portion of a memory for use by the process during execution, the process including a firmware environment representing a virtual computing system having a second computing architecture different from a first computing architecture of a computing system on which the process is executed;

and executing the process hosted by the operating system, wherein the firmware environment manages the portion of the memory using a token associated with one or more area descriptors to describe the portion of the memory and a tag, each of the one or more area descriptors defining to the firmware environment a base address and an offset at which a buffer memory area is located, the base address translated to an address in the memory managed by the operating system, wherein the firmware receives a write request from the one or more workloads, translating the request to a specific memory buffer corresponding to the token, adding an offset to the base address at which the buffer memory area is located, the buffer memory area being within the portion of memory allocated for use by the process, validate that the tag value associated with the address is compatible, write the a value of the memory access request at the offset address, the write value and the offset address is passed to the first computing architecture, wherein the first computing architecture converts the virtual address to a physical address and writes the value in the memory.

13. The computer-implemented method of claim 12, further comprising communicating with a remote computing system via security software, the remote computing system and the computing system being members of a common community of interest.

14. The computer-implemented method of claim 12, wherein the process further includes one or more workloads to be executed within the process.

15. The computer-implemented method of claim 12, wherein executing the process hosted by the operating system comprises calling a native function from the firmware environment, the native function executable according to the first computing architecture.

16. The computer-implemented method of claim 12, wherein executing the process comprises:
receiving a memory request from the workload at the firmware, the memory request including a reference to a memory arae and an offset;
translating the memory request to a memory access request according to the native instruction set architecture and managed by the operating system.

17. The computer-implemented method of claim 12, wherein executing the process comprises:
allocating a new memory area to the process;
creating a new area descriptor token associated with the new memory area in an area descriptor collection, the area descriptor token referencing an area descriptor associated with the new memory area.

18. A computing system comprising:
a programmable circuit configured to execute instructions according to a first computing architecture;
a memory communicatively connected to the programmable circuit, the memory storing software executable by the programmable circuit, the software including:
an operating system; and
a process including a firmware environment representing a virtual computing system having a second computing architecture different from the first computing architecture and one or more workloads to be executed within the process according to the second computing architecture, the software executable to perform a method including:
upon initiating execution of the process, allocating a portion of the memory for use by the process during execution;
creating an area descriptor associated with a memory area included within the portion of the memory, the area descriptor including a base address and a length of the memory area;
storing the area descriptor in an area descriptor collection;
and executing the process hosted by the operating system, wherein the firmware environment manages the portion of the memory using a token associated with one or more area descriptors to describe the portion of the memory and a tag, each of the one or more area descriptors defining to the firmware environment a base address and an offset at which a buffer memory area is located, the base address translated to an address in the memory managed by the operating system
wherein the firmware receives a write request from the one or more workloads, translating the request to a specific memory buffer corresponding to the token, adding an offset to the base address at which the buffer memory area is located, the buffer memory area being within the portion of memory allocated for use by the process, validate that the tag value associated with the address is compatible, write the a value of the memory access request at the offset address
the write value and the offset address is passed to the first computing architecture, wherein the first computing architecture converts the virtual address to a physical address and writes the value in the memory.

19. The computing system of claim 18, wherein the memory area is associated with a tag included in the area descriptor and the memory request is associated with a plurality of data words in the memory area.

20. The computing system of claim 19, wherein performing the memory request includes assessing the tag prior to accessing the plurality of data words.

21. The computing system of claim 18, further comprising:
receiving, at the firmware, a request to deallocate the memory area; and
prior to deallocation of the memory area, erasing data from the memory area.

* * * * *